(12) United States Patent
Wilson et al.

(10) Patent No.: US 12,069,095 B2
(45) Date of Patent: Aug. 20, 2024

(54) AUTOMATED AUTHENTICATION AND AUTHORIZATION IN A COMMUNICATION SYSTEM

(71) Applicant: ValiMail Inc., San Francisco, CA (US)

(72) Inventors: Ashley Duane Wilson, San Francisco, CA (US); Seth Joshua Blank, San Francisco, CA (US); Peter Martin Goldstein, San Francisco, CA (US); Jack William Abbott, Parker, CO (US); Robert Benjamin Barclay, Thornton, CO (US)

(73) Assignee: ValiMail Inc., San Francisco, CA (US)

( * ) Notice: Subject to any disclaimer, the term of this patent is extended or adjusted under 35 U.S.C. 154(b) by 600 days.

(21) Appl. No.: 17/328,759

(22) Filed: May 24, 2021

(65) Prior Publication Data

US 2021/0289001 A1    Sep. 16, 2021

Related U.S. Application Data

(63) Continuation-in-part of application No. 17/155,091, filed on Jan. 22, 2021, now Pat. No. 11,038,897.
(Continued)

(51) Int. Cl.
*H04L 9/40* (2022.01)
*G06F 16/903* (2019.01)
(Continued)

(52) U.S. Cl.
CPC ............ *H04L 63/20* (2013.01); *G06F 16/903* (2019.01); *G06Q 10/103* (2013.01);
(Continued)

(58) Field of Classification Search
CPC . H04L 63/20; H04L 63/0876; H04L 63/0884; H04L 63/101; H04L 63/08;
(Continued)

(56) References Cited

U.S. PATENT DOCUMENTS 7,123,974 B1 * 10/2006 Hamilton ........... G05B 19/4063
700/86
7,742,603 B2    6/2010 Tengler et al.
(Continued)

FOREIGN PATENT DOCUMENTS

EP              1720123 A1    11/2006
WO    WO 2014/131058 A2    8/2014

OTHER PUBLICATIONS

Australian Intellectual Property Office, Examination Report, Australian Patent Application No. 2021209899, Jul. 6, 2023, 4 pages.
(Continued)

*Primary Examiner* — Dant B Shaifer Harriman
*Assistant Examiner* — Aubrey H Wyszynski
(74) *Attorney, Agent, or Firm* — Fenwick & West LLP

(57) ABSTRACT

An application-operating organization may delegate a third-party server to serve as an automated contextual authentication responder and an authorization responder. The third-party server may manage a delegated section of the organization's namespace that includes the public identities of various devices controlled by the organization. The third-party server may also dynamically generate interaction control list that is tailored to a requesting device's context based on the interaction control policies set forth by the organization. The interaction control list may include information that determines the authorization of the requesting device to interact with another device. The third-party server may also automatically determine the role of a new device to which existing policies are inapplicable and provide guided workflow for the organization to set up new interaction control policies in governing the new device. The determination of the roles of devices may be based on an iterative process using external data sources.

20 Claims, 40 Drawing Sheets

Related U.S. Application Data

(60) Provisional application No. 63/093,723, filed on Oct. 19, 2020, provisional application No. 62/964,624, filed on Jan. 22, 2020.

(51) Int. Cl.
  *G06Q 10/10* (2023.01)
  *G06Q 10/105* (2023.01)
  *G06Q 10/107* (2023.01)

(52) U.S. Cl.
  CPC ....... *G06Q 10/105* (2013.01); *H04L 63/0876* (2013.01); *H04L 63/0884* (2013.01); *H04L 63/101* (2013.01); *G06Q 10/107* (2013.01)

(58) Field of Classification Search
  CPC .. G06F 16/903; G06Q 10/103; G06Q 10/105; G06Q 10/107
  USPC .......................................................... 726/1
  See application file for complete search history.

(56) References Cited

U.S. PATENT DOCUMENTS

| | | | |
|---|---|---|---|
| 8,132,250 B2 | 3/2012 | Judge et al. | |
| 8,438,079 B1 | 5/2013 | Nguyen et al. | |
| 9,143,476 B2 | 9/2015 | Dreller et al. | |
| 9,419,951 B1 | 8/2016 | Felsher et al. | |
| 9,646,496 B1 | 5/2017 | Miller | |
| 9,686,073 B2 | 6/2017 | Goldstein | |
| 9,762,618 B2 | 9/2017 | Goldstein | |
| 9,774,586 B1 | 9/2017 | Roche et al. | |
| 9,800,402 B2 | 10/2017 | Goldstein | |
| 10,122,765 B1 | 11/2018 | Goldstein | |
| 10,169,342 B1 | 1/2019 | Ben-Yair et al. | |
| 10,229,157 B2 | 3/2019 | Collins et al. | |
| 10,237,278 B1 | 3/2019 | Saylor et al. | |
| 10,257,231 B2 | 4/2019 | Goldstein | |
| 10,469,330 B1* | 11/2019 | Roth | H04L 41/22 |
| 10,642,969 B2 | 5/2020 | James et al. | |
| 10,897,485 B2 | 1/2021 | Goldstein | |
| 10,992,716 B1 | 4/2021 | Cairney | |
| 11,038,897 B1 | 6/2021 | Wilson et al. | |
| 11,171,939 B1 | 11/2021 | Blank et al. | |
| 2004/0177120 A1 | 9/2004 | Kirsch | |
| 2006/0253314 A1 | 11/2006 | Reznichenko et al. | |
| 2006/0277259 A1 | 12/2006 | Murphy et al. | |
| 2010/0082758 A1 | 4/2010 | Golan | |
| 2012/0151486 A1 | 6/2012 | Owen et al. | |
| 2013/0318602 A1 | 11/2013 | Devarapalli et al. | |
| 2014/0047064 A1 | 2/2014 | Maturana et al. | |
| 2014/0164281 A1 | 6/2014 | Balkir et al. | |
| 2014/0244998 A1 | 8/2014 | Amenedo et al. | |
| 2015/0188949 A1 | 7/2015 | Mahaffey et al. | |
| 2016/0142387 A1* | 5/2016 | Lockhart | H04L 63/061 713/171 |
| 2016/0162591 A1 | 6/2016 | Dokania et al. | |
| 2016/0171509 A1 | 6/2016 | Fanous et al. | |
| 2016/0205078 A1 | 7/2016 | James et al. | |
| 2016/0205097 A1 | 7/2016 | Yacoub et al. | |
| 2016/0205106 A1 | 7/2016 | Yacoub et al. | |
| 2016/0315969 A1 | 10/2016 | Goldstein | |
| 2016/0352705 A1* | 12/2016 | Lockhart | H04L 63/061 |
| 2017/0012780 A1 | 1/2017 | Kaliski, Jr. et al. | |
| 2017/0034100 A1 | 2/2017 | Zink et al. | |
| 2017/0083867 A1 | 3/2017 | Saxena et al. | |
| 2017/0270128 A1 | 9/2017 | Smith et al. | |
| 2017/0324724 A1 | 11/2017 | Smith et al. | |
| 2018/0048460 A1 | 2/2018 | Goldstein | |
| 2018/0060601 A1* | 3/2018 | Kay | H04W 12/08 |
| 2018/0172799 A1 | 6/2018 | Meadow | |
| 2018/0285977 A1 | 10/2018 | Cleary et al. | |
| 2018/0302446 A1 | 10/2018 | Goldstein | |
| 2018/0332065 A1 | 11/2018 | Gupta et al. | |
| 2019/0014180 A1 | 1/2019 | Lawson et al. | |
| 2019/0028832 A1 | 1/2019 | Speede | |
| 2019/0149342 A1 | 5/2019 | Fynaardt et al. | |
| 2019/0200228 A1 | 6/2019 | Adrangi et al. | |
| 2019/0334884 A1 | 10/2019 | Ross et al. | |
| 2020/0092257 A1 | 3/2020 | Goldstein | |
| 2020/0137081 A1 | 4/2020 | Goldstein | |
| 2020/0296082 A1 | 9/2020 | Killoran et al. | |
| 2021/0067559 A1 | 3/2021 | Coleman et al. | |
| 2021/0092118 A1 | 3/2021 | Zahed | |
| 2021/0092127 A1 | 3/2021 | Li et al. | |
| 2021/0289001 A1 | 9/2021 | Wilson et al. | |

OTHER PUBLICATIONS

Lin, X. et al. "GSIS: A secure and privacy-preserving protocol for vehicular communications," *IEEE Transactions on vehicular technology*, Nov. 19, 2007, pp. 3442-3456.

PCT International Search Report and Written Opinion, PCT Application No. PCT/US2021/016674, May 24, 2021, 10 pages.

Rekik, M. et al. "Improved dual authentication and key management techniques in vehicular ad hoc networks," *14th International Conference on Computer Systems and Applications*, Oct. 30, 2017, pp. 1133-1140.

United States Office Action, U.S. Appl. No. 17/168,091, filed Jul. 11, 2023, 35 pages.

Andersen, K. et al., "The Authenticated Received Chain (ARC) Protocol," Internet Engineering Task Force (IETF), Request for Comments: 8617, Jul. 2019, 35 pages, ISSN: 2070-1721.

Kucherawy, M. et al., "Domain-based Message Authentication, Reporting, and Conformance (DMARC)," Request for Comments: 7489, Mar. 2015, 73 pages, ISSN: 2070-1721.

PCT International Search Report and Written Opinion, PCT Application No. PCT/US2021/014481, May 3, 2021, 10 pages.

PCT International Search Report and Written Opinion, PCT Application No. PCT/US2021/014483, May 3, 2021, 10 pages.

U.S. Appl. No. 17/128,008, filed Dec. 19, 2020, ValiMail Inc.

U.S. Appl. No. 63/057,814, filed Jul. 28, 2020, ValiMail Inc.

European Patent Office, Extended European Search Report and Written Opinion, European Patent Application No. 21750125.3, Jan. 2, 2024, 8 pages.

United States Office Action, U.S. Appl. No. 18/204,874, filed Mar. 28, 2024, 23 pages.

United States Office Action, U.S. Appl. No. 17/328,753, Dec. 23, 2022, 7 pages.

European Patent Office, Extended European Search Report and Written Opinion, European Patent Application No. 21744189.8, Feb. 15, 2024, 7 pages.

Alagar et al., "Context-aware Trust-based Management of Vehicular Ad-hoc Networks (VANETs)", IEEE Computer Society, Aug. 10, 2015, 7 pages.

European Patent Office, European Search Report and Written Opinion, European Patent Application No. 21744185.6, Feb. 27, 2024, 11 pages.

Parikh et al., "Privacy-preserving Services in VAN ET with Misbehavior Detection", IEEE International Conference on Advance Networks and Telecommunication Systems, Dec. 17, 2017, 6 pages.

United States Office Action, U.S. Appl. No. 17/168,091, filed Feb. 27, 2024, 39 pages.

Wang et al., "Privacy-Preserving Cloud-Based Road Condition Monitoring with Source Authentication in VANETs", IEEE Transactions on Information Forensics and Security, Dec. 6, 2018, 12 pages.

European Patent Office, Extended European Search Report, European Patent Application No. 21206991.8, Apr. 28, 2022, 7 pages.

PCT International Search Report and Written Opinion, PCT Application No. PCT/US2021/014482, Aug. 27, 2021, 10 pages.

Russell, D. "Access Control for Dynamic Virtual Organizations." Electronic Proceedings of the UK EScience All Hands Meeting, Jan. 1, 2004, pp. 1-8.

United States Office Action, U.S. Appl. No. 18/320,917, filed Feb. 29, 2024, 11 pages.

United States Office Action, U.S. Appl. No. 17/155,089, filed Jun. 14, 2022, 13 pages.

(56) References Cited

OTHER PUBLICATIONS

United States Office Action, U.S. Appl. No. 17/371,718, filed Dec. 22, 2022, 6 pages.

* cited by examiner

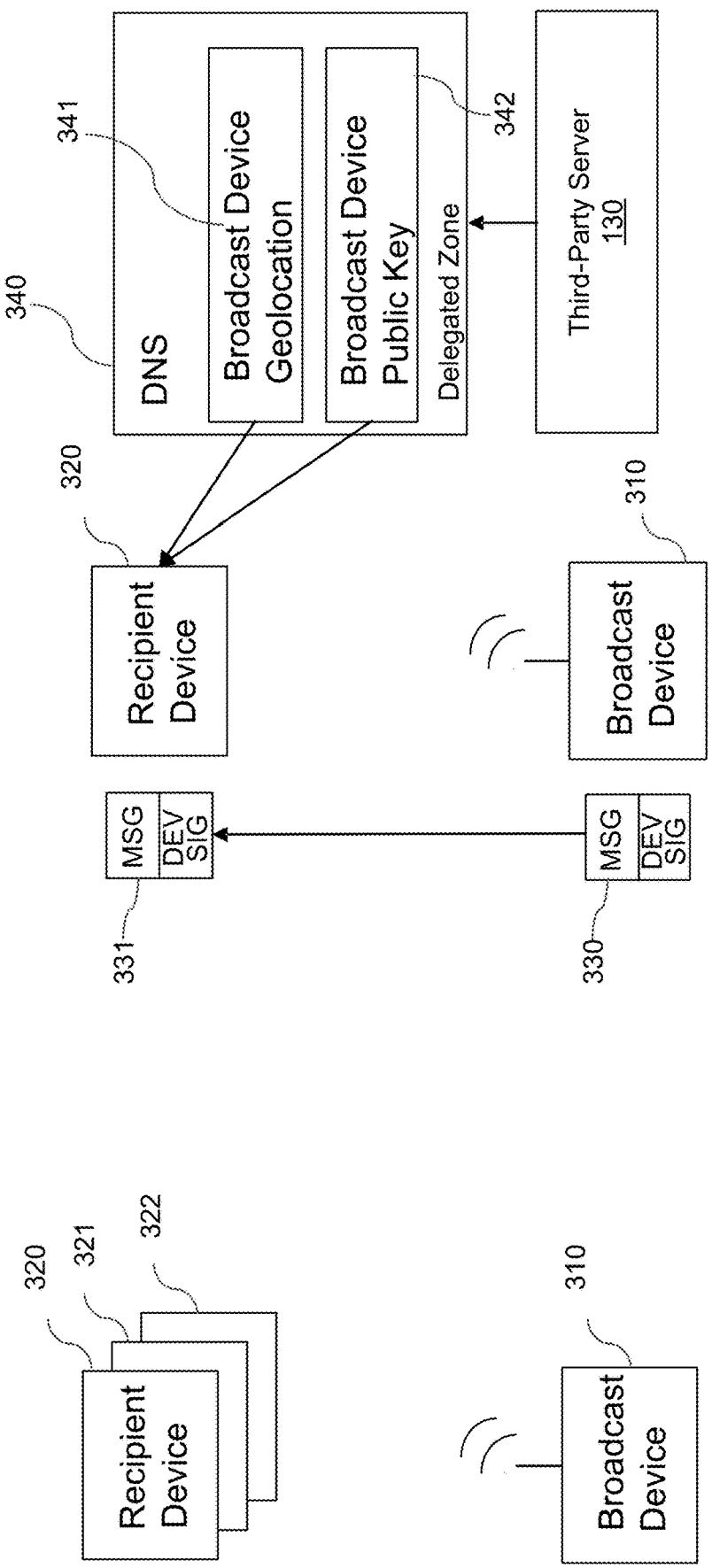

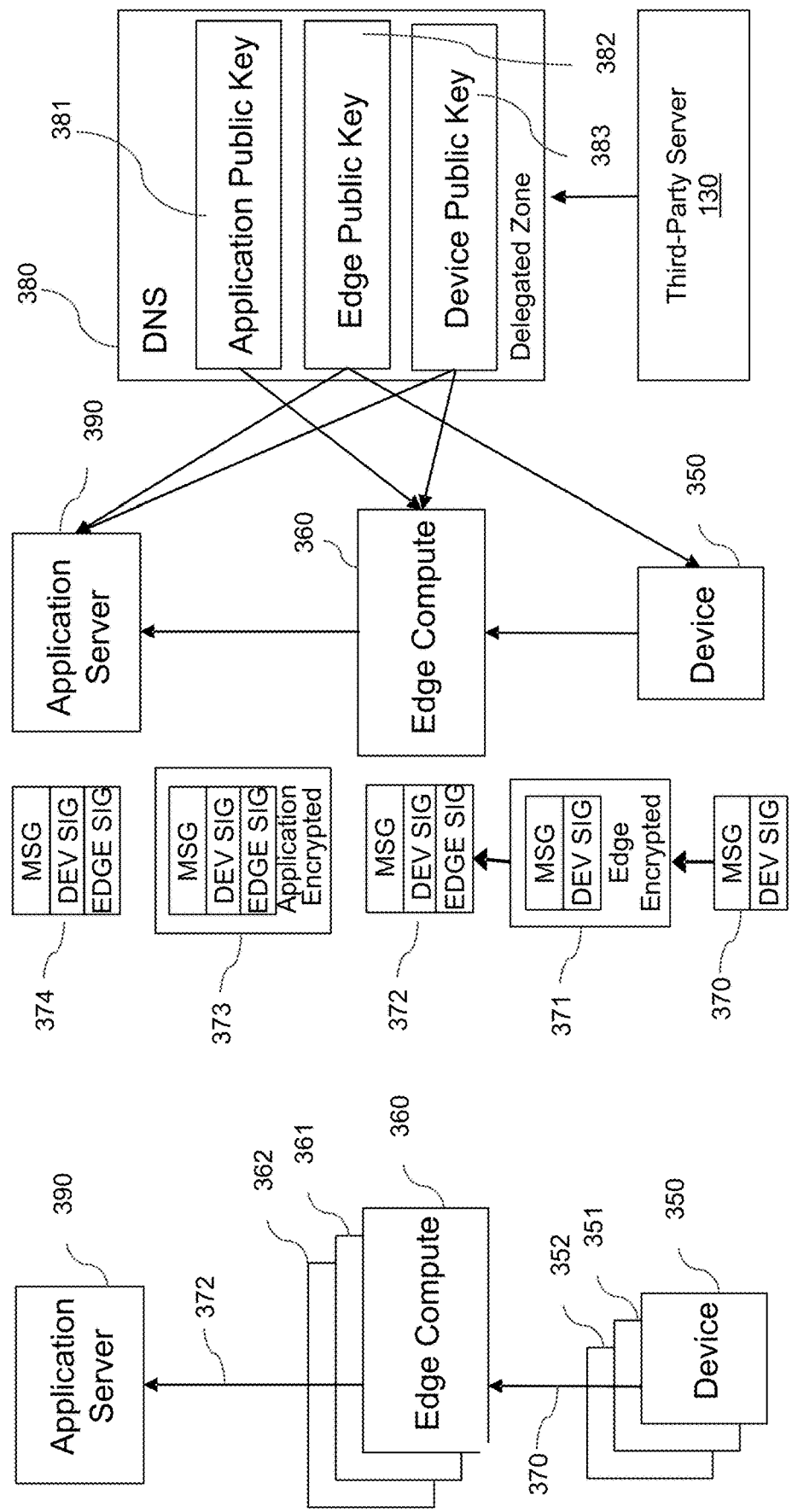

510

511 — Entity ID Record: Name=abc123, Credential=${PUBLIC_KEY}, MaxMessages=1 DutyCycle=1d Begin=2020-06-03T00:00:00Z End=2020-11-04T00:00:00

512 — Entity ID Record: Name=abc123, Credential=${PUBLIC_KEY}, MaxMessages=1 DutyCycle=1d Begin=2020-06-03T00:00:00Z End=2020-11-04T00:00:00

513 — Entity ID Record: Name=abc123, Credential=${PUBLIC_KEY}, MaxMessages=1 DutyCycle=1d Begin=2020-06-03T00:00:00Z End=2020-11-04T00:00:00

Entity ID Record: Name=abc123, Credential=${PUBLIC_KEY}, MaxMessages=1 DutyCycle=1d Begin=2020-06-03T00:00:00Z End=2020-11-04T00:00:00 — 514

Enterprise Namespace

520

Authorized Devices for Consumer Application

| Supplier | Name |
|---|---|
| Enterprise | abc123 |
| Enterprise | def456 |
| Enterprise | jkl012 |

530

| Com # | Time |
|---|---|
| 2 | Mon June 22 |
| 1 | Tue June 23 9am |
| 1 | Sun June 21 |

Messages

| NAME | SIG | MSG |
|---|---|---|
| abc123 | 1337 | 68 |
| def456 | 1339 | 68 |
| ghi789 | 1338 | 72 |

FIG. 5

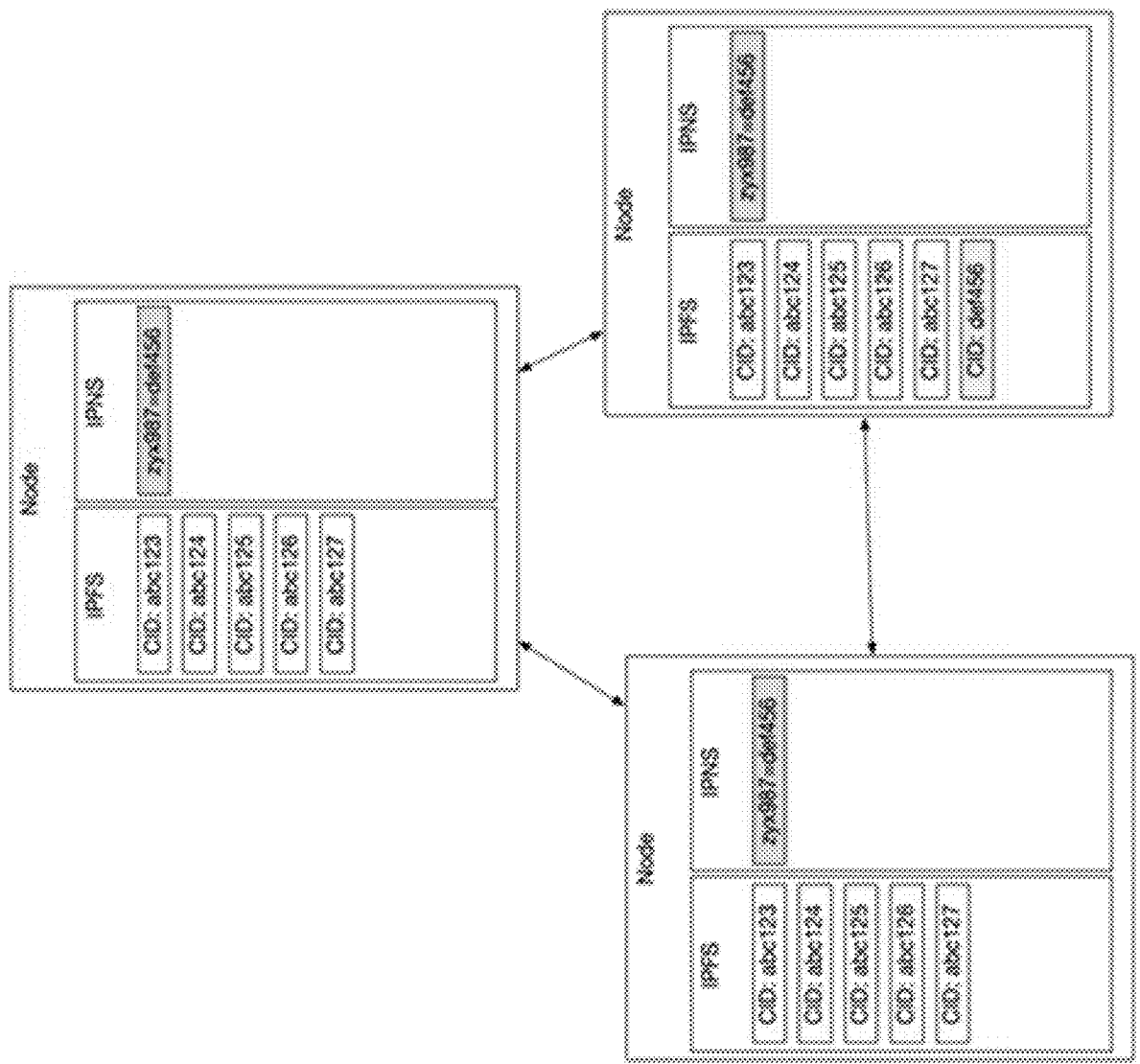

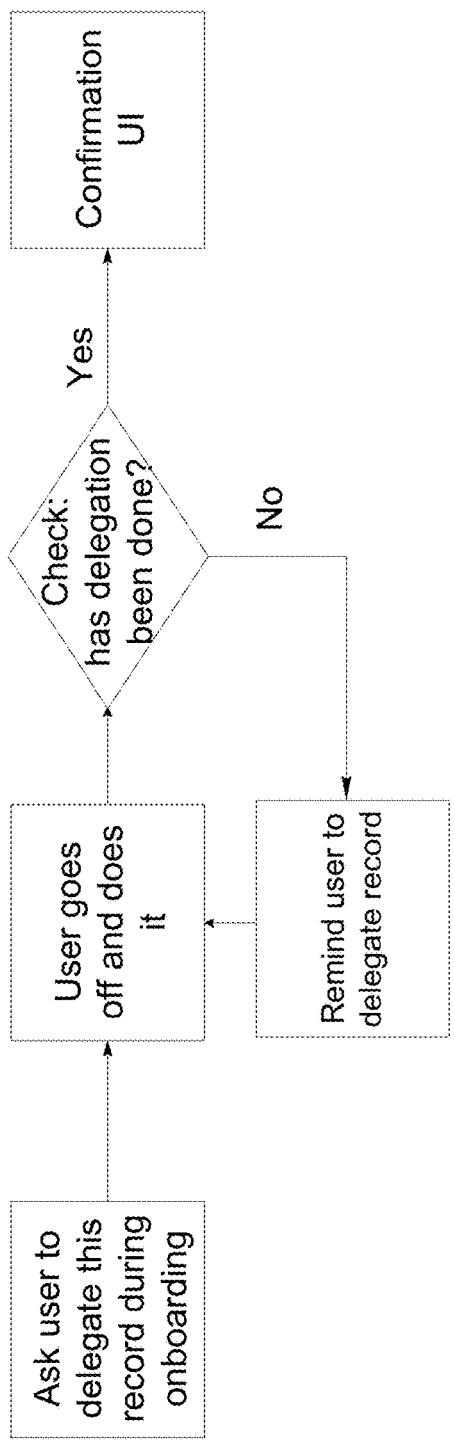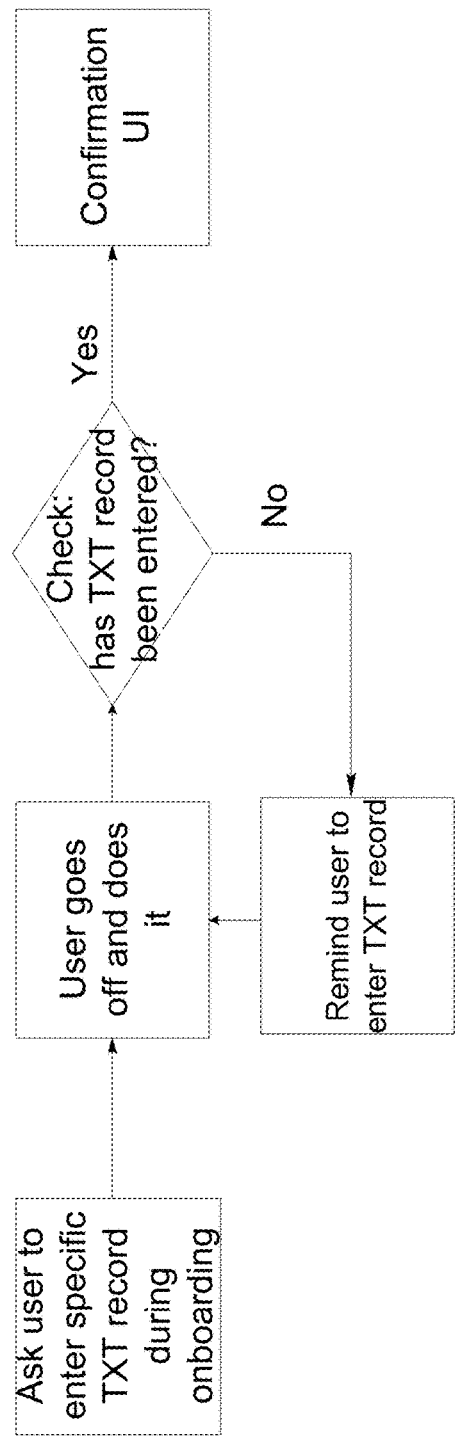
FIG. 19D

To Do
RECENT (3)      IGNORED      <<
The SPF record for acme.com needs work
Changes your SPF record >
Is MailServerB an approved sender?
Approve or Deny MailServerB >
Bronto needs DKIM configuration
Setup DKIM for MailServerA >
2020
FIG. 20B To Do «
RECENT (3) IGNORED
 The SPF record for acme.com needs work
Change your SPF record >
 Is MailServerB an approved sender?
Approve or Deny MailServerB >
 Bronto needs DKIM configuration
Setup DKIM for MailServerA >
2040
FIG. 20D

AUTOMATED AUTHENTICATION AND AUTHORIZATION IN A COMMUNICATION SYSTEM

CROSS-REFERENCE TO RELATED APPLICATIONS

The present application is a continuation-in-part of U.S. patent application Ser. No. 17/155,091, filed on Jan. 22, 2021, which claims the benefit of U.S. Provisional Patent Application No. 62/964,624, filed on Jan. 22, 2020, and U.S. Provisional Patent Application No. 63/093,723, filed on Oct. 19, 2020, all of which are hereby incorporated by reference in their entirety.

TECHNICAL FIELD

The present disclosure generally relates to authentication and authorization in a network application and, more specifically, to delegated authentication and generating interaction control lists and recommendations.

BACKGROUND

In network communication, devices can communicate with virtually any other devices. As a result, a device in a network environment needs ways to authenticate another device to determine the identity of the device attempting to establish communications. Spoofing or impersonation has been a challenge for network environments. Systems that are vulnerable to spoofing could allow malicious entities to gain trust and inflict damage to the network environment. Major security breaches need to be prevented in advance in the areas of email, Internet of things (IoT), cloud computing, social media, virtual private networks, etc. When spoofing is prevented, organizations can determine with assurances that a device is what it claims to be and may in turn make determinations on how to treat the device.

A system administrator may determine how devices under the operation of the administrator may respond to other authenticated devices. However, relationships among devices can become quite complex that is beyond the simple example of two-device direct interaction. There can be linear or non-linear multiple-device interactions that are involved. Those complex communication relationships have become increasingly common. For example, in the IoT space, a chain or system of sensors might work together to perform a certain function. Each sensor might have a different manufacturer or deployer. Similarly, in cloud computing, there is commonly a complex relationship between the platform provider and a customer of the platform who is a vendor for multiple businesses. The vendor may serve different end customers. The operation and management of those complex systems can be challenging.

BRIEF DESCRIPTION OF THE DRAWINGS

Figure (FIG.) 1A is a block diagram illustrating an example system environment, in accordance with some embodiments.

FIGS. 3C and 3D are conceptual diagrams illustrating a message authentication process using the third-party server, in accordance with some embodiments.

FIGS. 3E and 3F are conceptual diagrams illustrating an example of message authentication in edge computing, in accordance with some embodiments.

FIG. 5 shows how different example authentication contexts can be stored in a DNS record, in accordance with some embodiments.

FIG. 7 is a conceptual diagram that illustrates the distributive nature of blockchain records.

FIGS. 19A, 19B, 19C, 19D are flowcharts illustrating examples of the guided workflow plan, in accordance with some embodiments.

FIGS. 20A, 20B, 20C, 20D, and 20E are conceptual diagrams illustrating example graphical user interfaces that display various pages of an example guided workflow plan, in accordance with some embodiments.

Figure 1A:
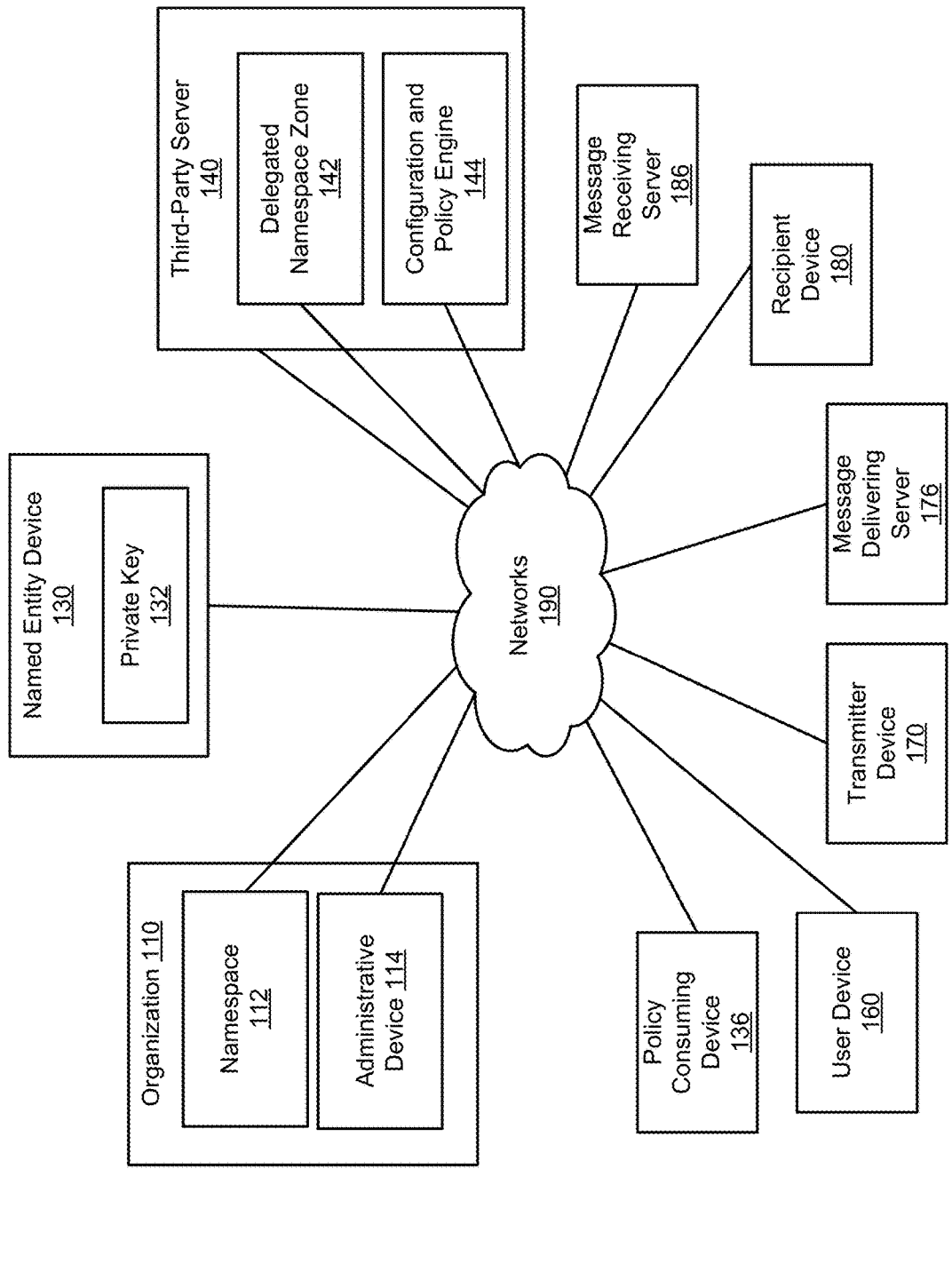
FIG. 1B is a block diagram illustrating an example flowchart for performing delegated authentication by a third-party server, in accordance with some embodiments.
FIG. 1C is a block diagram illustrating an example flowchart for generating interaction control lists by a third-party server, in accordance with some embodiments.
FIG. 1D is a block diagram illustrating an example flowchart for generating configuration recommendations by a third-party server, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An application environment may be a system that involves multiple devices that perform operations and interact with each other for certain purposes. Common examples of application environments include email systems, Internet of things (IoT) systems, cloud computing, etc. In order for a device to determine whether it can interact with another device for a certain action, the device may need to authenticate the other device.

In some embodiments, an application-operating organization may delegate a third-party server to serve as an automated contextual authentication responder. By way of example, the third-party server may receive, from the organization, one or more rules governing authentication of messages transmitted from a named entity that is associated with the organization. The third-party server is designated by the organization for managing part of the namespace of the organization. The named entity is identifiable by an identifier under the delegated namespace. The third-party server may receive an authentication query from a message recipient that attempts to authenticate a message transmitted from a transmitter device purportedly associated with the identifier of the named entity. The third-party server may determine, based on the identifier and the rules specified by the organization, a response to the authentication query. The third-party server may transmit the response to the message recipient. The response includes information that allows the message recipient to authenticate the message.

Upon authentication of other devices, a device in an application environment may need to determine whether it has the authorization to interact with the other device. The authorization of a device is often determined by the application-operating organization which may divide participant devices into different roles. The application-operating organization may set forth different interaction control policies that regulate the authorization of various participant devices in an application environment. In some embodiments, the application-operating organization may also delegate the management of device authorization policies to the third-party server.

By way of example, the third-party server may perform the determination and distribution of network interaction control lists, which govern the authorization of devices. In some embodiments, the third-party server may receive one or more policy settings from the organization. The third-party server may receive an authorization query from a policy consuming device. The authorization query may include an identity of a named entity device that sent a message to the policy consuming device and associated metadata about the message. The third-party server may determine the role of the named entity device specified in the one or more policy settings based on the identity and the associated metadata. The third-party server may generate an interaction control list based on the policy settings. The interaction control list includes information that specifies whether the named entity device is authorized to communicate with the policy consuming device. The third-party server may transmit the interaction control list to the policy consuming device as a response to the authorization query. The interaction control list causes the policy consuming device to react to the message based on the interaction control list.

In an application environment, while the application-operating organization may set forth various interaction control policies, in some cases new participant devices and existing devices may attempt to perform actions that are not specified in the existing interaction control policies. In some embodiments, the organization may delegate the third-party server to automatically determine the role of a device and generate interaction control policies that govern the device.

In some embodiments, the third-party server may receive a forwarded message or message metadata from a recipient device that receives an original message from a sender device that attempts to perform an action. The third-party server may determine, based on an identity of the sender device, that none of the one or more policies apply to the sender device. The third-party server may identify metadata of the sender device from the forwarded message or message metadata. The third-party server may determine the likely role of the device sender based on the metadata.

In some embodiments, the third-party server may provide a guided workflow to assist the organization to set up new interaction control policies to address the changes in the application environment. By way of example, the third-party server may maintain a plurality of guided workflow plans. The third-party server receives interaction reports associated with the organization. The interaction reports may include metadata of devices that interact with other devices. The third-party server identifies, based on the interaction reports, a particular device to which existing interaction control policies are inapplicable. The third-party server automatically searches for additional information about the particular device to determine the role of the device. In some embodiments, the searching is done by a recursive process. In turn, the third-party server provides a guided workflow for the organization to set up an applicable interaction control policy for the particular device.

Example System Environment

Referring now to figure (FIG.) 1A, shown is a block diagram illustrating an example system environment 100 of a process delegation system in which an organization may delegate various tasks to a third-party server that is specialized in performing the tasks, in accordance with some embodiments. Some of the tasks may include sender identification discovery, automated generation of policy recommendations, and setting up interaction control configuration through a guided workflow. The system environment 100 may include an organization 110, a named entity device 130, a third-party server 140 that performs various delegated tasks, a policy consuming device 136, a user device 160, a transmitter device 170, a recipient device 180, and networks 190. In some embodiments, the system environment 100 may also include a message delivering server 176 and a message receiving server 186. In various embodiments, system 100 may include different, additional or fewer components and entities. Also, in some situations, certain components' roles may overlap. For example, the named entity device 130 may serve as the policy consuming device 136, the user device 160, the transmitter device 170, message delivering server 176, the recipient device 180, or the message receiving server 186, depending on the situation. The functionalities of each element may be distributed differently among the elements in various embodiments.

While some of the components in the system environment 100 may at times be described in a singular form while other components may be described in a plural form, the system environment 100 may include one or more of each of the components. For simplicity, multiple instances of a type of entity or component in the system environment 100 may be referred to in a singular form even though the system may include one or more such entities or components. For example, in one embodiment, while the organization 110 and the named entity device 130 may be referred to in a singular form, the third-party server 140 may be a service provider that serves multiple organizations 110, each of which may be in communication with multiple named entity devices 130. Conversely, a component described in the plural form does not necessarily imply that more than one copy of the component is always needed in the environment 100.

An organization 110 may be any suitable entity such as a government entity, a private business, a profit organization or a non-profit organization. An organization 110 may define an application environment in which a group of devices organizes and perform activities and exchange information. The system environment 100 may include multiple organizations 110, which may be customers of the third-party server 140 that delegate certain tasks to the third-party server 140. For example, an organization 110 may delegate the policy management and generation of policy recommendations to the third-party server 140.

An organization 110 may have various resources that are under its control. Example resources include a namespace 112 and an administrative device 114. In some embodiments, some of the named entity devices 130 and some of the policy consuming devices 136 may also be part of the organization's resources. For example, some of the named entity devices 130 and policy consuming devices 136 may be controlled and operated by the organization 110.

In some embodiments, each organization 110 may be associated with its own namespace such as a domain (example.com). Some of the resources may be associated with a unique identifier under the namespace of the organization 110. For example, a device under the control of the organization having a domain example.com may have a DNS (domain name system) identifier (device1.example.com) for identification purposes. The device may be a named entity device 130, a policy consuming device 136 or both.

Figure 24:
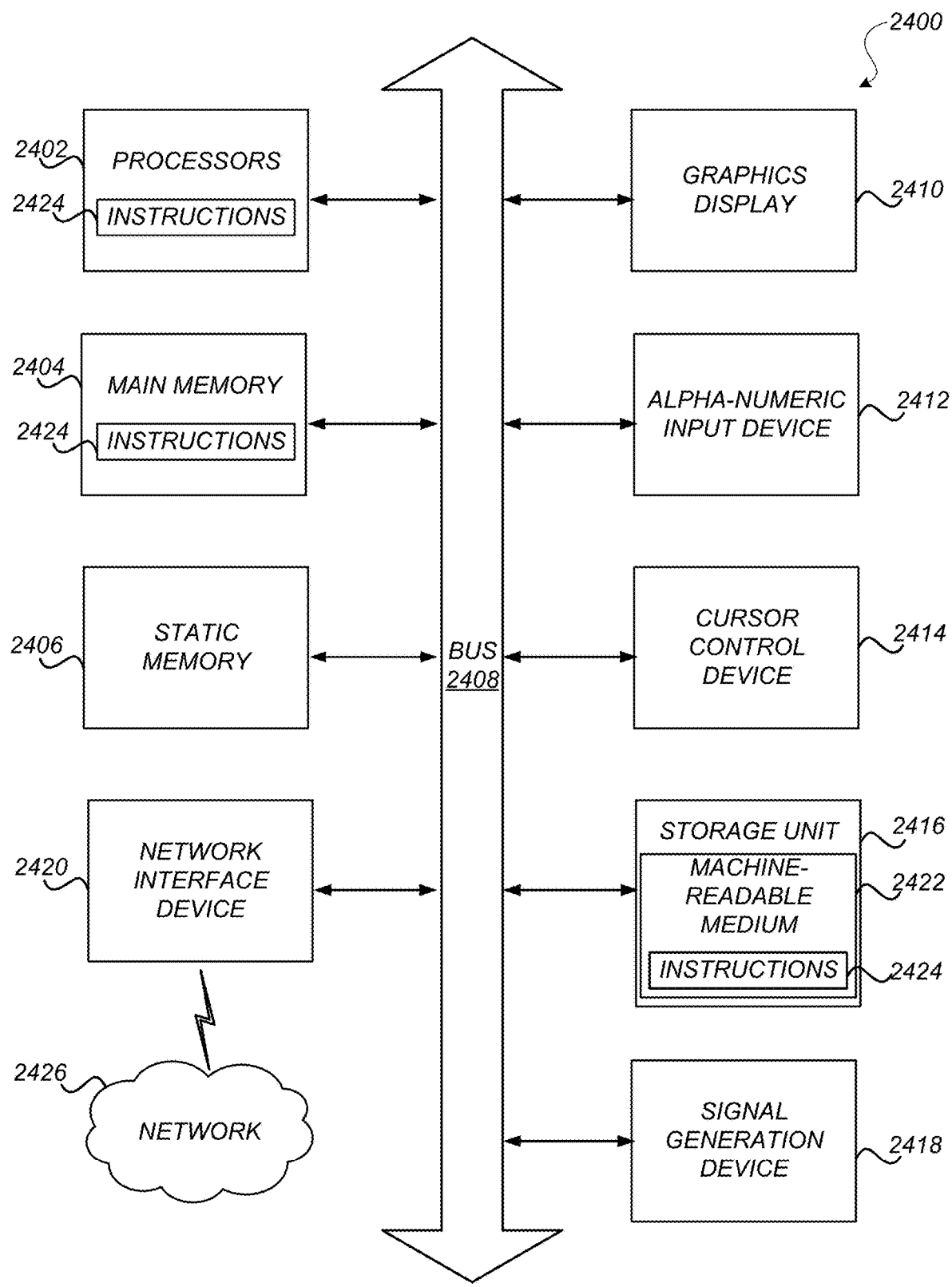
FIG. 24 is a block diagram illustrating components of an example computing machine, in accordance with some embodiments.

To manage its namespace 112, an organization 110 may include and control a namespace server. A namespace server can be a domain owner DNS server. For example, an organization 110 may operate a BIND (Berkeley Internet Name Domain) server. Some or all of the components of a namespace server is illustrated in FIG. 24. The namespace server for an organization 110 operates the namespace 112 of the organization 110 (e.g., the domain of the organization 110), but may delegate a section of the namespace to the third-party server 140. For example, DNS is a distributed system that includes many parties working together to provide a cohesive namespace for the Internet. Starting from the root servers, each branch of the DNS is controlled by a party who may delegate sub-sections of the namespace to other parties. A namespace 112 associated with an organization 110 may store DNS records for use in a DNS system, manage namespace for the domain name associated with the organization 110, delegate one or more sub-domains to other servers that can be authoritative, and answer queries about the namespace of the domain. A namespace 112 may store multiple DNS records for a particular domain, such as an A record (address record), MX record (mail exchange record), and so on.

By way of example, an organization 110 named "Example Corp" that operates various devices (each may be an example of a named entity device 130 and/or a policy consuming device 136) may have a website located at www.example.com. The "com" portion of the namespace is maintained by a top-level domain nameserver, which delegates (via a name server (NS) record) the management of the namespace "example.com" to Example Corp. Example Corp is responsible for maintaining the records under example.com, including www.example.com. Since the namespace may be many layers deep, Example Corp may organize its device identities under a specific branch of the DNS, such as "_devices.example.com". A pattern for identifying devices by serial and model, organized under the namespace example.com, may be serial.model._devices.example.com, or 123.sensor._devices.example.com.

In some embodiments, an organization 110 may divide different branches of its namespace for different types of entities and devices. For example, natural persons may be under the namespace_persons.example.com while devices are under the namespace _devices.example.com. In another approach, the named entities may be assigned to a single branch, such as authentication.example.com. The wording used in the namespace can be arbitrary and does not always need to correspond to or have any relationship with the type of the named entity device 130.

DNS provides various types of records, including name-to-IP address resolution. DNS also has the ability to host specialized record types for public keys and certificates (DANE (DNS-based Authentication of Named Entities) or TLSA (transport layer security authentication) record type, RFC 6698). DKIM (Domain Keys Identified Mail) (RFC 6376) is another type of record that puts public keys in freeform TXT records.

An organization 110 may include one or more administrative devices 114 that manage the resources and namespace of the organization 110. Some or all of the components of an administrative device 114 is illustrated in FIG. 24. An administrative device 114 may be operated by an administrator, whether it is a robotic agent or a natural person. An administrative device 114 may manage identity records of named entity devices 130 and policy consuming devices 136 that are associated with the organization 110. An administrative device 114 may also manage the configuration of various tasks that may be delegated to the third-party server 140, such as secure message distribution, encrypted device update distribution, namespace management, authentication services, policy management, and policy recommendations, which may be performed by various engines discussed in further detail in FIG. 2. For example, an administrative device 114 may provide configuration settings to the third-party server 140 to allow the third-party server 140 to manage configurations on behalf of the organization 110 and recommend new or modified configurations to address changes in the application environment. An administrative device 114 may also change the settings associated with various components and resources in the organization 110.

An organization 110 may create an application environment for various devices to perform activities and interact with each other. The application environment in this context may be distinguished from software applications (software programs) that may also be mentioned in this disclosure. An application in this context may be a system that involves multiple participants that may authenticate and trust one another. The participants may perform certain common operations and interact with each other. Certain actions may be autonomous or may be decided by individual participants, while other actions may be defined by the policies set forth by the organization 110. A participant device may communicate with the third-party server 140, which is delegated by the organization 110 to manage the policies of the organization 110. Participant devices of an application environment may include named entity devices 130 and policy consuming devices 136. Some of the devices may serve both roles. Examples of application environments may include distributed applications with clients and servers, sensor and actuator systems, camera systems, email systems, cloud computing systems, and recording systems. Other systems are also possible.

In the system environment 100, there can be multiple independent organizations 110, each of which may be in communication with various kinds of named entity devices 130. Various organizations 110 may be of different natures and provide different products and services to their customers. The organizations 110 may be customers of the third party which operates the third-party server 140 and may delegate the third-party server 140 to perform different tasks to various extents. Each organization 110 may specify a different set of rules and policies in controlling how the third-party server 140 behaves when performing the delegated tasks. The rules and policies may be related to authentication and authorization.

A named entity device 130 may be a device that is associated with a named entity that has one or more identity records on the Internet. The identity records are often stored and published in a namespace system such as DNS. An entity may be a natural person with a smartcard-based identity, a device with a private key, or an instance of an application, service, or microservice with a name in the DNS. The identity record may include the identity information of the named entity device 130 or a version of the identity (such as the hash of the identity) to preserve the privacy of the named entity associated with the named entity device 130. Examples of named entities may include natural persons (e.g., employees, outside contractors, administrators), properties, Internet of things (IoT) devices, equipment, machines, virtual objects, software applications, services, services, or any suitable objects or concepts that have names for identification. The named entity device 130 may be controlled manually by a person or autonomously by a machine.

By way of example, a named entity device 130 may be a roadside beacon (which may be an IoT device) with an identity record in a DNS zone. The roadside beacon may broadcast signed messages that provide warnings of dangerous road conditions to autonomous vehicles. In this case, an organization 110 may be a traffic regulating entity that also receives messages from the roadside beacon. In another example, a named entity device 130 may be a smart-home appliance that can automatically order an item from a retailer, which is another example of an organization 110. In a third example, a named entity device 130 may be a user device 160 that has a registered account with an organization 110. The implementations and use cases of the environment 100 are not limited to the explicit examples discussed in this disclosure.

Various named entity devices 130 may have different relationships with an organization 110 and may establish connections with more than one organization 110. In one example, a named entity device 130 may be made and operated by an organization 110. For example, an industrial organization may operate various sensors in a facility. The sensors may each be an IoT device that is an example of a named entity device 130. In the cases where a named entity device 130 is part of an organization's resources, the named entity device 130 may be associated with an identity record under the namespace of the organization 110. For example, the named entity device 130 may be associated with a unique identifier "123424.sensor._devices.example.com", controlled by the organization 110 Example Corp. In some cases, a named entity device 130 is not part of the organization 110 but may communicate with a policy consuming device 136 that is under the control of the organization 110 or that acts under one or more policies set forth by the organization 110. A named entity device 130 may be registered with the organization 110 and has one or more roles associated with one or more policies set by the organization 110. For example, a sensor may be registered with the organization 110 as an authorized sender to provide data to autonomous vehicles' computing devices (examples of policy consuming devices 136) that are controlled by or otherwise associated with the organization 110.

A named entity device 130 may have some or all of the components of an example computing device illustrated in FIG. 24. The types of components equipped in a named entity device 130 may vary, depending on its type. A named entity device 130 may be a server computer, a personal computer, a portable electronic device, a wearable electronic device, an IoT device (e.g., a sensor), smart/connected appliance (e.g., a refrigerator), dongle, etc. An IoT device may also be referred to as an Internet-connected device or a network-connected device. The processing power of named entity devices 130 may vary and may be limited for certain types. For example, certain specialized IoT devices may be low-power devices that have limited processing power to reduce cost and power consumption. Certain specialized IoT devices may also be pre-programmed with certain computer code that enables the devices to communicate using certain communication protocols (e.g., Narrowband IoT or RFCOMM (radio frequency communication) over Bluetooth, but not a complete Internet protocol suite.)). In some embodiments, some IoT devices may include a memory that can store a limited set of basic instructions, but may not have sufficient computing capability to dynamically determine context-specific policies for a given situation. Those devices may rely on another device such as the third-party server to perform computations dynamically for the devices.

In some embodiments, a named entity device 130 may include a private key 132 and a corresponding public key that are generated based on PKI (public key infrastructure). The private-public key pair may be used to authenticate the named entity device 130. For example, the named entity device 130 may generate a digital signature by encrypting a message sent from the named entity device 130 using the private key 132. A party in communication with the named entity device 130 may authenticate the message sender using the public key of the named entity device 130. The private-public key pair may also be used to encrypt messages to be sent to the named entity device 130. For example, the message may be encrypted with the public key of the named entity device 130 and the device, upon receipt of the encrypted message, may use the private key to decrypt the message.

The public key may be saved in a publicly accessible source such as a namespace server (e.g., DNS). For example, the public key may be stored on the named entity device 130 and published in a namespace record (e.g., DNS record) at a location which may be referred to as the device identity name. In some embodiments, both the private key 132 and the corresponding public key are saved in the named entity device 130. The private key 132 may be saved in a hardware secure element of the named entity device 130 such as a TPM (trusted platform module). The hardware secure element safeguards the private key 132 and performs encryption and decryption functions. The hardware secure element may be a secure cryptoprocessor chip. In some embodiments, the safeguard of the private key 132 and the cryptographic functions may also be performed by software.

The third-party server 140 is a computing server that provides various services on behalf of the organization 110 and the named entity device 130. The third-party server 140 may also be referred to as a delegated server, a computing server, a third-party service provider, or 3PSP. The term "third party" may be viewed from the perspective of the organization 110, which may delegate certain tasks and services to another company (a third-party company), which has the expertise to perform the tasks and services. For example, the organization 110 may be a customer of the third-party server 140. The services provided by the third-party server 140 may include managing policies for an organization 110, recommending new policies to an organization 110, authentication responses on behalf of organizations 110, policy distribution on behalf of organizations 110, secure software distribution to named entity devices 130, secure information distribution to policy consuming devices 136, and other tasks that may be authentication and authorization of various named entity devices 130 and policy consuming devices 136, such as IoT devices. Various services provided by the third-party server 140 may take the form of SaaS (Software as a Service). In one embodiment, an organization 110 may integrate certain processes or services provided by the third-party server 140 via an API (application programming interface), which allows the third-party server 140 to inspect some of the messages directed to or in transit in the organization 110 and enables the third-party server 140 to apply various policies after receiving the messages. Some examples of services that may be performed by the third-party server 140 are discussed in further detail below with reference to FIG. 2.

Some or all of the components and hardware architecture of a third-party server 140 are illustrated in FIG. 24. The third-party server 140 may be a server computer that includes software that is stored in memory and one or more processors (general processors such as CPUs, GPUs, etc.) to execute code instructions to perform various processes described herein. The third-party server 140 may also be a pool of computing devices that may be located at the same geographical location (e.g., a server room) or be distributed geographically (e.g., cloud computing, distributed computing, or in a virtual server network).

The third-party server 140 may maintain a namespace zone 142 that is delegated by an organization 110. The namespace zone 142 may be referred to as a delegated namespace zone 142. The delegated namespace zone 142 may be a section of the namespace 112. The third-party server 140 provides management and maintenance of that section of the namespace. An example delegated namespace zone 142 may be a delegated DNS zone that is hosted by the third-party server 140 on behalf of the organization 110. For example, an organization 110 with the domain "example.com" may delegate the zone of "_devices.example.com." to the third-party server 140 for the third-party server 140 to manage the identity records of certain devices of the organization 110. The delegated namespace zone 142 may include a database that stores identity records of various named entity devices 130.

While in this disclosure the namespace of an organization 110 is described using domain names as examples, other forms of the namespace are also possible. For example, the namespace may be in the form of a file path, XML, Java namespace, uniform resource name, network addresses (e.g., MAC addresses, IP addresses), and other suitable namespace formats. An organization 110 may also design a customized namespace. Various blockchains may also support different namespace formats and the namespace may be reserved for an organization 110 and recorded on a block of the blockchain.

The third-party server 140 may include a configuration and policy engine 144. The configuration and policy engine 144 may determine rules for various participants in an application environment and may also work with an enrichment engine to generate one or more new policy recommendations for the organization 110. The policy recommendations may be generated in the course of managing the operation of an application environment that is governed by the policies of the organization 110. The third-party server 140 may identify new devices and entities and automatically determine the potential rules that should apply to those new devices. A policy may be defined and initiated by an organization 110. A policy related to how devices interact with each other may be referred to as an interaction control policy. An organization 110 may transmit the policy setting to or configure the policy setting at the third-party server 140. The configuration and policy engine 144 translates the policy setting to one or more interaction control lists to be distributed to various policy consuming devices 136. Interaction control lists may be a set of rules that define what devices are authorized to interact with a policy consuming device 136 and define how the policy consuming device 136 may behave in certain situations. The configuration and policy engine 144 may determine dynamically one or more context-specific policies that are applicable to a policy consuming device 136. The configuration and policy engine 144 may transmit the determined policies to the policy consuming device 136 as an interaction control list. The distribution of the interaction control list may be through direct communication, such as a message payload to be sent to a policy consuming device 136, or via a namespace record. For example, the interaction control list, encrypted or not, may be posted on a DNS record for devices to download. To allow the third-party server 140 to communicate with a wide variety of devices, the interaction control list may be packaged in a well-known or standardized format.

A policy consuming device 136 may be a device associated with a policy consumer that consumes an interaction control list provided by the third-party server 140. A policy consumer is an entity that consumes policy from the third-party server 140. A policy consuming device 136 may be a named entity device 130 but may also be an anonymous device. Also, a policy consumer may be an entity under the direct control of an organization 110 or an entity managed by an unrelated party, with an identity in a managed namespace, like the DNS. The policy consumer may also be a member of the general public, and not represented by a specific named identity. A policy consumer may be the policy consuming device 136 itself but may also be a part of the policy consuming device 136 that is anonymous. For example, a browser plugin may be a policy consumer that receives interaction control lists but does not have an identity.

Various policy consuming devices 136 may have different relationships with one or more organizations 110 in various situations. In one case, some of the policy consuming devices 136 may be part of the resources of an organization 110. For example, the organization 110 may be a sensor operator that controls a number of sensors in an application environment. In another case, a policy consuming device 136 may be a device whose management falls under a different organization 110 that is not the organization that operates the application environment. For example, an application environment of a podcast system may include a phone and an automobile as participants. The phone may be managed by a phone company and the automobile may be managed by a car manufacturer while the application environment may be managed by a third organization 110 that operates the podcast system. In yet another case, a policy consuming device 136 may be associated with multiple organizations 110 and participate in more than one application. For example, an autonomous vehicle may serve as a policy consuming device 136 that subscribes to a traffic light data service operated by a local government, to traffic and road condition data operated by a real-time traffic conditions provider, and to weather service operated by a private company. Each application environment (e.g., traffic light data, weather service) may have its own rules in terms of authentication and authorization on whether the autonomous vehicle may or may not receive or transmit certain data.

The system environment 100 may also include character-specific devices such as a user device 160, a transmitter device 170, a message delivering server 176, a recipient device 180, and a message receiving server 186. Each of these devices may be a named entity device 130 and/or a policy consuming device 136.

A user device 160 is a computing device that may transmit and receive data via the networks 190. Some or all of the components of a user device 160 is illustrated in FIG. 24. The user device 160 also may be referred to as a client device or an end user device. Various user devices 160 may belong to different parties or may be associated with individual end users. Administrative devices 114, transmitter devices 170, and recipient devices 180 may also be examples of user devices 160. A user device 160 includes one or more applications and user interfaces that may communicate visual, tactile, or audio elements of the applications. The user devices 160 may be any computing devices. Examples of such user devices 160 include personal computers (PC), desktop computers, laptop computers, tablets (e.g., iPADs), smartphones, wearable electronic devices such as smartwatches, or any other suitable electronic devices.

A user may be personnel, an expert, an outside contractor, a customer, or otherwise an end user associated with an organization 110 or someone who is unrelated to any organization 110. The user also may be referred to as a client or an end user and may control a named entity device 130. A user, through a user device 160, may communicate with other components in the system environment 100 in various suitable ways. For example, a user device 160 may include a user-side software application provided by an organization 110 or the third-party server 140. The user device 160 may interact with those components using a graphical user interface (GUI) of the software application. For example, an administrator (an example of a user) may specify the configurations of the authentication rules using a GUI of an application provided by the third-party server 140. An application may be a web application that runs on JavaScript or other alternatives. In the case of a web application, the application cooperates with a web browser to render a front-end interface. In another case, an application may be a mobile application. For example, the mobile application may run on Swift for iOS and other APPLE operating systems or on Java or another suitable language for ANDROID systems. In yet another case, an application may be a software program that operates on a desktop computer that runs on an operating system such as LINUX, MICROSOFT WINDOWS, MAC OS, or CHROME OS. In other cases, a user may communicate with the third-party server 140 by causing an administrative device 114 of an organization 110 to communicate directly to the third-party server 140, for example, via features such as Application Programming Interface (API) or like technologies such as webhooks. In other cases, a user device 160 may be a transmitter device 170 or a recipient device 180. For example, end users may send messages to each other and the messages may be authenticated through information provided by third-party server 140.

In the system environment 100, a transmitter device 170 and a recipient device 180 may be respectively the message transmitter and the message recipient. Messages are not limited to a particular type or format. Messages can be emails, text messages, instant messages, social media messages (e.g., FACEBOOK messages, posts, and TWEETS), RSS feeds, push notifications, Internet packets, data link frames, or any suitable data payloads. Messages may also include data or executable instructions such as software updates, firmware updates, and device configuration data or files. A message described in this disclosure does not always need to be a human-readable or machine-readable text string or communication. A message may also be information represented in a computer-readable form. A message may be a block of data, a payload, an executable set of instructions, human-written text, or any other suitable information that may be carried by one or more packets, data frames, or other suitable units of data, with or without control information, structured or unstructured, encrypted or not, and indexed or not. In some cases, if a message is sent from a named entity device 130, the message may bear the signature of the named entity device 130. Likewise, if a data payload is sent from the third-party server 140, the data payload may be transmitted with the signature of the third-party server 140 for authentication purposes.

Various transmitter devices 170 may be anonymous or may be named entity devices 130 whose identities are defined under different domains or sub-domains. A transmitter device 170 may be an example of named entity device 130 that is under the control of an organization 110. Messages sent from this transmitter device 170 may be authenticated based on the rules set by the organization 110. For transmitter devices 170 that are controlled by an organization 110 that has a domain, e.g., example.com, the identifiers of the transmitter devices 170 may be under the sub-domain such as _devices.example.com, whose namespace may be delegated to the third-party server 140. Hence, when a recipient device 180 receives a message, the recipient device 180 may send an authentication query to the namespace server associated with the organization 110. The third-party server 140 may operate part of the namespace related to _devices.example.com on behalf of the organization 110. In some embodiments, if a device is communicating with the third-party server 140, the third-party server 140 may also take the roles of transmitter device 170 and recipient device 180.

In some embodiments, a transmitter device 170 and a recipient device 180 may not transmit or receive messages directly through the networks 190. Instead, a message delivering server 176 and a message receiving server 186 transmit and receive messages on behalf of the devices. For example, in the setting of email communications, the message delivery server 176 sends emails on behalf of the transmitter device 170. The message delivery server 176 may include one or more computing systems, which may be configured similarly to the computing system described with reference to FIG. 24. As an example, the message delivery server 176 may be a mailing list server, a bulk mailer provider that sends emails on behalf of a domain, a transactional email system managed by a third-party that sends emails on behalf of a domain, or a security system that scans emails on behalf of a domain. The message delivery server 176 may send the email instead of the named entity device 130 so that the message delivery server 176 may provide additional processing or functionality to the email. In one embodiment, the email sender 114 uses standard mail protocols, such as Simple Mail Transfer Protocol (SMTP). SMTP supports various features. U.S. Pat. No. 9,762,618, entitled "Centralized Validation of Email Senders via EHLO Name and IP address Targeting," patented on Sep. 12, 2017, is incorporated by reference for all purposes. Likewise, in the setting of email communications, a message receiving server 186 may be an email server on the recipient end.

In the setting of IoT device communications, some IoT devices may be equipped with long-range communication capabilities such as LTE or 5G so that the devices can communicate with each other, with transmitter devices 170, and the third-party server 140 directly through the Internet. On the other hand, in some embodiments, some IoT devices may only be equipped with limited communication capability that is confined to a smaller area such as a local area network. In those cases, the IoT devices may rely on message brokers for the communications with transmitter devices 170 and the third-party server 140. In such cases, various message brokers may be examples of message delivering servers 176 and message receiving servers 186.

In various embodiments in this disclosure, for simplicity and unless otherwise specified, the communication between a transmitter device 170 and a recipient device 180 may be described as a message transmitter or a message originator transmitting a message to a message recipient. This description should include the situation where a transmitter device 170 directly sends a message to a recipient device 180 and the situation where a message delivering server 176 and a message receiving server 186 are involved (e.g., in the context of email communication). The authentication may be performed at the recipient device 180 and/or at the message receiving server 186. For simplicity, a message recipient may refer to a policy consuming device 136, a named entity device 130, a recipient device 180 or a message receiving server 186, depending on the situation and the communication protocol used in transmitting the message. A message recipient may also be referred to as an authenticator. Likewise, a message transmitter may refer to a named entity device 130, a transmitter device 170 or a message delivering server 176. In the context of policy consumption, a message transmitter may be a named entity device 130 and a message recipient may be a policy consuming device 136. If the message recipient transmits a second message to another recipient, the first message recipient may be referred to as a named entity device 130 and the second message recipient may be referred to as a policy consuming device 136.

The networks 190 may include multiple communication networks that provide connections to the components of the system environment 100 through one or more sub-networks, which may include any combination of local area and/or wide area networks, using both wired and/or wireless communication systems. In one embodiment, a network 190 uses standard communications technologies and/or protocols. For example, a network 190 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 190 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 190 may be represented using any suitable format, such as hypertext markup language (HTML), extensible markup language (XML), JavaScript object notation (JSON), structured query language (SQL). In some embodiments, all or some of the communication links of a network 190 may be encrypted using any suitable technique or techniques such as secure sockets layer (SSL), transport layer security (TLS), virtual private networks (VPNs), Internet Protocol security (IPsec), etc. The network 190 also includes links and packet switching networks such as the Internet. The network 190 may be any communication network that transmits data and signals by any suitable channel media such as wire, optics, waveguide, radio frequency, ID badge with a QR (quick response) code, infrared, or any suitable electromagnetic media. The network 190 may also be a direct communication between two devices. The network 190 can be in any topologies, such as point-to-point, star, mesh, chain, bus, ring, and any other suitable, regular or irregular, symmetric or not, cyclic or acyclic, fixed or dynamic (e.g., certain devices moving) topologies.

Overview of Various Example Processes

Figure 1B:
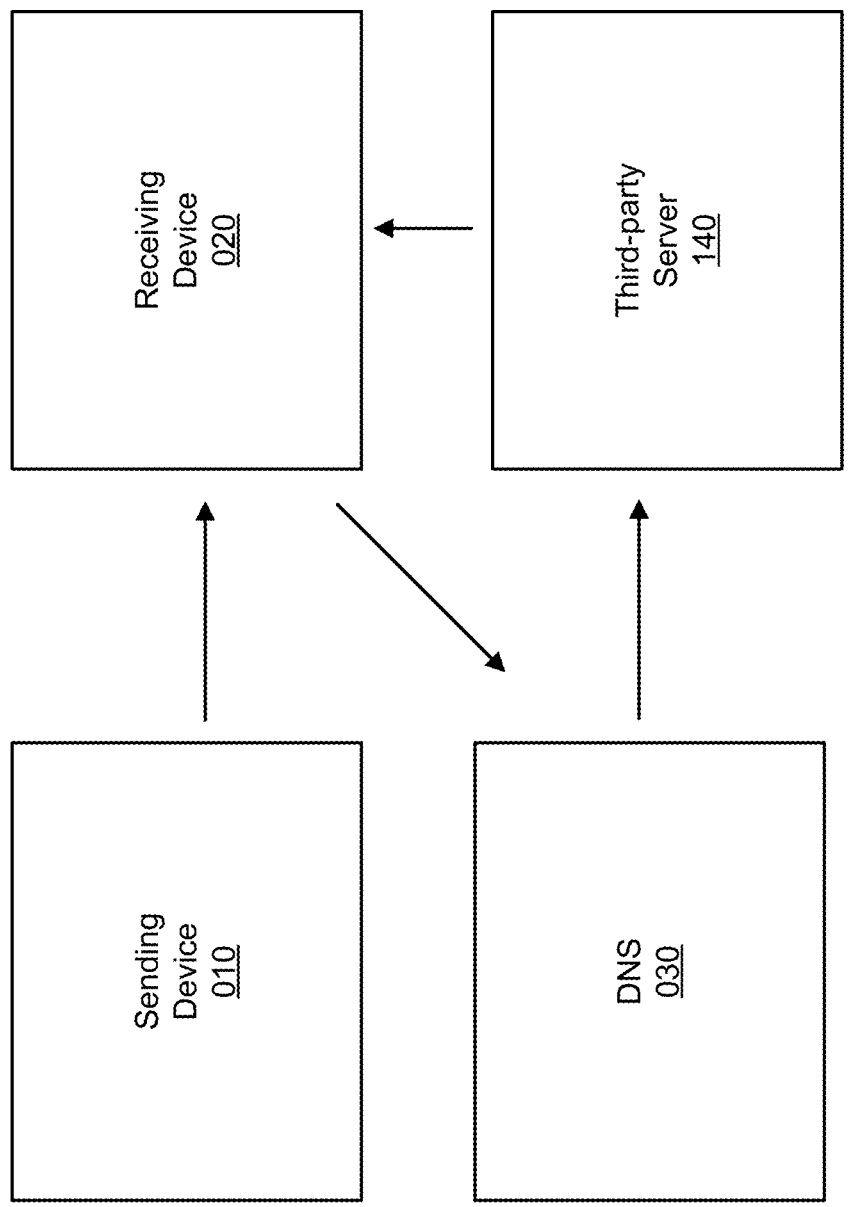
Figure 1C:
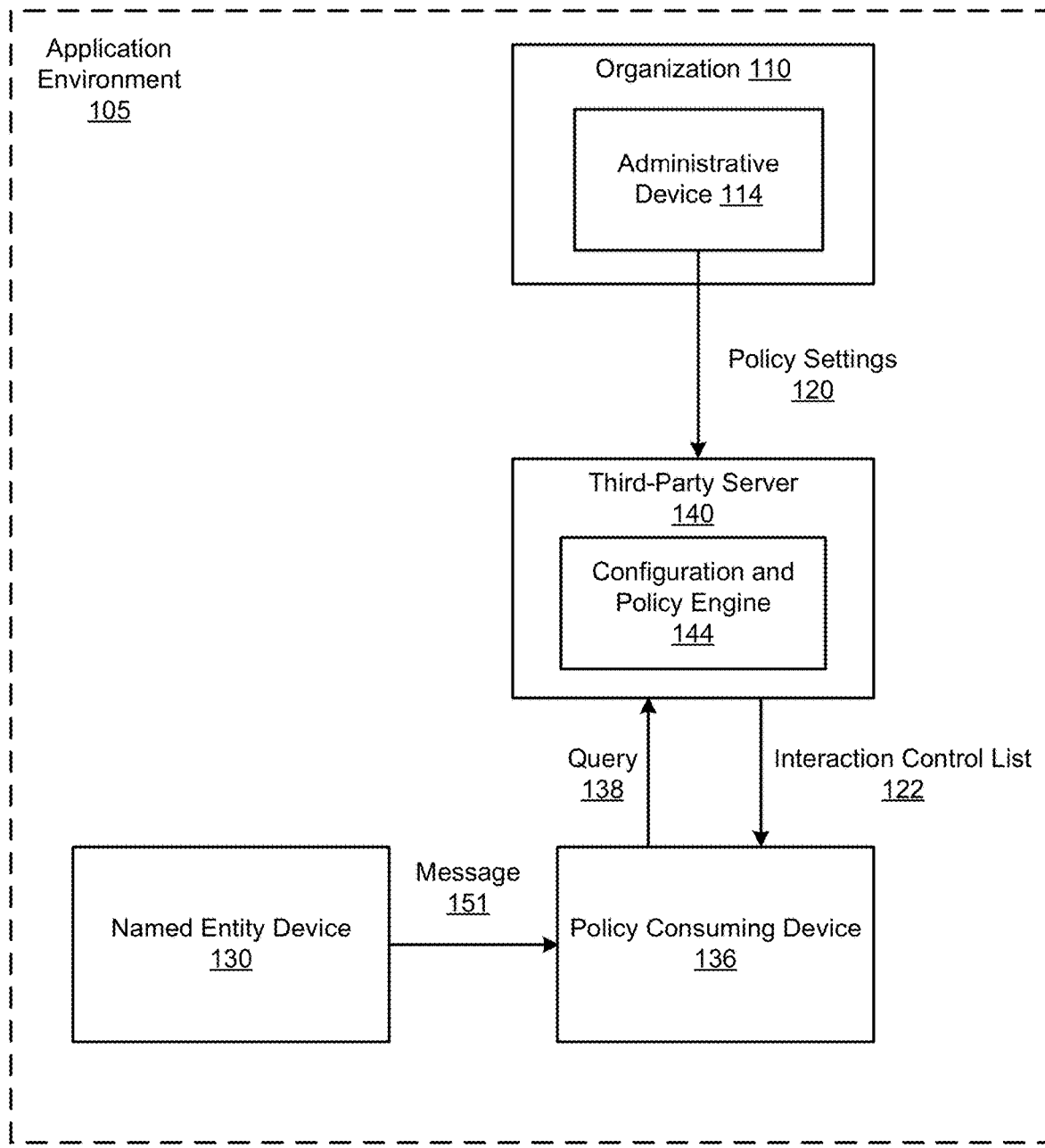
Figure 1D:
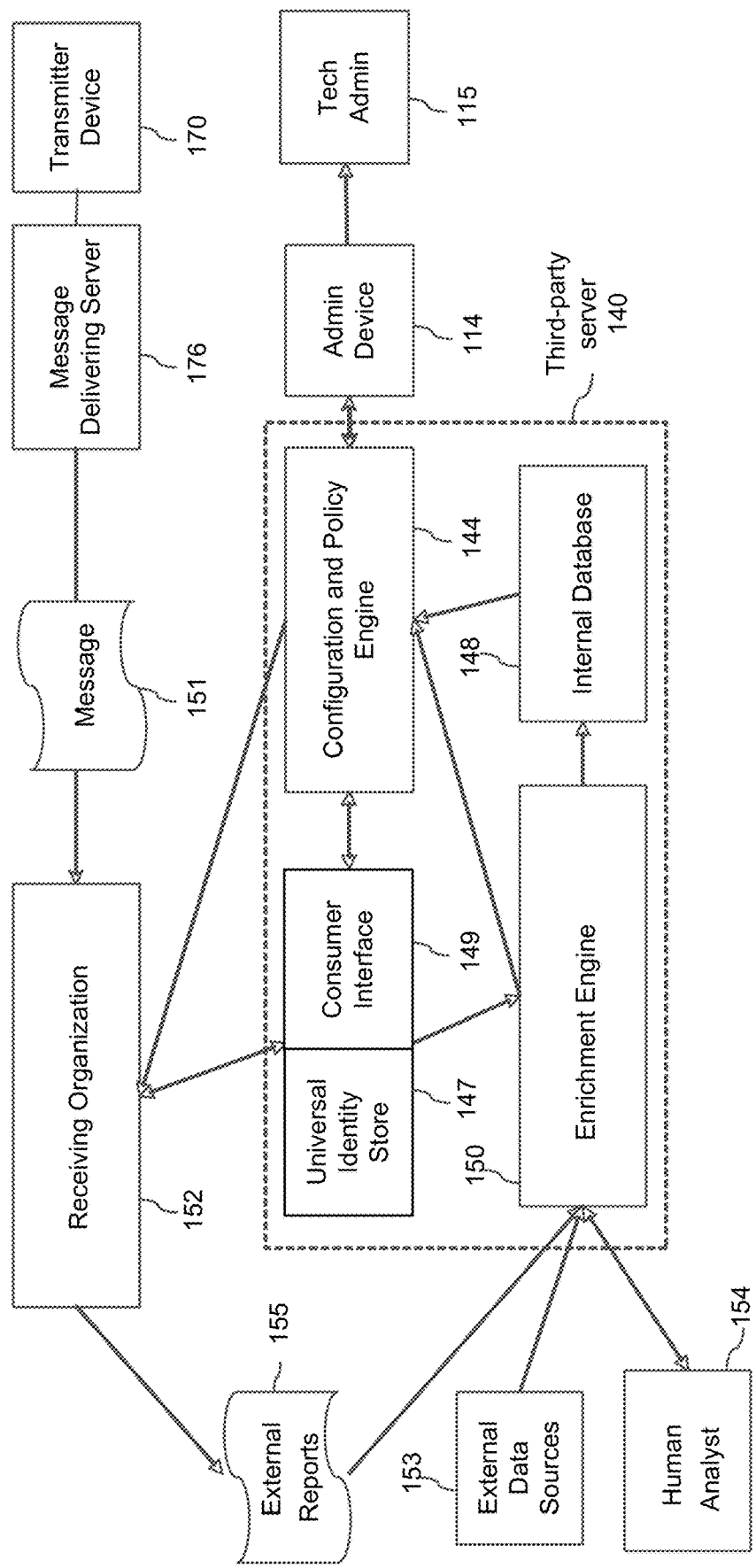

FIGS. 1B, 1C, and 1D are block diagrams illustrating the overview of various example processes associated with the third-party server 140, in accordance with some embodiments. FIG. 1B illustrates a delegated and automated authentication responder and contextual authentication processes that may be performed by the third-party server 140. FIG. 3A through 9B illustrates various examples related to the delegated and automated authentication responder. FIG. 1C illustrates a network interaction control list determination and distribution process, which may be performed by the third-party server 140. FIG. 10 through 15B illustrates various examples related to the interaction control list determination and distribution process. FIG. 1D illustrates an automatic role determination and interaction control policy recommendation process in an application environment. FIG. 16 through 23 illustrates various examples related to the automatic role determination and interaction control policy recommendation process.

Referring to FIG. 1B, a block diagram illustrating an example delegated authentication process is shown, in accordance with some embodiments. The process described in FIG. 1B is related to anti-impersonation technology and identity-secured messaging to enable verification and authentication processes such as allowing a device to prove an identity and providing a mechanism for the device to show that a communication message is legitimately from the device. According to some embodiments, a communicating organization 110 can assert its responsibility for messages sent on its behalf, and decline responsibility for those messages that do not authenticate, regardless of the complexity of communication messages.

In some embodiments, the third-party server 140 puts the credentials in place for client organizations 110 and answers queries of veracity from various third parties at scale. This provides benefits such as that (1) delegation can be repeated, therefore the authentication and trust can be provided for subgroups; (2) the cryptography can become agile because the third-party server 140 can provide stronger and better keys, frequent rotation, quantum-safe new algorithms, etc.; and (3) revocation can occur instantly, which has historically been extremely difficult with PKI (Public Key Infrastructure).

In some embodiments, the third-party server 140 provides a public-delegable authentication service for organizations 110 involved in any business arrangements, using any methods of communication, and subject to any context. For example, in one embodiment, a portion of DNS is delegated to the third-party server 140, which in turn manages authentication on behalf of the organization 110 using said delegation.

In FIG. 1B, a device 010 (an example message transmitter) belonging to an organization 110 sends a message to a device 020 managed by a message recipient. The message transmitter signs the message with its private key. The corresponding public key is stored in a distributed database, such as DNS 030, in this example—and managed by the third-party server 130. One or more contextual conditions constraining the messages sent using these keys is stored in DNS 030 and managed by the third-party server 130. When the recipient device 020 receives the signed message from the transmitter device 010, the recipient device 020 queries DNS 030 for the public key or another type of identity record 146. The third-party server 130 checks whether contextual conditions have been set by the organization 110, and whether those conditions have been satisfied. If the conditions have been satisfied, the third-party server 130 delivers certain authentication information (e.g., some of the identity records 146) to the recipient device 020, which then authenticates the message. In some embodiments, the third-party server 130 may provide an oriented API or web user interface which simplifies the process of establishing identity, even to the point that human interaction is altogether eliminated.

Various delegated authentication processes, such as authenticating contextual information, may be performed by the delegated namespace zone 142 and the delegated authentication service engine 210, which will be discussed in further details in association with FIG. 2.

Referring to FIG. 1C, a block diagram illustrating an example process of determining message authorization in an application environment 105 is shown, in accordance with some embodiments. An application environment 105 may be created by one or more organizations 110 and includes various participants that have different roles in performing certain operations or simply interacting with each other. The organizations 110 set forth computer-implemented policies defining certain rules on how the participants should operate in the application environment 105. The third-party server 140 carries out the distribution of the policies on behalf of one or more organizations 110. The payload of the policy to be transmitted to a policy consuming device 136 may take the form of an interaction control list.

At a high level, a policy consuming device 136 receives a message 151 from a named entity device 130. The policy consuming device 136 needs to decide whether it has the authorization to interact with the named entity device 130 in order to act on message 151. The policy consuming device 136 is guided in this decision by the configuration and policy engine 144. The process may include a configuration phase and a message phase. The configuration phase may include an organization 110 communicating a policy setting 120 to the third-party server 140. In the message phase, the policy consuming device 136 gets its policy information from the configuration and policy engine 144, and in certain circumstances, may make ad-hoc queries against the configuration and policy engine 144 in order to determine whether or not the message the policy consuming device 136 has received from the named entity device 130 is authorized from processing. If the message's source identity can be authenticated and the source identity and message context meet the authorization criteria according to the interaction control list, the message will be processed. If the message does not fit the authorization criteria, it may be discarded or reported.

The interaction control policy, maintained in the configuration and policy engine 144, describes the interaction between entities, which may involve some storage or computation offloading. For example, a policy consuming device 136 might be the target of communication from a named entity device 130, but this particular policy consuming device 136 lacks either or both of the storage necessary for reading the policy, or the computational power to process the policy. In this case, the policy consuming device 136 would rely on its direct communications with others and request for storage and computation. The embodiment may be implemented in edge computing, which places a summarization layer in the field between the devices which generate information and the Cloud.

For a policy consuming device 136 to properly react to a message sent from a named entity device 130, authentication and authorization may be performed. Authentication verifies the identity of a message transmitter and confirms that the message transmitter is the party that the message transmitter claims to be. The authentication may be performed through verifying the message transmitter's digital signature. For example, a message 151 may include a digital signature of the named entity device 130. In receipt of the message 151, the policy consuming device 136 uses the public key of the named entity device 130 to verify that the named entity device 130 is in the possession of the private key, thereby authenticating the named entity device 130. The policy consuming device 136 may retrieve the public key of the named entity device 130 by different methods, such as from an organization 110 or via a delegated namespace managed by the third-party server 140, as discussed in FIG. 1B.

In contrast to authentication, which verifies the identity of a message transmitter, authorization verifies that the message transmitter with a known identity has the authority to send the message or the message recipient should react to the message given the identity of the sender. A named entity device 130, which sends a message 151, may be associated with one or more roles in the application environment 105. For some messages or situations, two participating devices may be free to interact. However, for other messages, the policy consuming device 136 may verify the authorization of the named entity device 130 before reacting to the message 151. For example, in a traffic system, the named entity device 130 may be a sensor that transmits sensor data. The policy consuming device 136 may verify that the sensor is authorized to transmit the sensor data in a given situation before relying on the sensor data. One or more organizations 110 may set the policies on the roles and rules of various participants to define which participants have the authority to carry out certain actions in various situations. The policy consuming device 136 relies on the interaction control list 122 to determine the authority of the named entity device 130. The interaction control list 122 may also include data or instructions specifying how the policy consuming device 136 should react to the message 151.

Referring to FIG. 1D, a block diagram illustrating an example flowchart for generating configuration recommendations by a third-party server 140 is shown. The flowchart may correspond to a configuration recommendation process performed in an application environment that is governed by one or more configuration settings set forth by an organization 110, which may delegate the configuration management and recommendation generation to the third-party server 140. The configurations are usually in compliance with one or more interaction control policies. A transmitter device 170 may also be referred to as a message originator. The transmitter device 170 may be affiliated with an organization, which may or may not be the same as the message delivering server 176 (e.g., a sending service) or a receiving organization 152. The transmitter device 170 sends a message 151 using message delivering server 176 (which may be a contracted organization acting on behalf of the transmitter device's organization or a service of the organization), to the receiving organization 152. The receiving organization 152 consults the configuration and policy engine 144—such as by way of the consumer interface 149—for determining, among other things, whether the message is authenticated, whether the message delivering server 176 is authorized to send the message or to perform an attempted action subsequent to the message, whether there is an existing interaction control policy applicable to the situation, and whether the existing configuration needs to be modified.

Configurations related to interaction control are various settings in an application environment that are used to achieve one or more interaction control policies set forth by an organization 110. An application environment, such as in an email and an IoT setting, may involve parties and devices that interact with each other according to policies defined by the operating organization of the environment. Configurations may be of different types and natures to achieve an interaction control policy. For example, an interaction control policy may be a concept that defines how a broad category of devices may act in an environment. One or more configurations may be set to achieve the policy. In one embodiment, a specific example of a policy may define whether a role is authorized to interact with a transmitter device 170 after the transmitter device 170 has been authenticated. More specifically, the transmitter device 170 may attempt to interact with a message recipient. Based on one or more message exchanges, the message recipient has authenticated the transmitter device 170. A policy may define whether or how the message recipient should interact with the authenticated transmitter device 170. A policy setting may be translated into an interaction control list to be sent to the message recipient to provide an instruction to the message recipient on whether or how the message recipient should act. Different configurations may be implemented to achieve the policy. For example, the configurations may set forth procedures in determining whether a device should be classified to the role set forth by the policy, how the transmitter device 170 should be authenticated, etc.

The messages 151 received by the receiving organization 152 are parsed by the configuration and policy engine 144 in accordance with the message-store configurations defined by the engine. These messages may be categorized or marked with additional metadata to add useful context for the recipient, or they may be dropped or deleted outright, moved to a separate portion of the message store (in an email embodiment, to a separate folder, such as spam) or otherwise quarantined or saved for deeper inspection if malicious activity is detected.

The receiving organization 152 provides the enrichment engine 150, via a variety of ways, information about the receipt (authentication pass/fail, message origination data, and other metadata) of messages from the transmitter device 170 via various message delivering servers 176. The information may include external reports 155 (e.g., DMARC reports in the example of emails, various metadata reports in the example of an IoT setting). The receiving organization 152 may also provide information to the enrichment engine 150 in the form of message headers, content, or other relevant metadata or transaction details.

This information provided by the receiving organization 152 to the enrichment engine 150 is used, for example, to identify the organization represented by the transmitter device 170. The information related to the organization may include descriptive attributes of the organization, such as taxonomic classification. This process may be referred to as a sender identification process, which may be used to generate or modify a policy or another configuration. This process may be driven by an automatic correlation against an internal database 148 or external data sources 153. The process may also trigger a guided workflow which offers opportunities for the participation of a human analyst 154. The generation of a guided workflow is discussed in further detail with respect to FIG. 18.

The sender identification process may include identifying the domain name from which the message was sent. For the third-party server 140, sender identification includes identifying the parent organization responsible for the domain name. Identity data may be saved in the universal identity store 147. This is useful in describing the actual relationship between organizations when the responsible party has a domain change.

The enrichment engine 150 also uses this information to determine whether the originating organization should be trusted for the type of communication represented by the analyzed message traffic. This determination takes into account of the taxonomic classification of the sender, and how other similar organizations are related to the sender.

The enrichment engine 150 may determine whether an existing configuration applied to the message. The enrichment engine 150 may further determine whether a configuration used to represent the message delivering server 176 exists and is sufficiently concise. This determination may generate a recommendation to broaden an associated policy, or to narrow the policy, depending on the findings. A configuration that defines the authorization of an authenticated transmitter device 170 in this context may be an example of a policy.

The enrichment engine 150 is capable of generating various forms of outputs based on the foregoing determinations. For example, the enrichment engine 150 may send recommended policy updates to the originating organization or receiving organization 152 in order to describe more accurately the entities that should be trusted for communication.

Additionally, or alternatively, the enrichment engine 150 may update its worldview through the enrichment process and thereby updates its internal database 148. For example, and the enrichment engine 150 may find that a change has been made in a message delivering server's technical infrastructure indicating that all originating organizations should make a change to continue operating optimally. In this case, the output may be a recommendation regarding this change sent to all customers of the third-party server 140 which trust the same message delivering server 176 or an organization associated with the transmitter device 170. The enrichment engine 150 may also expose, via API or other ways, the information used to correlate information in the process of identifying senders.

Example Third-Party Server Components

Figure 2:
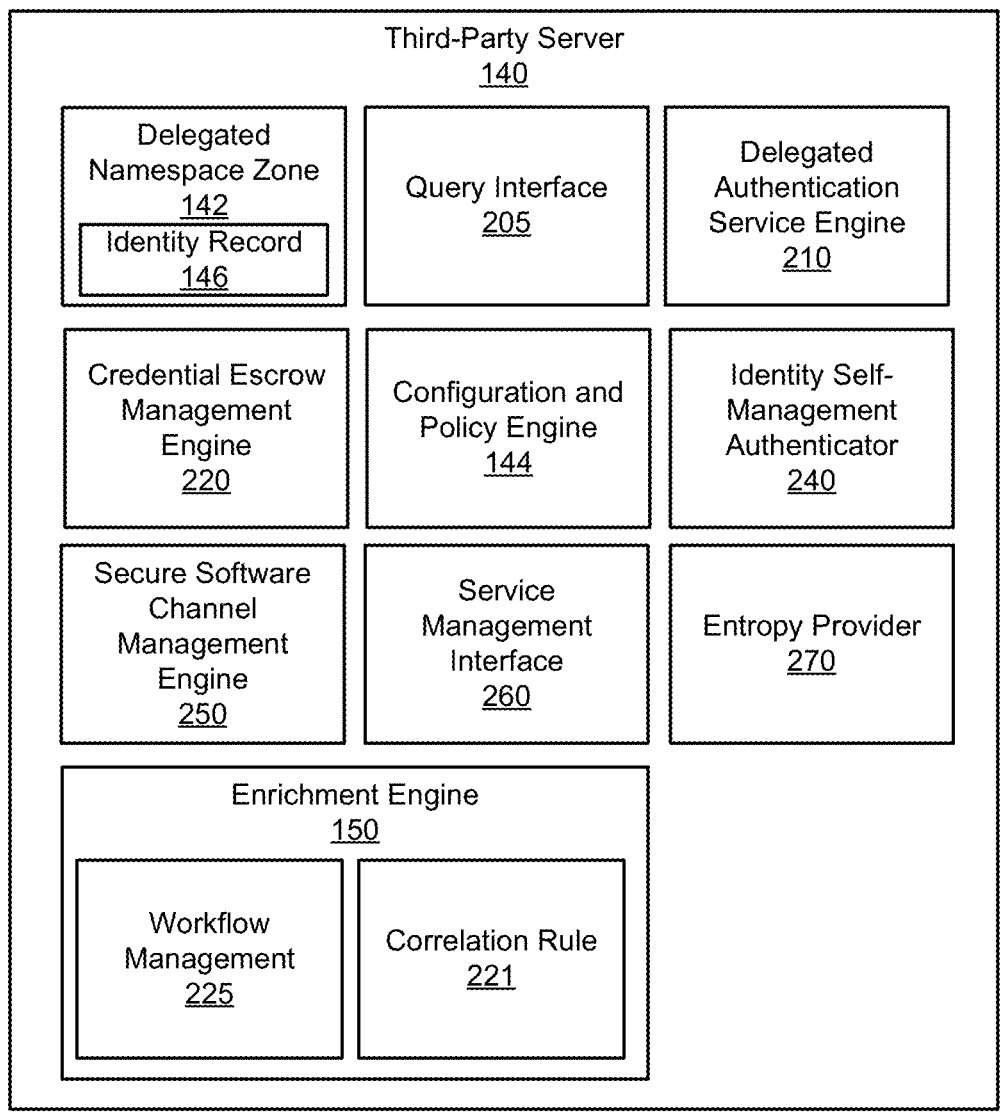
FIG. 2 is a block diagram illustrating various components of an example organization computing server, in accordance with some embodiments.

FIG. 2 is a block diagram illustrating an example third-party server 140, in accordance with some embodiments. In some embodiments, the third-party server 140 may include a delegated namespace zone 142, a query interface 205, a delegated authentication service engine 210, a credential escrow management engine 220, a configuration and policy engine 144, an identity self-management authenticator 240, a secure software channel management engine 250, a service management interface 260, an entropy provider 270, and an enrichment engine 150. In various embodiments, the third-party server 140 may include fewer or additional components, depending on the functionalities of the third-party server 140 in various embodiments. For example, if the third-party server 140 does not perform credential escrow service, the third-party server 140 may not include credential escrow management engine 220. The third-party server 140 also may include different components. The functions of various components in third-party server 140 may be distributed in a different manner than described below. Moreover, while each of the components in FIG. 2 may be described in a singular form, the components may present in plurality.

The components of the third-party server 140 may be embodied as software engines that include code (e.g., program code comprised of instructions, machine code, etc.) that is stored on an electronic medium (e.g., memory and/or disk) and executable by one or more processors (e.g., CPUs, GPUs, other general processors). The components also could be embodied in hardware, e.g., field-programmable gate arrays (FPGAs) and/or application-specific integrated circuits (ASICs), that may include circuits alone or circuits in combination with firmware and/or software. Each component in FIG. 2 may be a combination of software code instructions and hardware such as one or more processors that execute the code instructions to perform various processes. Each component in FIG. 2 may include all or part of the example structure and configuration of the computing machine described in FIG. 24.

The third-party server 140 may be a computing server that provides various services and performs different tasks on behalf of multiple unrelated organizations 110. Each organization 110 may delegate a section of the organization's namespace to the third-party server 140 as the delegated namespace zone 142. The delegated namespace zone 142 may be used for authentication and authorization. The delegated namespace zone 142 may correspond to a delegated DNS server, a blockchain server, a distributed database server, another suitable server publicly accessible server, or any combination of those servers. If the delegated namespace zone 142 is a delegated DNS, the third-party server 140 is trusted because of the delegated nature of managing DNS zones. Also, the records in DNS may be cryptographically signed to ensure that the records are authoritative and have not been tampered with. If the delegated namespace zone 142 is a namespace under a blockchain, the delegated namespace zone 142 is trusted because the records are tamper-evident.

In various embodiments, the delegated namespace zone 142 may include one or more of the following traits: (1) authenticated (2) delegated and/or (3) able to handle arbitrary content, although not every trait needs to exist in various embodiments. DNS is one example of such a database. First, DNS allows the known entity to manage its own records within the database. Second, DNS enables hierarchical delegation via NS records so that the known entity can provide others authenticated access with permission on its behalf of a subset of the database. For example, an Example Corp is responsible for maintaining all the records under example.com, including www.example.com. Because the namespace may be many layers deep, Example Corp may wish to organize its device identities under a specific branch of the DNS, such as "_devices.example.com". Example Corp may delegate the sub-domain to any party, such as the third-party server 140. Third, arbitrary data, such as text-based, encrypted or not, data can be stored in DNS records. In addition to name-to-IP address, DNS can host specialized record types for public keys and certificates (DANE/TLSA, RFC 8698), and DKIM (RFC 8376), which puts a public key in a freeform TXT record. In some embodiments, encrypted data that is encrypted with the public key of a named entity device 130 may be included in a DNS record for the named entity device 130 to retrieve.

In some embodiments, the delegated nature of a namespace system may allow organizations 110 such as Example Corp to delegate special-purpose parts of their namespace (e.g., DNS hierarchy) to a specialized third-party service provider (3PSP), such as the third-party server 140. For instance, Example Corp may delegate a section of its DNS tree (e.g. "_devices.example.com") to the third-party server 140. The namespace falls under example.com, which may be hosted on computing servers owned by Example Corp, but the _devices.example.com section of the namespace may be delegated by Example Corp to be hosted on the infrastructure of the third-party server 140 as the delegated namespace zone 142.

Although the discussion focuses on the use of DNS as the example distributed database, systems other than DNS may also be used. For example, the Inter-Planetary File System ("IPFS") may also be used. A third alternative example is a blockchain platform supporting application code submissions. While the discussion in this disclosure may focus on the use of DNS for the database, the systems and processes described can be applied to other namespace contexts and implementations. For the rest of the disclosure, even though the descriptions may focus on the DNS, other namespace systems may also apply in a similar manner unless specified otherwise.

The delegated namespace zone 142 may include a plurality of identity records 146. An identity record 146 may be a record that corresponds to a named entity device 130. An identity record 146 may include a unique identifier of a named entity device 130 (e.g., a name), authentication context information, and/or any information that may be used to authenticate the named entity device 130 or verify certain information associated with the named entity device 130. In some embodiments, the identity record 146 may include information that is signed by the private key 132 of the named entity device 130 so that the signer of the information can be easily verified by the device's public key.

While identity records 146 are sometimes discussed in this disclosure with the examples of identifiers or contextual information, the identity record 146 does not need to include any of those examples and may include other types of information that may be directly related to the identity of the named entity device 130. Each organization 110 may include many identity records and may provide a set of those records to the third-party server if the organization 110 decides that the named entity devices 130 correspond to those provided records should be discoverable.

A unique identifier, which may be part of an identity record 146, may be used to identify a named entity device 130 and may be used as a record locator for retrieving the named entity's credential, other contextual authentication information, or other identity information related to the named entity device 130. In some embodiments, an identifier may be in a format under the namespace of the organization 110. An example identifier can be 123.sensor.devices.example.com. In other embodiments, the identifier may also be any text string, arbitrary or not. In some embodiments, the identity records 146 may be saved as key-value pairs in which the identifiers serve as the keys, and the other information are the values. Other formats (e.g., tabular, CSV, tab delimiter, XML, JSON) to store the identity records 146 are also possible.

The query interface 205 may be a communication interface for the third-party server 140 to communicate with various devices in the system environment 100, such as the named entity device 130, the policy consuming device 136, the user device 160, etc. A device may transmit a query to the third-party server 140. The queries may inquire about different kinds of information such as available software or firmware update, device configuration settings, other device updates, policies and interaction control lists, authentication information, authorization information, confidential messages, private messages, or other information. In response, the third-party server 140 may provide encrypted data payloads as the responses to the devices. The encryption may achieve object security so that encryption can be different even for the same data payload. In some embodiment, the same data payload sent to the same device may also be encrypted differently for each occasion. For example, for each query, the third-party server 140 may generate a different random symmetric key to encrypt the data payload. The symmetric key may be encrypted by the public key of the device making the query.

By way of example, the third-party server 140 may receive a query from a device via the query interface 205. The query may include a subscriber identifier of the device. The third-party server 140 may store confidential information that includes an association between the subscriber identifier and a public key of the device. The confidential information is generally not revealed to the public. The third-party server 140 may store the public key directly or may store the identity address of the device. For example, the identity address may be the device's DNS address that stores the device's public key. The third-party server 140 may determine, from the confidential information, an association between the subscriber identifier and the public key of the device. The third-party server 140 may retrieve the public key of the device. In response to the query, the third-party server 140 may generate a data payload. In turn, the third-party server 140 may encrypt the data payload by a symmetric key that is generated randomly. The third-party server 140 also encrypts the symmetric key by the public key of the device. The third-party server 140 transmits the encrypted data payload and the encrypted symmetric key to the device via the query interface 205. The device uses its private key to decrypt the symmetric key. The symmetric key is then used to decrypt the encrypted data payload.

The query interface 205 may serve to anonymize the identities of organizations 110 and devices. For example, the third-party server 140 may serve as a centralized server for the distribution of various messages on behalf of different organization customers. The query interface 205 may have the same address for various organizations 110 for various devices to send queries of different purposes to the same address. The query may be encrypted using the public key of the third-party server 140 so that the third-party server 140 may determine a proper response to the query based on the query content and the metadata of the query. For example, the query may specify the intended recipient of the query is an organization 110 but the intended recipient information is encrypted. In such a case, the organization 110 can be anonymized and the address of the query interface 205 will not reveal the identity of the organization 110 because the organization has delegated the message response task to the third-party server. In some embodiments, the third-party server 140 may provide a specific address of the query interface 205 for a particular organization 110. The address may be under the namespace of the Internet domain of the organization 110 and is delegated to the third-party server 140. While, in this case, the address may reveal the identity of the organization 110, the communication between the third-party server 140 and a device may be encrypted. For example, the messages from the third-party server 140 may be encrypted by different symmetric keys so that the nature of the communication is untraceable.

The query interface 205 may take various forms. For example, in some embodiments, the query interface 205 takes the form of an API such as REST (representational state transfer), SOAP (Simple Object Access Protocol), RPC (remote procedural call), or another suitable type. In some embodiments, the query interface 205 may be a namespace server such as a DNS server. In some embodiments, the query interface 205 may be a network routing node or a packet switching node. Other types of network interface may also be used as the query interface 205.

The third-party server 140, through the delegated authentication service engine 210, may provide the delegated authentication service on behalf of an organization 110. The delegated authentication service engine 210 may perform different authentication-related services, including providing authentication responses to message recipients for communications between two devices, contextual authentication, and certain authentication on behalf of some message recipients. On behalf of an organization 110, the third-party server 140 may receive an authentication query from a message recipient. The authentication query may include certain metadata of the message or an identifier of the transmitter, which claims to be associated with an organization 110. The identifier in the authentication query may be the same as an identifier stored in an identity record 146 or may include data metadata that allows the third-party server 140 to retrieve the identifier stored in the identity record. In response, the third-party server 140, as an operator of the delegated namespace zone 142, provides the identity record 146 or part of the identity record 146 to the message recipient as the authentication response.

An authentication query may be transmitted from a message recipient, which receives a message purportedly sent from a named entity associated with an organization 110. If the third-party server 140 operates as part of a DNS server, the authentication query may be a DNS query. If the third-party server 140 operates as other types of servers such as a blockchain server, the query may be in other suitable formats. For example, in an embodiment where a blockchain is used, the third-party server 140 may include an oracle machine to provide information to a smart contract saved in the blockchain for the generation of the authentication response. Other implementations are also possible.

On behalf of the organization 110, the delegated authentication service engine 210 may also provide services related to authentication using context information. The third-party server 140 may receive authentication context configurations from various organizations 110. Each organization 110 may have a different setting on the authentication context. The third-party server 140 may translate the authentication context configuration information to a formatted DNS record and publish the record as a resource record under the sub-domain. DNS allows the publication of multiple resource records under the same name. Each organization 110 may manage its own authentication context information and settings via an API or an application provided by the third-party server 140, such as through the service management interface 260. The third-party server 140 translates the authentication context information and settings into namespace records (e.g., DNS records) for publication.

Authentication context information may include credentials (e.g., one or more public keys or another suitable authentication credential of a named entity device 130) and contextual metadata (such as time, location, etc.) that may be needed for a message recipient to authenticate a message purportedly transmitted from the named entity device 130, and other information needed for the authentication. Authentication context information may also be an example of a type of identity records 146. The format of the authentication context information may depend on the type of messages being transmitted. For example, in the context of emails, the format may be in compliance with one or more established standards such as SPF (Sender Policy Framework), DKIM (DomainKeys Identified Mail), DANE (DNS-based Authentication of Named Entities). In other contexts, the format may be in compliance with other protocols that are in various layers such as the application layer, transport layer, or Internet layer. A message recipient may send an authentication query. Upon the right conditions under the rules specified by the named entity device 130, the third-party server 140 provides the message recipient with the authentication context information.

Complexity in communications may arise from the contexts constraining the communications. Besides verifying the credential, a message recipient may also verify other contexts. Examples of such contexts may include time, location, directionality (one way or two way), communication method (e.g. mobile phone not email), sequencing (in a chain of communications, whether the order matters), topology (one-to-one, one-to-many, many-to-one), modifiability (whether the communications can be modified), modifications (whether a modification is allowed), and form of ID (the primary authenticated key into the database, for DNS this is a domain, for other datastores such as IPFS and blockchain, the keys are different). Non-substantive constraining context or limitations to the communications may be managed by the third-party server 140. Further examples of contexts include amplification, aggregation, summarization, shelf life, and revocation. Another example is a computationally intensive context-one requiring specific software developed and installed to perform these computations.

Authentication context settings, which may be provided by an organization 110 and managed by the third-party server 140, may specify what type of information will be provided and how the third-party server 140 should respond when an authentication query is received. For example, in one setting, an organization 110 may specify that a named entity's public key will be forwarded when an authentication query is received. In another example, an organization 110 may specify additional context information (e.g., time, location) for the third-party server 140 to forward. In yet another example, an organization 110 may allow the third-party server 140 to perform certain authentication processes on behalf of a message recipient, such as in a circumstance where the message recipient is a device that may lack the general processing power to perform certain authentication. In yet another example, an organization 110 may require the third-party server 140 to perform authentication of the message recipient before its own name entity's authentication context information is forwarded.

In some embodiments and based on the setting of an organization 110, authentication may be mutual. The third-party server 140 may authenticate the message recipient before any authentication context information is forwarded to the message recipient for the recipient to authenticate the message that is purportedly transmitted under the domain of the named entity device 130. The third-party server 140 may verify the digital signature of the message recipient that may be included in an authentication query.

In some embodiments, the delegated authentication service engine 210 may perform part of the authentication process on behalf of a message recipient. Communications among certain types of IoT devices may be an example that may utilize this feature. Certain IoT devices may be sensors or other devices that have limited processing power. They may include a hardware circuit for decrypting and encrypting cryptographic keys and have limited processing powers designed for performing certain limited actions as a sensor. Those IoT devices may be message recipients that receive information from a beacon that broadcasts the message over radio waves in the vicinity. In some cases, a malicious party may record the broadcast of a message and playback the message at another location in an attempt to manipulate IoT devices that are not the intended recipients. An IoT device, upon receiving the message, may transmit an authentication query to the third-party server 140. An organization 110 may specify that the third-party server 140 can authenticate the message on behalf of certain devices. For example, the third-party server 140 may verify the location information metadata (an example of contextual evaluation) of the sending location of the message in order to confirm that the message was sent from a legitimate beacon. The third-party server 140 may transmit a response that includes the public key of a named entity device 130 (e.g., the message transmitter) and contextual evaluation result over the Internet that may include DNSSEC (Domain Name System Security Extensions) and TLS (Transport Layer Security) to ensure the response is securely delivered to the IoT device.

The configuration and policy engine 144 may determine rules for various participants in an application environment. A policy may be defined and initiated by an organization 110. An organization 110 may transmit the policy setting to, or build the policy at, the third-party server 140. The configuration and policy engine 144 translates the policy to one or more configurations, whether generated automatically based on the policy requirement or generated partially manually through a guided workflow.

The configuration and policy engine 144 may determine dynamically one or more context-specific policies that are applicable to a policy consuming device 136. The configuration and policy engine 144 may transmit the determined policies to the policy consuming device 136 as an interaction control list. Interaction control lists may be a set of rules that define what devices are authorized to interact with a policy consuming device 136 and define how the policy consuming device 136 may behave in certain situations. The distribution of the interaction control list may be through direct communication, such as a message payload to be sent to a policy consuming device 136, or via a namespace record. For example, the interaction control list, encrypted or not, may be posted on a DNS record for devices to download. To allow the third-party server 140 to communicate with a wide variety of devices, the interaction control list may be packaged in a well-known or standardized format.

A policy may include various elements that define the policy settings in an application environment. In one example, elements of a policy may include roles, members, and rules. A role defines a type of participant in the application environment. For example, a type of sensor may assume a certain role in an autonomous vehicle application environment. A role may include a collection of members and rules. The role provides a logical container for how similar members should interact. A member is a participant in an application environment. A member may be a named entity device 130 or a policy consuming device 136. Continuing with the example of a role being a type of sensors, members under the role may be individual sensors that are located in various locations of the application environment. A rule is a description of how members of a role are authorized to interact. For instance, members of a first role may accept certain communications from members of a second role, but not a third role. A rule may also define the format of information accepted by a destination member. A rule may offer granular control over certain field values, such as various values of parameters, metrics, and metadata. A rule may be a feature of a particular role but may also be a feature of the broader application. The details of the policy may be translated into various configurations in order for the policy to be achieved.

An interaction control list may be a version of a policy and may include relevant data that is packaged in an appropriate format (e.g., a well-known or standardized format) for a policy consuming device 136 to consume. An interaction control list may be derived from a policy, whether the control list is filtered or not, converted or not, combined or not. For example, a policy consuming device 136 may receive a message from a named entity device 130. While the named entity device 130 may be authenticated, the policy consuming device 136 may need to determine whether it is authorized to communicate with the named entity device 130. In turn, the policy consuming device 136 may query the third-party server 140. The configuration and policy engine 144 may determine the role of the named entity device 130 and generate a customized interaction control list for the policy consuming device 136. The interaction control list may include a list of authorized named entities with which the policy consuming device 136 is authorized to communicate. The interaction control list may be filtered from the larger policy and may include data that is relevant to the particular policy consuming device 136.

The interaction control list may take different forms. For example, an interaction control list may be a communication policy or protocol that defines how an IoT device may communicate with other devices generally or in specific situations. An interaction control list may also take the form of a set of instructions that may define or alter the behavior of a device. The policy may also take the form of a policy plugin that may enable a device with the plugin to behave in a standard way or be compliant with a standard. In yet another example, an interaction control list may include key-value pairs that include a list of authorized named entity devices 130 and other parameter values that are saved using the parameter name as the key. An interaction control list may use well-known formats such as JSON, XML, but may also in a standardized format that is yet to be developed in the future by an industry that deploys various application environments.

The credential escrow management engine 220 may store confidential credentials (e.g., username and password) of named entity devices 130 and manages the credentials on behalf of the devices 130. In some cases, certain named entity devices 130 may not be complex enough to include the hardware and software (or simply it is too costly to include those secure elements) to safeguard certain confidential credentials, such as text-based credentials that may be used as the API credentials to communicate with an API of the organization 110. Instead of storing the credentials in each named entity device 130, an organization 110 may deposit the credentials of devices 130 that are registered with the organization 110 to the credential escrow management engine 220. The credential escrow management engine 220 may store an association among (1) the identifier of the named entity device 130 saved in the DNS record associated with the device 130, (2) the named entity device's API key identifier (e.g., API username, which may or may not be the same as the identifier in the DNS record), and (3) the device's API secret key (e.g., API password). In some embodiments, the association may also include the named entity device's public key. In one embodiment, to enable the named entity device 130 to communicate with the API, the credential escrow management engine 220 may provide an ephemeral credential (e.g., a session token) for a named entity device 130 to communicate with the API. This limits the exposure of a compromised named entity device 130.

By way of example, the credential escrow management engine 220 may provide a credential of a named entity device 130 to the organization's API to perform the initial authentication on behalf of the device. A named entity device 130 that intends to initiate a communication with the API may provide a request to the third-party server 140. The request may include an identifier of the named entity device 130, such as the identifier in the DNS record of the named entity device 130. In response, the credential escrow management engine 220 may provide the named entity device's API credential (in escrow of the third-party server 140) to the API. The API, upon authenticating the credential, may generate an ephemeral credential such as a session token for the named entity device 130 to establish a communication session with the API. The API may transmit the ephemeral credential to the third-party server 140. The credential escrow management engine 220 may transmit a query to a DNS (or another namespace system) that includes the DNS record of the named entity device 130. The DNS record may include the public key of the named entity device 130. The credential escrow management engine 220 may use the public key to encrypt the ephemeral credential. The credential escrow management engine 220 may publish a namespace record (e.g., DNS record) at the namespace associated with the organization 110. The namespace record contains the encrypted ephemeral credential for the named entity device 130 to retrieve the ephemeral credential at the namespace system. The namespace record may also include a time to live entry that corresponds to a lifetime of the session token. Upon retrieval, the named entity device 130 may use its private key to decrypt the encrypted ephemeral credential. While in this disclosure the credential for API is often described as a time-bound credential, in some embodiments the encrypted credential may also be non-time-bound. For example, the distribution of the credentials may include the distribution of text-based credentials from the third-party server 140 to a named entity device 130. Some APIs do not support the use of a time-bound session token and rely on key/secret (e.g., username/password). The credentials may be stored in the third-party server 140 and may be sent to the named entity device 130 on demand.

The identity self-management authenticator 240 may perform authentication for the self-rotation of certificates. The identity of a named entity device 130 may be asserted by using the private key to decrypt a message encrypted with the device's public key, which may be included in a DNS record. For the DNS record of a named entity device 130, the public key or certificate may be removed after a predetermined period to allow an ephemeral PKI-based identity. The identity self-management authenticator 240 may authenticate the ephemeral identity. For instance, if a device has a core identity with the name 123.edge._device.example.com, with a public key at that record, the third-party server 140 may use that identity to establish ownership of (a) names under that place in DNS, which follows the natural hierarchical organization of the namespace, or (b) a delegated identity which may indicate the core identity by a specifically-formatted record in the namespace. For DNS, this may take the form of a TXT record which indicates the parent identity.

The prior example may allow a device at name 123.edge._device.example.com to establish a short-lived public key credential at _serviceclient.123.edge._device.example.com by virtue of the application being configured to allow devices to establish short-lived sub-identities in this fashion. The process of establishing this name-pub key identity is described in the next example. The difference between this use case and the next may be the method for indicating the authorized parent credential. With this method, it is naturally indicated by the hierarchy of the namespace. In the next, it is deliberately indicated within the namespace or in the application configuration.

The latter example may exist as two DNS records at the name 123.summarizer._device.anotherexample.com. One record is a TXT record which indicates 123.edge._device-.example.com as the parent or core identity. The second record at 123.summarizer._device.anotherexample.com may be a TLSA record that contains a public key. The TLSA record at 123.summarizer._device.anotherexample.com is expected to be frequently updated, and if it exceeds its expected lifetime without an update, the record may be removed or 'tombstoned' (having unusable data placed in the record to indicate the identity's existence, but that it should not be trusted). Alternatively, it may make sense for the organization owning anotherexample.com to conceal from publication the parent identity of the device, for privacy reasons (maybe this is a medical device and example.com domain is known for producing a specific type of medical device). In the case where this privacy feature is desired, the third-party server 140 will provide a feature in the management application where the application may correlate the 123.summarizer._device.anotherexample.com device with 123.edge.example.com, for the purpose of authenticating the rotation of the public key.

The process of establishing an ephemeral public key credential at 123.summarizer._device.anotherexample.com may involve the device in possession of the identity as well as the 123.edge._device.example.com to (1) create or obtain a new key pair, (2) create a certificate signing request (CSR) associating the new public key and the 123.summarizer._a-notherexample.com name, (3) use the private key associated with the 123.edge._device.example.com identity to generate a cryptographic signature of the CSR and a nonce, (4) transmit the signature, nonce, and CSR to the third-party server 140.

The third-party server 140 may (1) inspect the CSR and retrieve the name of the proposed identity, (2) determine (either by the TXT record or internal application configuration) that the parent identity for 123.summarizer._device-.anotherexample.com is 123.edge._device.example.com. (3) retrieve the public key associated with the 123.edge._device.example.com identity and use that public key to authenticate the CSR, nonce, and signature, (4) publish the new public key from the CSR, or a certificate containing the same, at the requested name (123.summarizer.anotherexample.com) for a limited time.

The secure software channel management engine 250 may manage the policy for secure software distribution. The secure software channel management engine 250 may correlate subscriber identifiers to universal identities and software channels. The secure software channel management engine 250 may maintain an internal reference of a named entity device's data, such as the device's subscriber identifier, public key, application type, device type, and other information that is associated with the device. The secure software channel management engine 250 may deliver software to various named entity devices 130 in a secure manner. A device may send a query to the third-party server 140 via the query interface 205. In response, the secure software channel management engine 250 may generate the appropriate data payload as a response to the query. The response may be encrypted as discussed above with reference to the query interface 205.

The secure software channel management engine 250 may maintain a database that correlates subscriber identities with channels of software updates. The secure software channel management engine 250 may be analogous to a subscription service where the channel periodically updates the most recent edition of a firmware bundle or configuration file. When the client device indicates its identity to the firmware management service (such as over HTTPS (Hypertext Transfer Protocol Secure) or MQTT (Message Queuing Telemetry Transport)) the secure software channel management engine 250 may correlate the device's identity with the appropriate software channel and indicate to the client device the unique identifier of the current version of the software. The unique identifier may be a version tag (e.g., v1.0.1) or a computed hash, or some other way of uniquely indicating the current version of the subscription asset. This response may also contain the certificate or public key of the system that built and signed the versioned asset. When the device receives the version indicator (which may be encrypted using the client identity's public key) the device compares the current version of the asset as described by the third-party server 140 with the current version in use on the device. If there is a version mismatch, the device then requests the most recent version of the asset. The third-party server 140 responds to this request by retrieving the signed asset from an artifact repository or a source repository as a data payload. The third-party server 140 may encrypt the asset with the public key associated with the requesting device's identity. This may be direct encryption using a public key, or it may be a key-wrapping approach where a symmetric key is used to encrypt the payload, and the symmetric key is encrypted by the public key. The symmetric key should be randomly-generated for every download to prevent the analysis of multiple asset update actions using the same symmetric key and to prevent the correlation of device capabilities by correlating the metadata associated with the device update process (like the hash of the encrypted payload). When the device receives the update, the device uses its own private key to unpack the update object. The device may use a certificate and signature embedded in the update object or, if provided, the same provided via the initial update request interaction to verify the software download. Alternatively, the certificate of public key may be referenced in the update using the signer's DNS name, whereby the device may retrieve the public key used for signature verification from DNS The third-party server 140 may be associated with a source configuration management engine and an artifact management engine. Those engines may be version control engines that manage the source code, libraries, library objects, artifacts, and other binary file objects. A source configuration management engine may manage various source code repositories. Example source configuration management engine may manage repositories that are hosted on GITHUB, BITBUCKET, GITLAB, SOURCEFORGE, etc. An artifact management engine may manage the libraries, library objects, artifacts, and other binary file objects. The artifact management engine may automatically fetch updates to various libraries and clean up libraries. The artifact management engine may also tag various libraries and objects with searchable metadata and indexes. An example of an artifact management engine may include services provided by companies such as ARTIFACTORY.

The service management interface 260 may be an interface for an organization administrator to change settings with respect to various engines such as to change message distribution policies associated with the query interface 205, change the authentication policy in the engine 210, to upload credential to the credential escrow management engine 220, define various policies for distribution by the configuration and policy engine 144, etc. The service management interface 260 may include a portal for professional developers, an API, and a user-friendly portal for layman use. For example, the service management interface 260 may provide a user-friendly portal for various organizations to adjust various settings.

The service management interface 260 may take different forms. In one embodiment, the service management interface 260 may control or be in communication with an application that is installed in an administrative device 114. For example, the application may be a cloud-based SaaS or a software application that can be downloaded in an application store (e.g., APPLE APP STORE, ANDROID STORE). The service management interface 260 may be a front-end software application that can be installed, run, and/or displayed at an administrative device 114. The service management interface 260 also may take the form of a webpage interface of the third-party server 140 to allow organization administrators to access data and results through web browsers. In another embodiment, the service management interface 260 may not include graphical elements but may provide other ways to communicate with organization administrators, such as through APIs.

The entropy provider 270 may be a specialized piece of hardware, software, or a combination that produces high-quality randomized bits for various devices, such as certain IoT devices or other named entity devices that may not be equipped with the component to generate high-quality entropy. Randomized bits may be used to create high-quality cryptographic keys. However, truly randomized bits may be difficult to generate using only computational algorithms. The entropy provider 270 may refer to certain real-world randomized events such as physical phenomenon that are expected to be random. The entropy provider 270 may provide entropy to a named entity device 130 for the device 130 to generate cryptographic keys. In some cases, a named entity device may be a provisioning device. The entropy provider 270 may transmit high-quality entropy to the provisioning device. In turn, the provisioning device uses the entropy to generate cryptographic keys and provision a new device with the keys. The entropy provider 270 may also generate private-public key pairs for a device. The entropy provider 270 may further be used to generate random symmetric keys that are used to encrypt messages and other data payloads transmitted from the query interface 205, whether the data payloads are device updates generated by secure software channel management engine 250 or other types of message payloads.

The enrichment engine 150 modifies configurations and policies automatically or through a guided workflow process. In modifying a configuration or a policy, the enrichment engine 150 may receive various external reports 155. The external reports may be referred to as interaction reports. Example external reports 155 include authentication or encryption reports from a receiving organization 152 (such as DMARC or TLS-RPT (transport layer security reporting) reports). The receiving organization 152 may deliver its reports via a message delivery system like email or HTTP POST, or provide an API whereby authentication or other status information may be consumed. The authentication report may contain information that may indicate the sender and recipient of the messages (including the specific named entity or organization), as well as the entities involved in handling the email on behalf of, and between, both parties. This encompasses not only protocol-level forwarding entities (MTAs (mail transfer agents) or secure email gateways in email) but syndication services, like email list servers. Not all entities involved in the handling of the messages may be authenticated, and they are represented at the greatest level of detail and certainty which available protocols provide. Sometimes this is only as specific as an IP address or a hostname from a DNS PTR record.

The enrichment engine 150 may consume information from external information providers 153 such as OSINT (Open-Source Intelligence), GeoIP, or via a paid/private API such as D&B (Dun & Bradstreet), SFDC (SALESFORCE.COM), or other external data sources or services to contextualize the entities described in the authentication report. An example of this contextualization is the correlation of a domain name against a D&B report, which would indicate a parent company of the sending service. This is useful because as mergers and acquisitions happen, the business name under which a sending service operates may change, while the name in the namespace used to actually send messages may not. The enrichment engine 150 may also query a variety of other external information systems 153 (e.g. DNS, WHOIS, etc.) to add context to the authentication, authorization, encryption, or other events. The enrichment engine 150 may attach a taxonomy describing the industry or other classification of business that the sending organization typically services, and use this to make recommendations to the organization on changes to its authorization policy. In an email setting, a policy consumer device 136 is a mail server of the receiving domain.

The enrichment engine 150 may provide classifications or ratings against authentication, authorization, or other events, such as rating certain events 'suspicious' when certain patterns are matched, and the process by which the enrichment engine makes the determination of suspicion may be based on the third-party server 140 customer's current configuration or global configuration.

The third-party server 140 may provide feedback to the technical administrator controlling an administrative device 114 via a variety of means. These may be emails, SMS messages, or alerts in the user interface or API of the third-party server 140 which may be delivered via an administrative device 114. The third-party server 140 may also provide an API or other connections for making information available to other systems such as security information and event management (SIEM) systems for the purpose of providing context for correlation against other security-related events, or for the purpose of providing alerts to interested parties, such as the staff of a security operations center. Alerts may be used to indicate that a new sending organization has been detected, and might correlate to the presence of a new policy change recommendation. In the email use case, the policy consuming device 136 may be an administrator device 114 responsible for managing the organization's email authentication settings.

The enrichment engine 150 may provide authorization based on real-world identity, which is distinguished from authentication results of the message itself. From the authentication metadata in the report and message headers from the actual messages, the enrichment engine 150 searches for the domain owner for locating the name of the business which owns the domain name that the message claims to originate from.

The enrichment engine 150 enriches the results from the report (e.g. IP addresses, domain names, business names) with information from external information providers 153 including various OSINT sources such as the domain's websites, information from business directories, information from trade groups to which the entity belongs. Business name enrichment has a tremendous number of datasets that may involve the characteristics of the technical components in the chain of message delivery, as well as searching the Internet.

The enrichment engine 150 conducts workflow management 225, which includes a process of repeated refinements that are performed until a level of certainty is achieved in the identification of the business from which the message originated. In some embodiments, the repeated refinement may be a recursion or iteration process. If the process of repeated refinements reaches a point at which no more information can be computationally processed to arrive at a positive sender identity, the repeated refinements end, and a human workflow is triggered, providing the metadata that's been gathered so far, for a human analyst to complete the investigative process. A human analyst either determines that the email sender should not have been authorized (this is an opportunity for policy improvement), or, from the metadata available to the rules engine, defines a correlation rule 221 that the algorithm may use in the future to automatically make a determination as to the identity of the sender. The output of this correlation rule (performed manually or automated) may be a recommendation for the sending domain's policy or the recipient's mailbox filtering.

The enrichment engine 150 generates and stores one or more correlation rules 221. The correlation rules include rules that categorize, label, or authorize inbound messages according to known vendors, by geography, and by business unit or internal organization. Certain vendors may have relationships only with certain sub-organizations, and should not be trusted or authorized for communications with the entire organization.

Correlation rules 221 include user-generated policies as well as engine-computed ones. For instance, a simple correlation rule might indicate that a public key found at a specific location in the DNS is only used for signing messages from a very specific sender or domain. The appropriateness of the sender may be determined by comparing the sender against a list of organizations that are known to already have a relationship with the recipient organization, the sub-organization to which the recipient belongs, or the actually intended recipient of the message. The enrichment engine 150 may make this determination based on a variety of factors, one example being whether the sender and recipient have a history of prior communication.

The information generated by the enrichment engine 150 may include known vendors, geographic correlation, business to domain correlation, and permitted middleware components, and other additional metadata. In an email setting, the information may also include allowed specific DKIM keys for specific vendors (more specific than DMARC spec) and provide SPF alignment between a message originator and a sending service. In IoT applications, similar patterns exist where specific middleware components, such as message brokering and queueing services, may be permitted to deliver messages on behalf of an organization 110.

When determining the appropriateness of communication, an understanding of all parties involved may be important. With email, it is common for a message to be encapsulated and/or forwarded by another entity. Sometimes this forwarding entity is an MLM (mailing list manager). For example, while the MLM's message may be authentic, there may be no prior history of communication between the MLM and receiver, and there may not be a valid mechanism available for authenticating the original message. In this example there might not be any apparent reason that the message would be appropriate. However, the original message may be relevant and useful to the recipient because of the original sender who sent the message to the MLM. Protocols such as OAR (original authentication results) or ARC (authenticated received chain) may cause the population of message metadata fields which identify the party that sent the original message to the MLM. The original sender, as revealed by the ARC headers, may have a history of communication with the recipient, and the system can mark the communication as appropriate though the apparent sender (the MLM) may be otherwise unknown to the receiving organization.

Message Authentication Examples

FIG. 3A through FIG. 9B discusses various delegated authentication examples that may be performed by the third-party server 140. The authentication services may be provided by the third-party server 140 to various organizations 110 as SaaS. Each organization 110 may delegate a portion of a public database, such as the namespace 112 to the third-party server 140 as delegated namespace zone 142. The third-party server 140, in turn, may respond on behalf of the organizations at scale. The SaaS may be multi-tenant that allows various organizations to have their own settings and configurations. The third-party server 140 operates an application environment such as identity system which enables identity-secured messaging (ISM), on behalf of an organization and within a delegated namespace such as a DNS. The application environment may be standard-based that utilizes existing network and communication infrastructure and protocols for accomplishing the ISM. In communicating with various devices in the application environment, the third-party server 140 may provide dynamic responses for namespace queries. The response may be generated dynamically based on a variety of factors, such as contextual conditions and types of devices.

Figures 3A, 3B:
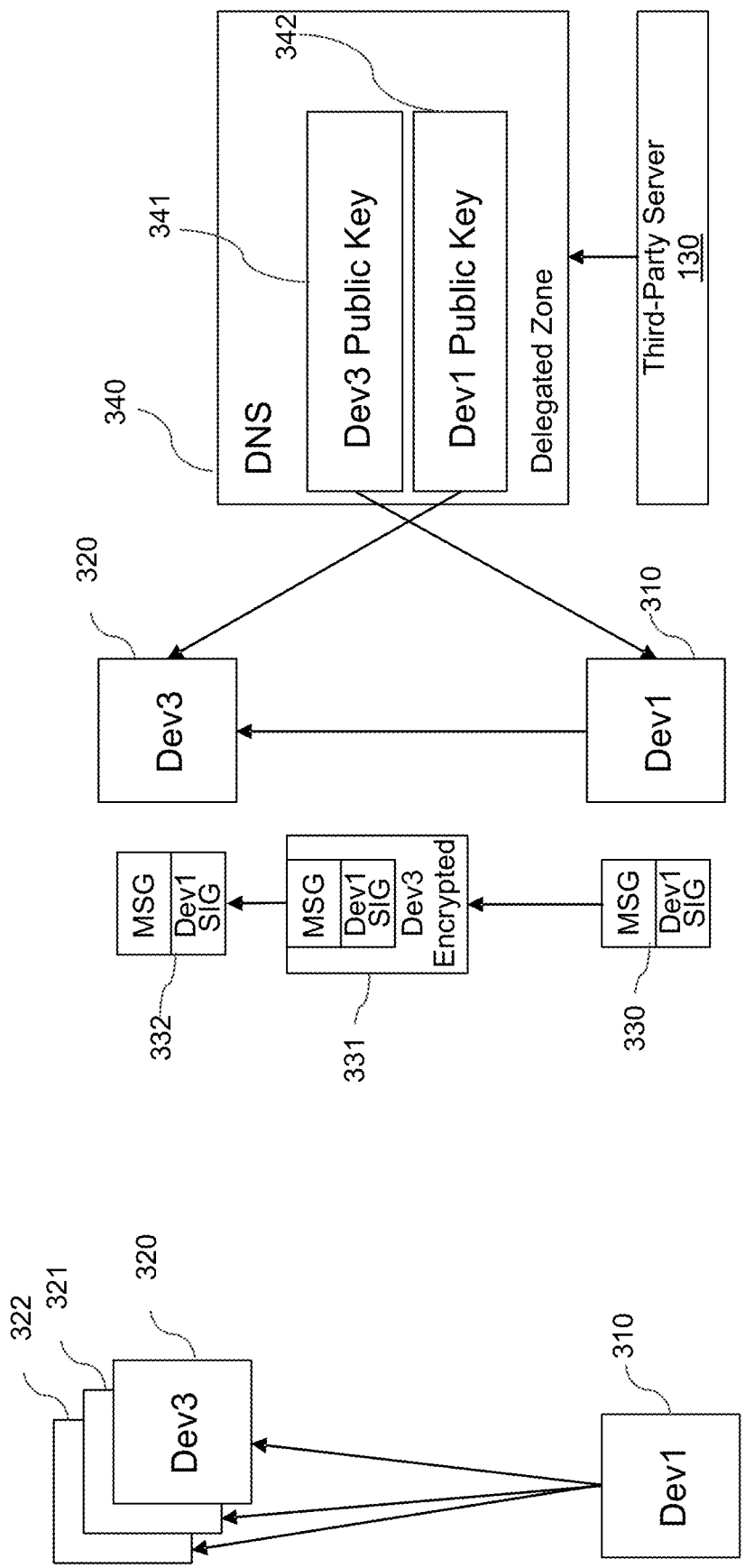
FIGS. 3A and 3B are conceptual diagrams showing an authentication of a message using a third-party server, in accordance with some embodiments.

FIGS. 3A and 3B are conceptual diagrams showing an authentication of a message 330 using a third-party server 140, in accordance with some embodiments. FIG. 3A shows device Dev1 310 communicating data to one or more devices Dev2 320, 321, and 322. Device 310 may be an example of a message transmitter and devices 320, 321, and 322 may be examples of message recipients. The devices 310, 320, 321, 322 may be managed by an organization 110. Alternatively, or additionally, some of the devices are managed by a first organization while other devices are managed by a second organization. The devices 310, 320, 321, 322 may be examples of named entity devices 130. One application of this example configuration is a smoke detector as Dev1 310, and fire alarms Dev2 320, 321, and 322. The smoke detector 310, upon detecting smoke, needs to be able to activate the fire alarms 320, 321, and 322. For the purpose of simplifying the discussion, FIG. 3B shows only one of the devices Dev2 320. But the discussion may apply equally to all of the devices Dev2 320, 321, and 322.

Staying with the example of a smoke detector and fire alarm, the fire alarm 320 is configured to expect messages from the smoke detector 310. The smoke detector 310 sends, to the fire alarm 320, a message 330 which contains a signature and a name which can be used to locate the identity record 146 (e.g., the public key 341) for smoke detector 310 stored within DNS 340 (an example of delegated namespace zone 132). The fire alarm 320 can verify the message 330 is authentic using the identity record 146 (e.g., the public key 341) for smoke detector 310 stored in DNS 340. An authentic message from an identified transmitter may be a message that actually came from the transmitter and not from another device. However, the authentication of the message does not imply anything about whether the identified transmitter is good or bad, appropriate or otherwise.

Either or both of the public keys 341 and 342 are delegated to the third-party server 140 which manages these keys. This third-party server's management of either or both of keys 341 and 342 is performed on behalf of the owners or manufacturers of Dev2 320, 321, and 322, and Dev1 310, respectively.

A more detailed description of the communication is shown in FIG. 3B. First, Dev1 310 signs message 330 (MSG) using its own private key (adds Dev1 SIG (signature)). Dev1 310 may belong to an organization 110 and have an identifier under the namespace of the organization 110. Dev1 310 retrieves the Dev2 320 public key 341 from DNS 340. Dev1 310 uses this public key to encrypt message 330 (enclosed in Dev2 Encrypted), thereby generating encrypted message 331. Dev1 310 sends encrypted message 331 to Dev2 320. Part of the metadata of the message may include the identifier of the Dev1 310. The identifier may be part of the encrypted data or outside the encryption.

By using a third-party server 140, an organization 110 can claim ownership of Dev1 310 and Dev2 320, 321, and 322. At any time, the organization 110 may manage or rotate the devices' credentials, manage when the devices will or will not authenticate based on additional contexts, or revoke liability—i.e. remove or make unusable the public key associated with the device, thereby preventing the corrupted device from carrying out malicious activities in the name of the organization 110.

Dev2 320 decrypts encrypted message 331 back into message 330 using its own private key. Based on the identifier of the Dev1 310, Dev2 identifies that the Dev1 310 is purportedly under the namespace of an organization 110. Dev2 320 transmits an authentication query to a namespace database, which can be part of the third-party server 140 or the namespace 112, which will route the query to the third-party server 140. The authentication query may include a version of the identifier. Based on the identifier, the third-party server 140 retrieves the identity record 146 associated with the identifier. The identity record 146 may include the public key 342 of Dev1 310 and is forwarded to Dev2 320 as part of an authentication query response. Dev2 320 verifies the Dev1 SIG of message 330 against the Dev1 310 public key 342 retrieved from DNS 340.

Although the example used for the configuration of FIGS. 3A and 3B concerned a smoke detector and fire alarms (an "IoT" application), any application is possible. For example, end-to-end authenticated and optionally encrypted messages between humans may follow this same configuration, using a universal namespace like DNS for discovering public keys.

If a person wishes to transmit signed messages over the Internet, they may publish, in a namespace such as DNS, a public key as an identity-proving mechanism at a location they are associated with. The person's DNS record may exist within a delegated zone in DNS which contains other identity-related records that may represent other persons under a common organizational structure (e.g. business, business unit, family, etc.).

The hierarchical parent of this delegated DNS zone may be owned by an enterprise, and the zone containing the identity records may be delegated to a third-party server 140 which hosts the records within that zone, and the third-party server 140 may even provide granular access controls which permit the individual person to manage only their own DNS identity record.

A party desiring to transmit signed and encrypted messages to the person who has an identity represented in DNS may similarly establish their own identity in DNS. With a similarly-established identity in DNS, each communicating party may discover public keys associated with the opposite end of the communication channel, and easily transmit source-authenticated and encrypted messages across a variety of mediums or transports.

Because the DNS is a single logical hierarchy, the two communicating parties do not need to be represented within the same zone. Importantly, these identity-oriented DNS zones may be delegated to one or more specialized third-party servers 140 which offer value beyond basic DNS record management. Access for managing DNS records is typically provided on the zone level. A specialized third-party server 140 may offer additional functionality that includes (but is not limited to) enabling individual entities like devices or humans to self-manage identity-related metadata like public keys, network address, geolocation, and network reachability information.

FIGS. 3C and 3D are additional conceptual diagrams illustrating another message authentication process using the third-party server 140, in accordance with some embodiments. The configurations of FIGS. 3C and 3D are similar to those of FIGS. 3A and 3B, except that the initiating device of FIGS. 3C and 3D sends out a broadcast beacon intended for arbitrary receivers, not specific ones. In FIGS. 3A and 3B, Dev1 310 and Dev2 320 were specifically identified devices in direct communication.

One application of the configuration of FIGS. 3C and 3D is a highway beacon 310 that broadcasts messages to passing cars 320, 321, and 322. Here, there is a single originator broadcast device 310—and multiple recipients 320, 321, and 322. In this example, the passing cars 320, 321, and 322 need to be able to authenticate messages that they receive from the highway beacon 310. A message which claims to be from the beacon, but is not, could result in the loss of human life arising from traffic collisions. While FIG. 3D shows only one of the recipient devices 320, the discussion applies equally to all of the devices 320, 321, and 322.

A message 330 from the beacon 310 contains a signature, a timestamp, and a universal ID (the DEV SIG portion of message 330). DNS is used as the source of truth for the beacon public key 342 (for signature verification) as well as the beacon's expected geolocation 341.

If the beacon 310 is stolen and moved to another location, its signal will not be considered valid because it is found in a different geolocation from that identified in geolocation 341. If the beacon's signal is replayed in another location, it will fail the location test. It may also fail the timestamp test as well. If the private key DEV SIG of message 330 is derived and used to generate new messages in another location, it will fail the location test. Failing any of these contextual requirements will cause the failure of the overall authentication test.

A more detailed description of the communication is shown in FIG. 3D. First, the MSG portion of beacon message 330 contains the DNS name, a timestamp, and telemetry information for beacon 310, which may be managed by an organization 110 and has a beacon identifier under the namespace of the organization 110. Beacon 310 signs the MSG using its own private key (adds DEV SIG), thereby generating message 330. The message 330 may also include the identifier. Beacon 310 then broadcasts message 330.

Passing car 320 may receive the message and is an example of a message recipient. Passing car 320 extracts the identifier and identifies a namespace to which the identifier belongs. Passing car 320 locates this DNS record using beacon's DNS name stored in the MSG portion of message 330. Based on the namespace (e.g., domain name), passing car 320 transmits an authentication query to a namespace database. The namespace database may be DNS 340 (an example of the delegated namespace zone 132) operated by the third-party server 140. The authentication query may include a version of the identifier of the beacon 310. Based on the identifier, the third-party server 140 retrieves the identity record 146 associated with the identifier. The identity record 146 may include the public key 342 of the beacon 310 and is forwarded to passing car 320 as an authentication query response. Passing car 320 may authenticate this broadcast transmission of message 330 using the beacon public key 342 from DNS 340. The authentication query response may contain other associated contextual information, such as the correct geolocation of the beacon 310. Passing car 320 may also use the contextual information to authenticate the MSG 330. For example, if the geolocation included in the authentication query response is not in the proximity of the location of passing car 320 when the MSG 330 is received, passing car 320 may reject the MSG 330.

Either or both of the DNS records Broadcast Device Geolocation 341 or Broadcast Device Public Key 342 is delegated to the third-party server 140 which manages these records. This third-party server 140 management of either or both of records 341 and 342 is performed on behalf of the owners or manufacturers of Broadcast Device 310.

FIGS. 3E and 3F are conceptual diagrams illustrating a more complex example of message authentication that may be used, for example, in edge computing, in accordance with some embodiments. Edge application services may reduce the volumes of data that need to be moved, the consequent traffic, and the distance that data travels. That provides lower latency and reduces transmission costs. Applications of edge computing include facial recognition, cloud gaming, and autonomous automobiles.

FIG. 3E shows that, in any edge computing application, there are typically multiple devices 350, 351, and 352 which communicate with one or more edge computing servers 360, 361, and 362, which, in turn, communicate with application server 390. The application server 390 may be an example of a message recipient. Edge computer servers 360, 361, 362 may both be message transmitters and message recipients. The devices 350, 351, and 352 and the application server 390 may be examples of named entity devices 130.

In an application of FIG. 3E, sensors 350, 351, and 352 produce information and transmit information to one or more edge computers 360, 361, and 362, and each edge computer forwards the information to the application server 390. For the purpose of simplifying the discussion, FIG. 3E shows only one of the sensor devices 350 and one of the edge computers 360. But the discussion applies equally to all of the devices 350, 351, and 352, and all of the edge computers 360, 361, and 362.

In FIG. 3E, the edge device 360 appends a signature to the original (signed) information 370 from the sensor to generate message 372, and transmits that message to the application server 390. The application server 390 can then verify the chain of custody from edge compute 360 to the device 350.

The configuration of FIG. 3E includes various trust scenarios. In one such scenario involving implicit trust, the application server 390 may trust the edge device 360 to validate the information coming from all sensors 350 connected to it, but the application server 390 may not explicitly trust each sensor 350. The application server 390 may ignore the sensor's 350 signature if the application trusts the edge compute node 360.

In a second scenario-one involving explicit trust, the application server 390 may trust the sensors 350 explicitly, and ignore the signature of the edge device 360. This explicit trust scenario is found, for example, in the field of message security.

In a third scenario-combinatorial trust—the application server 390 may trust certain kinds of information curated by the edge device 360, and certain types of information from specific devices 350. This combinatorial trust scenario is found, for example, in the news industry.

In other embodiments, an edge compute node 360 may authenticate all information from sensors 350, and only send summary information to the application server 390. In this case, any message signatures attached to original messages would not be useful to the application because the original messages would not be included in the messages sent from edge to application.

A more detailed description of the communication is shown in FIG. 3F. First, Device 350 signs its MSG using its own private key (i.e. it adds DEV SIG), thereby generating signed message 370. Device 350 then retrieves edge public key 382 from DNS 380. The retrieval process may include sending an authentication query to the third-party server in a way similar to the discussions in FIG. 3B and FIG. 3D. Device 350 uses edge public key 382 to encrypt telemetry (enclosed in Edge Encrypted), thereby generating encrypted telemetry 371. Device 350 now transmits encrypted telemetry 371 to Edge 360.

Edge 360 decrypts encrypted telemetry 371 using its own private key. Edge 360 then verifies the DEV SIG of now decrypted signed message 370 against device public key 383 from DNS 380. Edge 360 now adds its signature to the device's signed message 370 (adds EDGE SIG). Next, Edge 360 retrieves application public key 381 from DNS 380, and encrypts its signed payload with this public key of application server 390 (enclosed in Application Encrypted), thereby generating encrypted message 373. Edge transmits encrypted message 373 to Application server 390. Again, the retrieval process may include sending an authentication query to the third-party server in a way similar to the discussions in FIG. 3B and FIG. 3D.

Application server 390 decrypts the payload of encrypted message 373 and uses edge public key 382 from DNS 380 to verify the outer signature, device public key 383 to verify the inner signature.

One or more of the DNS records application public key 381, edge public key 382, and device public key 383 is delegated to the third-party server 140 which manages these records. This third-party server 140 management of one or more of records 381, 382, and 383 is performed on behalf of the owners or manufacturers of application server 390, edge 360, and device 350, respectively.

As noted, the chained messaging of FIGS. 3E and 3F may be found in the news business. In the place of sensor devices 350 generating signed sensor information 370, the news business often starts with sources providing signed information and quotes to reporters, who then generate a story, which an editor edits and then completes. The news publisher then sends the completed story to one or more distributors, who, in turn, publish the story on one or more platforms. Finally, consumers read and/or watch the story on these platforms.

Each actor in this chain-source (e.g. a vehicle manufacturer), news organization (reporter, editor), distributor (e.g. news distributor), and platform (e.g. an online social networking platform)—could maintain its own private key, and also maintain the corresponding public key in DNS. These keys are used to ensure trust in the news chain. As discussed below, using the third-party server 140 for managing the public keys is optimal for each actor.

For example, a news organization may sign a story and publish it on the news organization's official website. Signed emails from a news organization, which contain a summary and a link to the online story (on a web page in the news source's domain) give the consumer the ability to further verify the validity of the summary, as long as the article has not been modified in any way. Perhaps the web browser or other distribution platforms, such as social media feeds, support the ability to reference a public key hosted in the news source's DNS namespace for cryptographic verification of summary and/or original content.

Another complex and dynamic example use case is elections of all kinds, from elections for local school boards up to national public elections. Overall security generally, and specifically the veracity of the election results, are concerns. Elections are discussed below in connection with FIG. 5.

Example of Contextual Authentication

Figure 4:
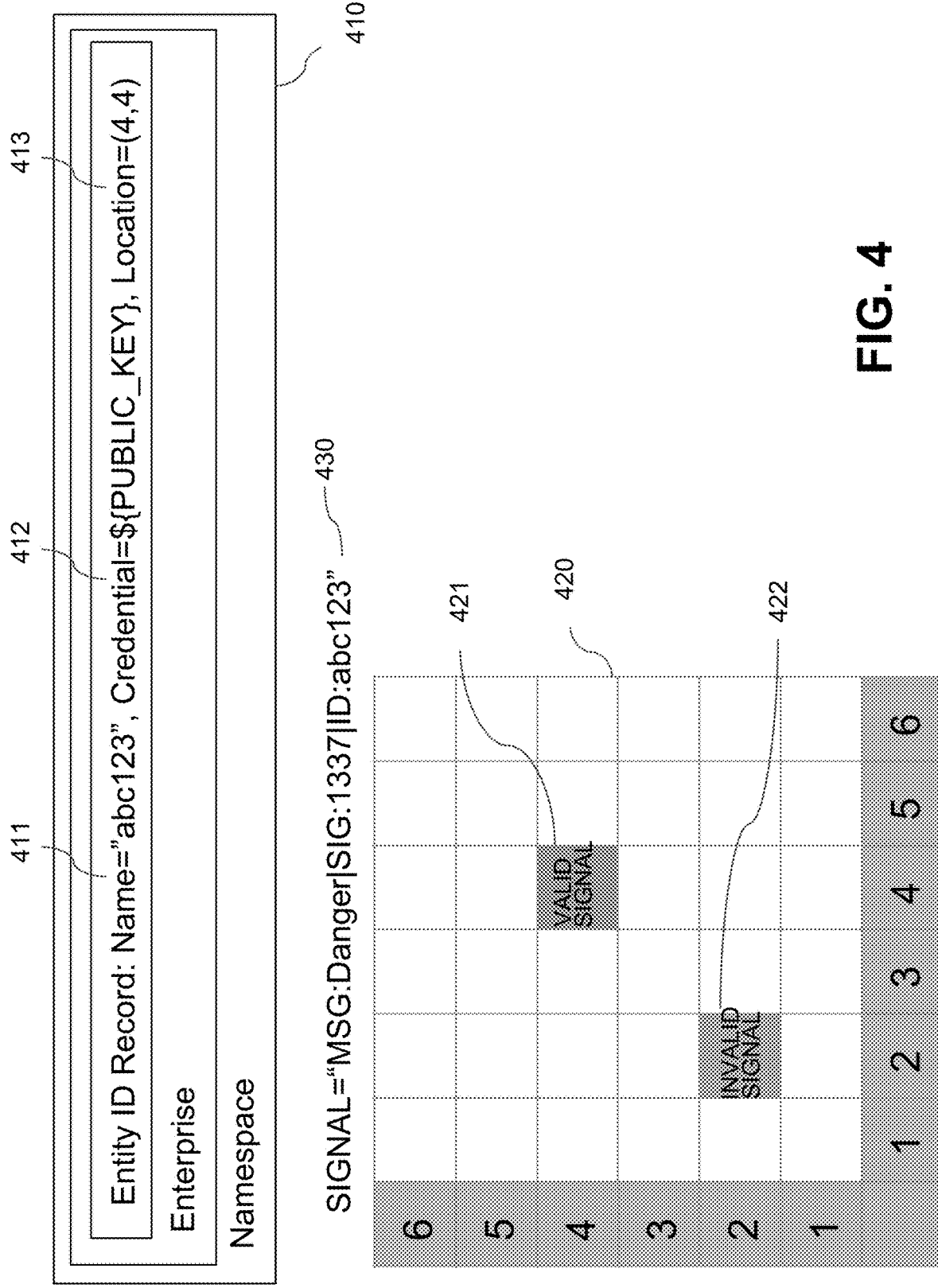
FIG. 4 is a conceptual diagram that shows how an authentication location context can be stored in a DNS record, in accordance with some embodiments.

FIG. 4 shows how an authentication location context can be stored in a DNS record 410 (an example of identity record 146) and used to manage communications. An example of FIG. 4 is an automobile with a sensor that is traveling on a coordinate plane 420 and which encounters beacon signals. Spatial beacon signals are subject to replay attacks, where a signal may be artificially propagated through amplification, or capture and replay at a distance.

An organization 110 that deploys the beacon uses a DNS record 410 to declare exactly where 413 that beacon is authorized to work. Any beacon transmissions detected outside of the expected range should be ignored or reported. The DNS record 410 may be saved as key-value pairs, as shown in FIG. 4. Continuing with the example, the sensor on the automobile may use its own location together with the authoritative entity record for the beacon 410 to authenticate not only a digital signature 412 on the transmission but the location at which the beacon is detected. The implementation may also be used in collision avoidance of autonomous vehicles, satellites, and/or drones that operate in a third-dimensional space or even off-planet.

In FIG. 4, the sensor detects the same beacon at two different locations. The signature is cryptographically verifiable at both locations. One beacon is detected at the location (2,2) 422 and the other is at (4,4) 421. The sensor knows by referencing the authoritative Entity ID Record 410 that the only valid location for that beacon is within the (4,4) 421 square. The sensor knows that even if the message detected at (2,2) 422 passes cryptographic authentication, it should not be trusted because the actual beacon is not within the specified range 413. This technique prevents not only the replaying of a valid beacon signal but the theft and re-deployment of a beacon.

FIG. 5 shows how three different example authentication contexts can be stored in a DNS record 510 (an example of delegated namespace zone 132 that includes identity records 146) and used to manage communications. The three contexts in FIG. 5 are (1) transmitter identity, (2) the number of communications, and (3) time constraints. These pieces of information may be examples of identity records 146. In FIG. 5, in order for a message to be authenticated, multiple transmitters are specifically identified, they are permitted only one communication per day, and therefore the recipient device 180 will only process the first successfully-authenticated message per day, and only between the dates specified in record's context. The third-party server 140 manages the identity record 146 that may be set by the organization 110 that controls the transmitters. The organization 110 may set context and authentication rules for each device separately or collectively at scale.

Restricting the number of communications allowed within a time limit allows the party responsible for the device to describe its normal mode of operation. If message frequency exceeds the specified number of communications within the device's duty cycle, the receiving party may choose to: (1) Discard excess communications, even if they are determined to be authentic; and/or (2) Report the anomalous behavior to the party responsible for managing the device.

In the case of election security, the system may easily detect the repeated (and fraudulent) use of a PKI-enabled voting token. In the case of environmental sensors, an overly-frequent update pattern may indicate that a device is malfunctioning, or that the device's private key has been compromised and the responsible party should investigate the device, or revoke its ability to authenticate by deleting its public key from DNS, or tombstoning the identity record so that the name cannot be re-assigned to another device. In an embodiment, these alternative choices of actions can be configured by an administrative device 116 to the third-party server 140 using the third-party server 140 client communication interface.

FIG. 5 provides one illustration involving an organization 110 that makes and manages sensors, and consumers who want to allow some of these sensors managed by the organization 110 to submit measurements to an application of the consumer. Each consumer trusts the organization 110 to manage those sensors and namespace records 510 containing the public key credentials 512 (an example of identity record 146).

While messages may authenticate on credential 512, the consumer application may reject any message that does not bear the signature of an authorized device, any message that is delivered outside the time limit 514, or any message that is delivered more than once (see 513). Any of these contextual failures may cause overall authentication failure of the message.

With a hierarchical namespace, matching based on hierarchical name labels can simplify the creation of rules. For instance, if all devices matching.sensors._devices.example.com are permitted, then abc.sensors._devices.example.com would be permitted, but abc.sensors._devices.otherdomain.com would not. Using label matching together with device name (domain=._devices.example.com AND device name in [abc123, def456]) may be used to simplify rule management.

In the list of messages 530, all messages other than the one by def456 will be dropped, even if their signatures 512 are valid. The message from ghi789 will be dropped because the device is not authorized for customer application. The message from abc123 will be dropped because even though the device is authorized for the customer application, the message represents the second communication from abc123 prior to the time range 514, and as such is invalid.

Notably, the three contexts of FIG. 5 are the same ones used in some public elections. Under the "one person, one vote" rule of voting, the jurisdiction has many specifically identified citizens of voting age, each of whom is represented by a row in DNS record 510. These are the "potential voters". A subset of those potential voters have registered to vote in an upcoming election, and those registered citizens are recorded by the election monitors in database 520. Then, during the election, the system records the votes in database 530.

In another election embodiment, voter anonymity may be a concern as a jurisdiction aggregates the individual votes. In this embodiment, the jurisdiction might submit as a context an aggregate number corresponding to a total number of votes that will trigger a review of the voting for possible improprieties. For example, if the post-election data shows that 70% of the registered voters actually voted, but the limiting context submitted by the jurisdiction was 65% (corresponding to, say, the second standard deviation past the mean for all voting records for the jurisdiction over the past few decades), the third-party server 140 would notify the jurisdiction that the condition for a review of the voting has been triggered. The system ensures that votes of only registered citizens are counted, that the votes are cast within the time range 514, for every registered voter, only the first message (vote) 513 from each registered citizen is recorded.

In the days prior to the election, the system could automatically contact the registered voters who appear in database 520 but who have not as yet cast a valid vote as recorded in database 530, to remind them to vote.

Contexts that constrain the authentication of a message may arise from in an application environment. In some embodiments, the third-party server 140 is agile enough to provide for new contexts and the continual refinements of existing ones. The contextual authentication may be performed by the delegated authentication service engine 210, as discussed above in association with FIG. 2. The third-party organization that operates the third-party server 140 is typically a business with a hierarchy of roles that dictate the ability to create or refine contexts for its customer base. For example, an administrator from an organization 110 with the permissions to use or configure the third-party server 140 may have control over the delegated namespace zone 142 of the organization 110. User accounts within the third-party server 140 may manage the identities which fall under the purview of a particular business unit. Labels in the DNS names representing entities may be used to represent this hierarchy. A named entity device 130 may be allowed to manage its own authentication context via the third-party server 140. This depends on business use cases. An advantage of the third-party server 140 is the ability to manage the scope that identities (user accounts, device identities, or other) are allowed for managing other identities within the same system.

By way of example, the news business provides an example of the need for continual refinement of context. An online news publisher publishes a public key and contextual authentication record in DNS for every author and editor. As articles and other contents are published, the news publisher adds signatures for the author(s) and editor(s). The contextual references may contain channels (RSS feeds and the like) through which the authors and editors are allowed to publish articles. This allows any consuming system to not only authenticate the organization and the individuals producing the content but also prevents unqualified parties from publishing news through channels that are not explicitly allowed. This system can, for instance, keep a local news sportscaster from writing for the science column, without the organization approving them for the science channel. Revoking any key, for instance, if an author is found to be plagiarizing content, an organization may immediately repudiate any content that the author's key had signed.

This contextual authentication mechanism for syndication channels also allows a customer to audit the syndication system and the content flowing through it. This can be used for detecting when sportswriters decide to contribute to the weather column, and it can even be used in the news publisher's internal publication workflow system to apply more scrutiny (or automatically invite an expert to contribute) to an article related to a topic for which the author(s) and editor(s) are not experts.

Example Alternatives to DNS

Figure 6:
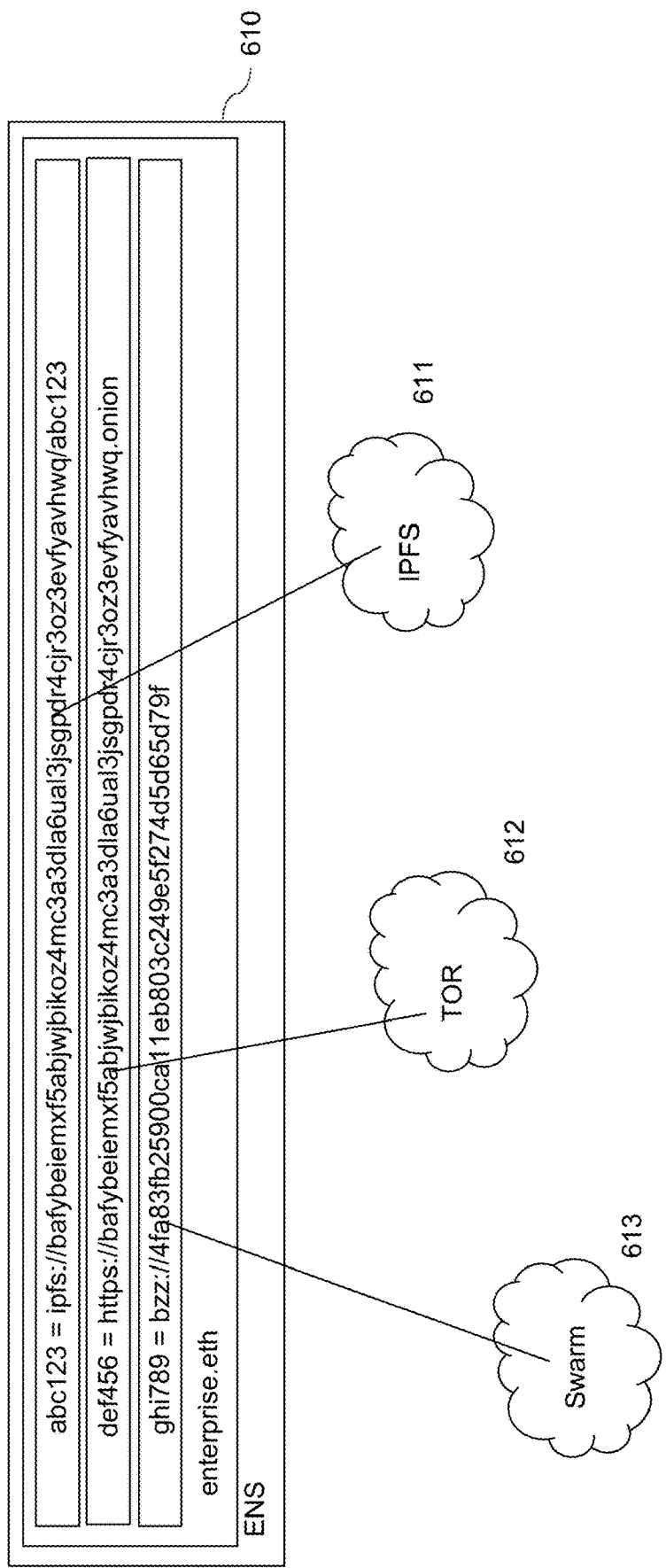
FIG. 6 is a conceptual diagram illustrating how authentication context or other types of identity records can be stored in a blockchain platform, in accordance with some embodiments.

FIG. 6 is a conceptual diagram illustrating how authentication context or other types of identity record 146 can be stored in a blockchain platform rather than DNS. In the example of FIG. 6, an organization 110 stores device public keys in blockchain and other distributed systems. The organization 110 uses the Ethereum Name Service ("ENS") as a universal discovery mechanism for public keys or other authentication material stored on various distributed systems.

The Ethereum ENS service is similar to DNS in that it provides a mechanism for resolving human-readable hierarchical names to addresses. In this case, the addresses are not necessarily IP addresses, but may be content hashes or URLs for content stored in other distributed systems. ENS allows records to point to smart contracts on the blockchain, which can be used to provide name resolution services in a manner similar to how NS delegation works for DNS.

Using ENS instead of DNS allows the separation of the record locator from the content. ENS records can point to content hashes in IPFS (p2p file system) 611 or Swarm (blockchain) 613, or even a page stored on a TOR node 612.

One advantage with ENS is that records can be stored in a variety of other systems, and those systems may be managed by other entities. ENS also supports delegated management of sub-namespaces. The advantage here can be a hindrance though, because each system housing the actual public key record presents information in a different way. This is restricting and requires a translation layer to be created within each application, for ENS and every storage system that will be interacted with. FIG. 7 is a conceptual diagram that illustrates the distributive nature of blockchain records.

Third-Party Authentication Management of Complex Communications

Figure 8A:
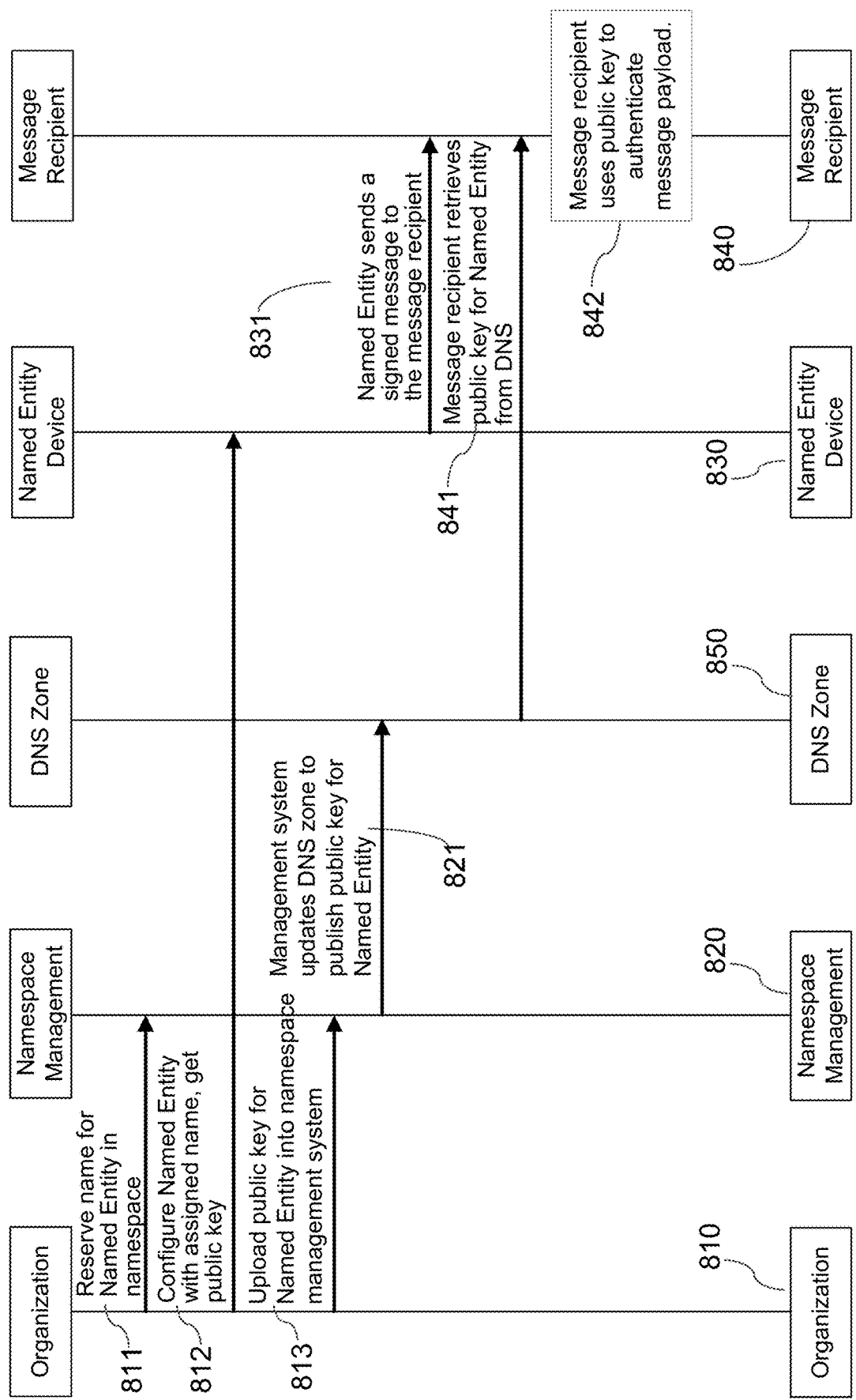
FIGS. 8A and 8B are flowcharts depicting an example process for the authentication of a message sent from a transmitting entity to a receiving entity, in accordance with some embodiments.
Figure 8B:
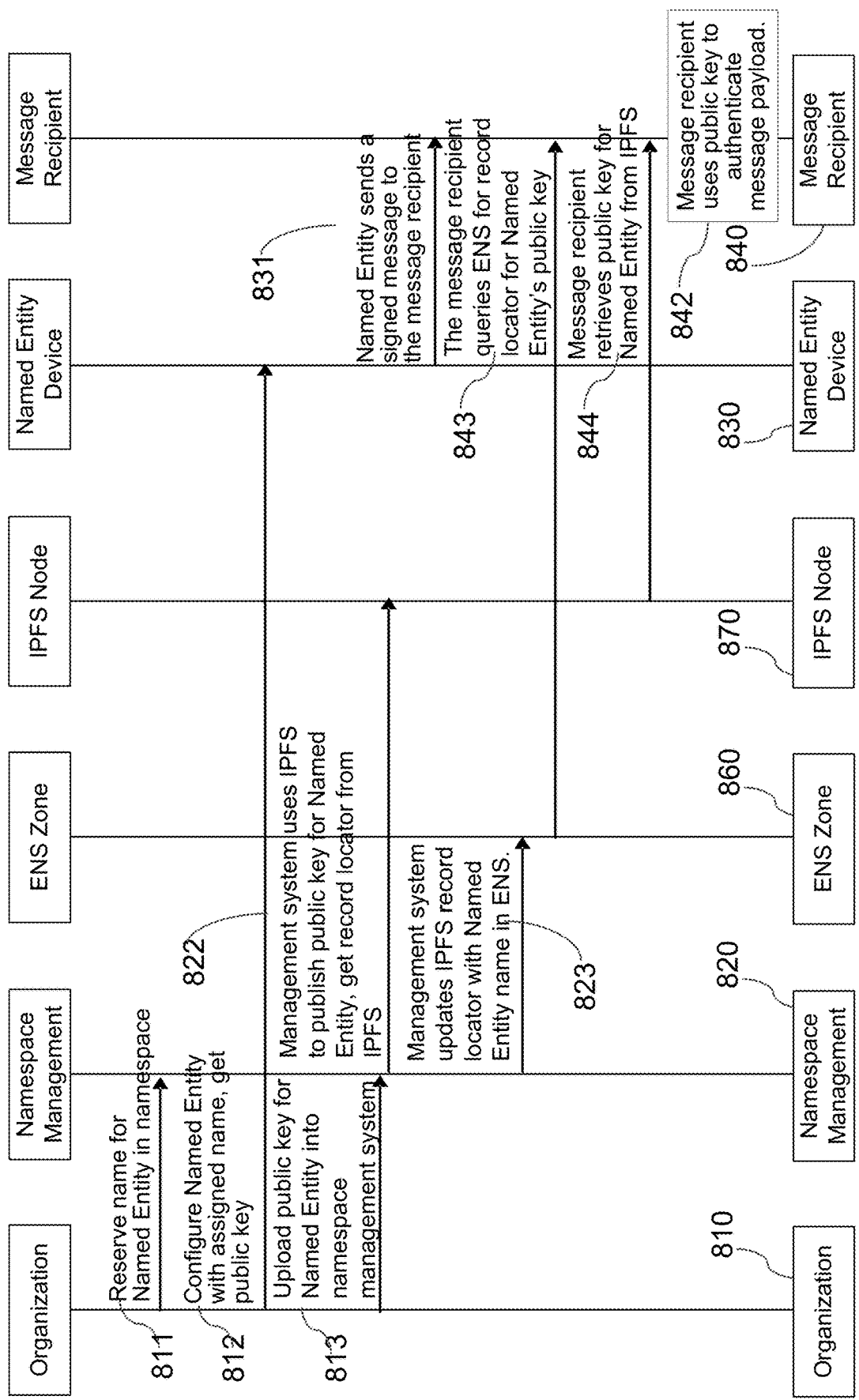

FIGS. 8A and 8B are flowcharts depicting an example process for the authentication of a message sent from a transmitting entity to a receiving entity. These two communicating entities are not shown in FIG. 8A or 8B. Instead, FIGS. 8A and 8B shows the entities' employees, devices, proxies, systems, and other systems that they use. Accordingly, FIGS. 8A and 8B show various entities as well as ordered actions that these entities take. In FIG. 8A, the distributed database that is used for authentication is DNS; in FIG. 8B, it is ENS and IPFS.

FIG. 8A shows multiple entities. Named entity device 830 is an entity with a namespace-based identity, such as an IoT device, an API service endpoint, or a human (via smart card or other physical identity-proving mechanism). Named entity device 830 is an example of named entity device 130. Named entity device 830 is the message transmitter in this example. Organization 810 is the responsible party that manages the public identity for named entity device 830 and the communications through the named entity device 830. In some embodiments, the named entity device 830 is controlled by the organization 810.

The organization 830 typically owns its own namespace. For the example URL "example.com", the organization "Example Company" owns everything under that label in DNS, including all subdomains and other records. In one embodiment, DNS zone 850 is a delegated portion of the organization's DNS namespace, which may be controlled by the third-party server 140 (not shown in FIG. 8A). Continuing with the example, the organization 810 delegates a zone such "_devices.example.com." to the third-party server 140 to host records on its behalf. Put differently, DNS zone 850 may be operated by or be part of the third-party server 140.

In FIG. 8A, DNS zone 850 is delegated by the organization 810 to the third-party server 140. Further, the setting of the DNS zone 850 can be configured by organization 810 using namespace management 820, which is provided for and managed by the third-party server 140. The organization 810 may be operating a user device 160 (not shown), such as the administrative device 116. The namespace management 820 serves to provide a public identity for the named entity device 830 so that message recipient 840 may authenticate messages purportedly from the named entity device 830, thereby mitigating fraudulent impersonation.

Message recipient 840 can be a recipient device 180, a message receiving server 170, or another named entity. Message recipient 840 is the party that needs to authenticate the message. Message recipient 840 may be another device or system, or even a human recipient of a message generated by the named entity device 830. Message recipient 840 may or may not fall within the same management scope or business ownership as named entity device 830, organization 810, or DNS zone 850. Message recipient 840 could be anything or anyone on the Internet receiving a message from named entity device 830.

In FIG. 8A, as noted, the third-party server 140 operates the namespace management 820 and DNS zone 850—typically computer servers whose components may be shown in FIG. 24—on behalf of the organization.

FIG. 8A shows a setup or configuration stage, followed by one or more message sending stages. The configuration stage begins with step 811 in which the organization 810 registers named entity device 830 with the namespace management 820 server of the third-party server 140. In doing so, the organization 810 receives a name assigned by the namespace management 830 for the named entity device 830.

Step 812 generates a key pair including a public key and a private key. In some use cases, the named entity device 830 may generate its own key pair and reveal the public key to the organization 810 in the form of a certificate signing request or raw public key. In other implementations, especially with constrained devices with a lack of entropy, it may make sense to use a dedicated key generation appliance for generating high-quality keys, which are then installed by the organization 810 into the named entity device 830. No matter how the keypair is generated—whether within the device or by a specialized system—the public key and/or other identity records 146 are acquired by the organization 810 in step 812 and configured in the namespace management 820 system to be associated with the universal name of named entity device 830 (obtained in step 811), which is published by the third-party server 140 in the DNS zone 850.

In some cases, the reason for steps 811 and 812 (e.g., configuring the named entity device 830 with a universal name when the public key is generated) is because the public key may be delivered in a certificate signing request (CSR). The CSR contains the information that the certificate authority uses to create the device certificate, including the universal name, and must be signed by the named entity device 830's private key.

Even if the organization 810 wants to simply publish a raw public key, rather than a signed certificate, the named entity device 830 still must know its own name so that it can self-identify via message payload, so that the message recipient 840 may retrieve the public key or certificate used to validate message signatures.

In step 813, for uploading the public key or other identity records 146 of named entity device 830 to the namespace management 820 server of the third-party server 140, one or more methods may be used. In one method, organization 810 uses a browser-based web application to upload a certificate or public key to associate with the DNS-based identity of named entity device 830. In a second method, organization 810 may operate an automation against a RESTful web interface of the 3PSP, in order to bulk-upload public keys or certificates into the namespace management 820 system.

In a third method, a computer program running on behalf of organization 810 or the transmitter consumes certificates from a certificate authority's (CA) automated system. Each certificate has a unique name, which maps to a name in DNS under the control of the organization. The CA ensures that there is never more than one certificate valid for each name, for each identity managed by the CA. As new certificates are created by the CA (through a separate process) the certificates are synchronized and automatically published in the DNS zone. In one embodiment, the third-party server 140 interfaces with the CA on behalf of the organization.

In a fourth method, the process by which named entity device 830 as a device may even claim its own name in DNS using a signed certificate. This method allows the organization to declare a signing authority for a zone, and then devices with names that may fall within the zone may claim names and self-publish certificates within DNS. The named entity device 830 interacts directly with namespace management 820 and uses its private key to prove its identity via the CA-issued certificate. If the device can prove identity via its certificate, and trust via a cert chain to the zone's CA certificate, the namespace management 820 system allows the device to self-publish.

An entity claiming its own identity within a namespace constrained by a signing authority may not need the involvement of a system administrator or other technical representative of the enterprise. In one embodiment, the entity may submit a certificate for publication to the namespace management system if all of the following conditions are satisfied: (1) The name falls within the scope of the managed zone; (2) The name has not already been claimed; (3) The certificate validates to the signing authority for the zone; (4) The certificate has not been revoked; and (5) The submitter can prove possession of the private key (either by signing the API interaction payload containing the certificate together with a nonce or other secure payload authentication mechanism). If all of these conditions have been met, it then stands to reason that the entity is entitled to establish a named identity within the requested zone and can do so without administrative human intervention.

In many cases, a user will need to provide an authentication context for the messages sent by the named entity device 830 beyond the simple proof-of-possession of the private key corresponding to the public key represented in DNS. In one example, a user may wish to set a spatial constraint to an authenticated beacon, which tells the authenticator to authenticate the beacon only within a certain distance from a specific location.

The user has permissions to change the DNS-hosted identity-related metadata for one or more DNS-based identities in one or more delegated DNS zones, which are hosted by the 3PSP. The user, via an authenticated session in the namespace management 820 system's web interface, sets the beacon's valid geolocation and radius. The namespace management system translates the user's submitted configuration information to a formatted DNS record and publishes it as a resource record under the device's name. DNS allows the publication of multiple resource records under the same name. Following a similar logic, an entity with a DNS-based identity may be allowed to update its own authentication context information, via an API, so the entity has autonomy in the self-management of identity and identity-related information like authentication context.

In an embodiment, the user submits the configuration information according to Sender Policy Framework (SPF) rules, and the namespace management system translates this submission into DNS records as is described in U.S. patent Ser. No. 10/122,765B1 regarding a "rule creator." In another embodiment, the user submits the configuration information according to any structured format known in the art, and the namespace management system automatically translates this submission to the structured format required by the database (e.g. DNS, ENS, etc.).

In an example of an embodiment in which DNS is used as the database and the context is location, a user places a highway beacon on-site to signal to pass vehicles that dangerous road conditions are ahead. The possibility of error in configuring a DNS record to accurately reflect the location of the beacon is high, especially with users who are not skilled in the art of namespace management. Placing an administrative device 116 which may have a GPS receiver (or another mechanism for determining geolocation) in the hands of a user allows the user to walk through a simplified deployment process wherein the administrative device 116 requires only the entry of the beacon ID, and sends a request to the third-party server 140 containing the beacon id and the computed geolocation. The third-party server 140 then ensures that the submitted information is formatted correctly before publishing the record in DNS.

The foregoing example, which concerns a spatial constraint context, can be applied to any of the contexts discussed herein.

In step 821, the namespace management 820 server publishes, in the DNS zone 850, the public key or certificate for named entity device 830 that it received from organization 810 in step 813. After step 821, the configuration stage is now complete. Named entity device 830 is now ready to send secure authenticated messages.

The message sending stage begins with step 831 in which the named entity device 830 creates a message, signs it with the private key that is generated in step 813, and then sends this signed, encrypted message to message recipient 840. The message may be encrypted by named entity device 830 by retrieving the authenticator's public key from DNS Zone 850, and using it to encrypt the signed message. This step is not pictured in the figures but may take place immediately before step 831.

In step 841, having received the signed message, message recipient 840 now queries DNS zone 850—managed by the third-party server 140—and retrieves the certificate for the named entity device 830 and/or other identity records 146. If the message was encrypted as well as signed, the authenticator uses the public key inside the certificate to cryptographically authenticate the message.

In some embodiments, the resolution of whether a context is met or not can be a computationally expensive task. The geolocation context example of the current discussion may involve this type of expensive task. It involves determining whether a point on a plane is within a complex polygon, especially if, instead of a plane, the surface is a sphere (e.g. geofencing and haversine calculation). A computationally-constrained entity (e.g. a certain kind of IoT sensor) may have specialized hardware (like a secure element) for performing cryptographic operations, but insufficient computation resources to calculate whether a point is within a complex geofence (for example, a concave hull geofence, K-nearest algorithm, or Haversine formula).

For this reason, in some embodiments, the third-party server 140 provides an authentication offloading service where an authorized sensor may submit a signed payload signed by the sensor, and optionally encrypted—to the third-party server 140. The signed payload, at a minimum, must include the name and location of either the sensor or the detected entity. If the third-party server 140 is configured to trust the constrained device (the Message recipient 840), the third-party server 140 may authenticate the requesting device's payload, expecting that the originally signed payload from the beacon has already been authenticated by the message recipient 840.

This reduces the size of the transmitted payload and delegates trust to the IoT device for cryptographic verification. The original beacon's signature is replaced by a signature that is generated by the detecting device, instead of having the message contain both signatures.

After the third-party server 140 validates the IoT device's message signature, the third-party server 140 uses the detected entity's name to retrieve the authentication context from DNS. The authentication context (retrieved from DNS using the detected entity's name) is compared against the detected entity's location, as reported by the authenticator (the constrained device). The third-party server 140 performs the geospatial calculation and returns a boolean determination as to whether or not the detected entity is within the authentication context. Another advantage of this approach is that the algorithm for determining contextual authentication is centralized in the third-party server 140, and may be changed or optimized without updating code on the devices themselves.

In step 842, the message recipient 840 uses this public key to authenticate the message that it received from named entity device 830.

Example ENS/IPFS Implementation

FIG. 8B is similar to FIG. 8A except that the DNS Zone 850 in FIG. 8A is replaced with the ENS zone 860 and IPFS node 870 in FIG. 8B. In some embodiments, from the perspectives of the organization 810 and named entity device 830—the client or customer of the third-party server 140—nothing changes between FIG. 8A and FIG. 8B. As discussed above, the third-party server 140 may take different forms. The type of backend distributed databases the third-party server 140 uses for storing and managing the authentication data may be replaced from a DNS server to an ENS/IPFS implementation.

In some embodiments, the only parties that experience a difference due to the type of distributed database are the third-party server 140 itself, and the message recipient 840 when it attempts to retrieve the public key and/or other identity records 146 for named entity device 830. For the third-party server 140, step 821 in FIG. 8A is replaced with steps 822 and 823 in FIG. 8B. In step 822, the namespace management 820 server publishes the public key not in the DNS zone 850, but rather in the IPFS node 870, thereby receiving a record locator from IPFS.

In configuration step 823, namespace management 820 server associates the record locator it received in step 822 with the name of the named entity device 830 stored in ENS zone 860.

With step 823, the configuration stage is now complete. Named entity device 830 is now ready to send secure authenticated messages. As with FIG. 8A, the message sending stage of FIG. 8B begins with step 831 in which the named entity device 830 creates a message, signs it with the private key that is generated in step 813, and then sends this signed, encrypted message to message recipient 840.

Now, in FIG. 8B, for retrieving the public key of named entity device 830, the message recipient 840 queries not the DNS zone 850 as in FIG. 8A, but rather the ENS zone 860. In step 843, message recipient 840 queries ENS zone 860 for the IPFS record locator of the identity records 146 for named entity device 830. Having received that record locator, in step 844, message recipient 840 uses it to query IPFS node 870, and thereby retrieve the public key of named entity device 830. Having received this public key, the messaging step 842 is the same as for FIG. 8A.

Additional Details for Message Authentication

Figure 9A:
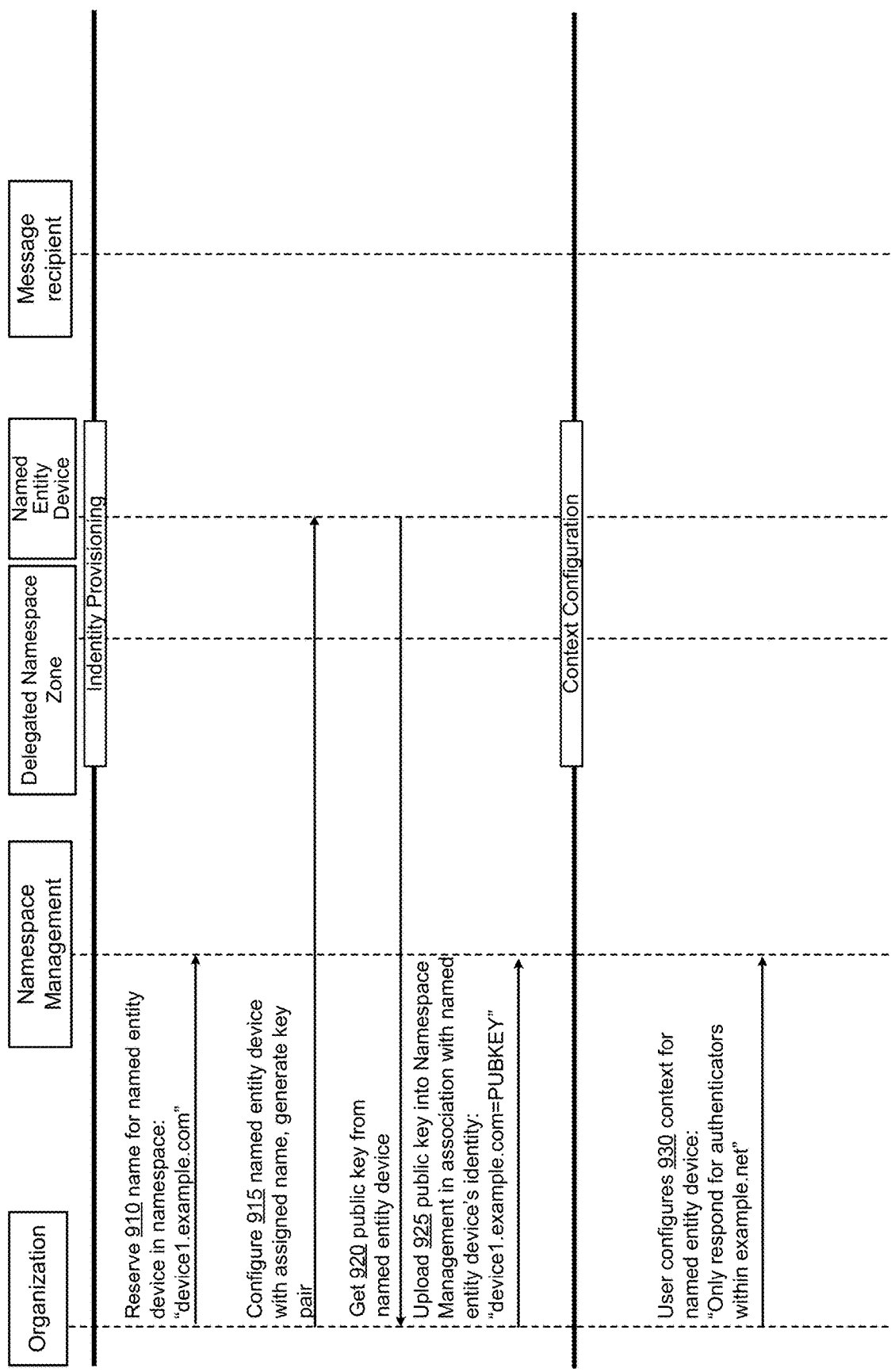
FIGS. 9A and 9B are flowcharts depicting an example process of message authentication, in accordance with some embodiments.
Figure 9B:
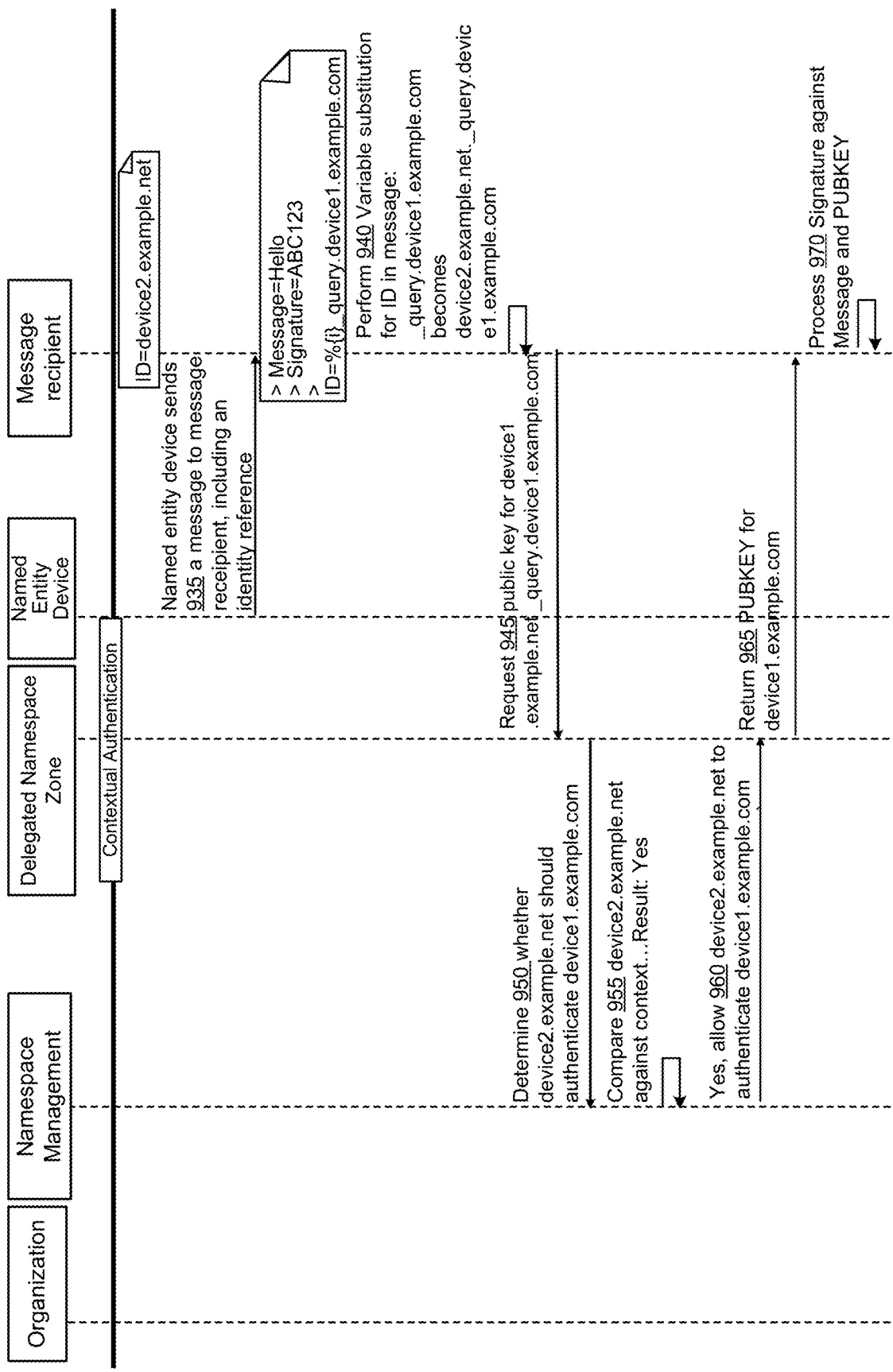

FIGS. 9A and 9B depict another example process of message authentication, in accordance with some embodiments. A third-party server 140 (not shown in FIG. 9A) may operate a delegated namespace zone. The named entity device is a message transmitter in FIGS. 9A and 9B.

The process may include, in step 910, the organization reserving a name for a named entity in a namespace, for example, "device1.example.com." In step 915, the organization configures the named entity with an assigned name and generates a key pair. In step 920, the organization receives a public key from the named entity device 130. In step 925, the organization uploads the public key or other identity records 146 to namespace management operated by the third-party server 140. In step 930, the organization configures authentication context for the named entity device 130. The authentication context may take the form of a set of rules that specify how the third-party server 140 should generate an authentication response. For example, a rule may be "only respond for authenticators within example.net."

In a message contextual authentication stage, in step 935, the named entity device 130 may send a message to a message recipient. The message may include an identity reference such as an identifier of the named entity. The message recipient may be associated with an identifier device2.example.net. The message may include the payload "Hello", a signature=ABC123, and a transmitter device identifier ID=%{i}_query.device1.example.com. In step 940, the message recipient may perform variable substitution for ID in the message. %{i}_query.device1.example.com may become device2.example.net._query.device1.example.com.

In step 945, the message recipient transmits an authentication query to the delegated namespace zone to request the public key for the named entity device 130 using the name for the identity record 146 device2.example.next._query.device1.example.com. The authentication query may include the querying device ID but does not need to include the message payload. In step 950, the delegated namespace zone forwards the authentication query to the namespace management operated by the third-party server 140 to determine whether device2.example.net should be authenticating device1.example.com. In step 955, the namespace management of the third-party server 140 compares device2.example.net and other information in the authentication query against the authentication context rules specified by the user. In step 960, the namespace management allows device2.example.net to authenticate device1.example.com. In step 965, the delegated namespace zone returns the identity records 146 (e.g., the public key) of the named entity device 130 for device1.example.com to the message recipient. In step 970, the message recipient verifies the signature against the message using the public key.

Example Improvements to Authentication

Maintaining authentication procedures and information could be a complex and technically challenging task for many organizations and businesses. DNS and other distributed systems that operate on the concept of delegated hierarchical portions of the namespace can be expensive to set up and maintain. The benefit for a business to manage its own namespace authentication functions directly is minimal and is preferably delegated to a third-party server 140. Managing DNS records related to authentication and trust requires deep and very specific domain knowledge in order to implement protocols correctly, and to perform ongoing maintenance tasks without interrupting the business. Bear in mind that namespace could be critical technology of email and web, and misconfiguration of a namespace zone (e.g., DNS zone) can lead to a costly interruption. Adding to the difficulty in hiring technologists with this specific domain knowledge, the modern enterprise oftentimes owns many domain names representing sub-entities, which makes management more time-consuming and carries a greater potential for interruption when these zones are consolidated within the same infrastructure.

The level of effort required to manage and maintain the modern enterprise's DNS infrastructure quickly outpaces the capabilities of in-house technical resources. For these reasons, enterprises may have DNS zones that pertain to specific sets of technical requirements, which can be delegated to the third-party server 140 that offers management and automation functionality for those specific use cases. An example of this is the proliferation of email marketing platforms, which send mail using delegated subdomains, such that they control all the appropriate authentication and mail exchange records to ensure proper delivery, as well as email authentication companies, which host public keys for email domain identity and may also offer simplified interfaces for managing and automating policy construction.

Embodiments described herein allow organizations and businesses to delegate this part of the management to the third-party server 140. Beneficially, a customer of the third-party server 140 may select the settings of authentication through a user-friendly application provided by the third-party server 140. The third-party server 140 translates the setting to DNS records or other records in a proper format. Using the system environment 100, a domain owner is able to send messages and still have these messages validated by the recipients as being authentic. Instead of updating a variety of contextual authentication records, a DNS server may construct a simple set of rules depending on the identifying information accompanying a received message. Furthermore, the message recipient does not need to query a large number of DNS records, because the pertinent contextual authentication information is presented in response to the query. This increases performance and simplifies the management of authenticating messages, while still providing security and preventing fraudulent or suspicious messages from being received. Additional details and examples of practical implementations in various settings are described with the additional figures below.

Although an organization 110 can conceivably manage the distributed database-DNS, ENS/IPFS, or other—by itself, this self-management is quite difficult to manage at scale. By having the third-party server 140 manage these components of message authentication on the organization's behalf, the third-party server 140 may respond to authentication requests in real-time, and enables the organization 110 to manage, maintain, and revoke everything it attests to in real-time through, for example, SaaS control system of the third-party server 140. This control system can be a SaaS website, a mobile phone app, a voice-controlled telephone system, API, or any other control system known in the art.

The third-party server 140 performs authentication management for its clients. An embodiment may rely on PKI for authentication; other embodiments may rely on other authentication mechanisms that have a "public" portion, for example, SPF for email.

The more communications and contexts for those communications in which a business engages, the more messages the business needs to authenticate, and the more complicated this is for the business to do this manually by itself, or even with custom software. Moreover, if business criteria change, the business will want an easy place to manage it all from, specifically, the communication interface of third-party server 140.

For example, certain changes in business criteria might result in more complex contexts that require computation to resolve. If every device subject to these more complex contexts must have its software updated to compute these new contexts, the business is faced with an IT nightmare every time the business people change policies due to novel threats arising in the public sphere. Instead of trying to write business-logic specific code to manage all of this at scale, the business is much better served by relying on a third-party platform that provides all of these functionalities.

Delegation of DNS zones based on functional purpose allows the consumption of time-saving and simplified management interfaces for deeply technical tasks which are risky when performed by hand. DNS zone delegation also offers the business the ability to compartmentalize failure zones, where the failure of one DNS provider does not take down the entire enterprise's DNS infrastructure. For instance, if an enterprise delegates portions of its namespace, such as its name resolution for the second-level domain name, like "example.com", to the registrar, its email authentication to a third-party server 140, and the IoT device identity (devices.example.com) to yet another provider, a failure or misconfiguration in either email or IoT zones does not impact the basic IP address resolution processes for example.com, and allows the business to continue in a degraded state, without suffering a total outage.

Automatic Policy Determination and Distribution

FIG. 10 through 15B discusses various automatic policy determination and distribution examples that may be performed by the third-party server 140. Various policy services may be provided by the third-party server 140 to various organizations 110 as SaaS. Each organization 110 may delegate a portion of a public database, such as the namespace 112 to the third-party server 140 as delegated namespace zone 142. The third-party server 140, in turn, may respond on behalf of the organizations at scale. The SaaS may be multi-tenant that allows various organizations to have their own settings and configurations. The third-party server 140 may provide communication patterns concisely, universally, and securely. The third-party server 140 may use a broadly-recognized, delegated, and discoverable namespace for identity management. The third-party server 140 may provide services which allow organization to manage interaction control policies. The policies may be targeted policies. Depending on the rules in a policy, a targeted policy, which may be an interaction control list, may be presented to a policy consumer device 136 requesting the policy. The provided interaction control list may represent the logically adjacent entities with which the policy consuming device 136 is expected to interact. The third-party server 140 may provide dynamic responses to any requests for interaction control lists. The interaction control list representation may change dynamically, depending on context related to the entities within the policy or the policy consuming device 136.

Referring again to FIG. 1C, an example process of authorization determination is illustrated in accordance with some embodiments. An administrative device 114 provides one or more policy settings 120 to the third-party server 140. The policy settings 120 define the roles and rules of various participants in the application environment 105. While FIG. 1C shows a single organization 110, multiple organizations 110 may contribute to the policy settings 120. For example, in an application environment 105, the operator of the application environment 105 and the manufacturer of the policy consuming device 136 may both contribute to the policy settings 120. In some cases, the named entity device 130 may also serve as a message recipient. The administering entity of the named entity device 130 may also contribute to the policy setting 120 with respect to the policy of the named entity device 130. The named entity device 130 transmits a message 151 to the policy consuming device 136. In receipt of the message 151, the policy consuming device 136 may first authenticate the named entity device 130. The policy consuming device 136 may in turn determine the authority of the named entity device 130 in sending the message. For example, the policy consuming device 136 sends a query 138 to the third-party server 140. The query 138 may include the identity of the named entity device 130 and the message's metadata, which provide information on the nature of the message 151. The configuration and policy engine 144 may analyze various policy settings 120 from different organizations 110 to dynamically determine a real-time and customized response specific to the policy consuming device 136 given the situation. The configuration and policy engine 144 formats the response as an interaction control list 122 and transmits the interaction control list 122 to the policy consuming device 136. The policy consuming device 136 consumes the interaction control list 122 to determine whether the named entity device 130 is authorized and how the policy consuming device 136 should react.

The third-party server 140 may be a delegated server in the application environment 105. Various organizations 110 may delegate the determination of the appropriate response to query 138 to the third-party server 140. Being a delegated server, the third-party server 140 may serve as a well-known, centralized, and authoritative source for various application environments 105, which provides various advantages over having the organization 110 to determine a response. For example, the centralization of the determination of policies reduces the number of queries 138 need to be sent from the policy consuming device 136 in a given scenario. The policy consuming device 136 may be subject to policies of multiple organizations 110. The third-party server 140, serving as a centralized source, may determine a real-time and customized interaction control list 122 that is compiled from policy settings 120 provided by different organizations 110, thereby saving the policy consuming device 136 from querying multiple organization's servers. Also, by having a centralized server to serve as an authoritative source in the application environment 105, any policy command in the form of an interaction control list can be authenticated based on the digital signature of third-party server 140 by using the public key of the third-party server 140. Authentication is simplified as a result. The delegated nature of the third-party server 140 may also allow easier participation of policy setting from an organization 110 because the organization 110 may set a policy through a user-friendly interface of the third-party server 140 and does not need to have the specialty or knowledge in the communication protocols and technical complexity in providing interaction control list 122 to the policy consuming device 136.

The third-party server 140 is a known or discoverable server in the application environment 105. To allow devices to query the third-party server 140, the third-party server 140 may be associated with a point of interaction, which may be the third-party server's URI or URL for the query 138. The point of interaction may be stored in the memory of a policy consuming device 136 when the device is manufactured or provisioned so that the third-party server 140 is known and authoritative when the policy consuming device 136 is deployed. The point of interaction of the third-party server 140 may also be auto-discoverable. For example, the policy consuming device 136 may store the application name or other information for a location on the Internet (e.g., DNS) to look up the applications to which the policy consuming device 136 is subscribed and to look up the point of interaction of the third-party server 140. For example, the point of interaction of the third-party server 140 may be published in the namespace to which the application belongs. The auto-discovery allows the operating entity of the policy consuming device 136 to change the subscription of different applications and the third-party server to change the point of interaction. This reduces the required effort in provisioning or reconfiguring new devices, because the device may automatically discover the third-party policy server's interaction point without specific configuration on the part of the technical administrator.

A public namespace system such as DNS or a blockchain may be used in various aspects of the application environment 105, in accordance with some embodiments. In one aspect, the DNS may be used for auto-discovery of the point of interaction of the third-party server 140. For example, multiple policy consuming devices 136 may be operated by an organization 110 and have their identities living in a sub-namespace of the DNS of the organization 110. The organization may declare the point of interaction of the third-party server 140 at the location of the DNS. The policy consuming devices 136 may traverse its own DNS hierarchy to discover the point of interaction. The use of DNS to declare a point of interactions may also turn the applications in which a policy consuming device 136 participates into subscription-based. For example, a DNS location may include a list of points of interaction that serve as the subscription of the policy consuming device 136. The list of points of interaction may be easily changed by the DNS owner to adjust the subscription of the policy consuming device 136. The use of DNS auto-discovery may be used to place a record of application name and point of interaction in a well-known format at the device's DNS name, or at a well-known location in the DNS hierarchy above the device so that many devices under a branch of the DNS may get inherited application membership configuration.

In some embodiments, the DNS may be delegated to the third-party server 140 by an organization 110 that operates the policy consuming device 136 so that the third-party server 140 may control the identities of the policy consuming device 136 and freely adjust its point of interaction that is discoverable by the policy consuming device 136.

In another aspect, the public namespace system may also be used for the communications of a policy consuming device 136 and the third-party server 140. In some embodiments, an organization 110 may operate multiple policy consuming devices 136. The organization 110 may delegate the sub-namespace that contains the identities of the policy consuming devices 136 to the third-party server 140 for management. The policy consuming device 136 may send the query 138 as a form of DNS query. In turn, the third-party server 140 may publish the interaction control list 122 in the DNS for the policy consuming device 136 to retrieve as a TXT or other well-known record present in the DNS.

While a single application environment 105 is shown in FIG. 1B, a participant such as a policy consuming device 136 may participate in multiple applications environments 105. The names of the participating applications and the points of interaction may be stored in the device's memory or be auto-discoverable by the device. Some of the participating applications may be related to each other. For example, a set of applications may be associated with a hierarchy. A policy consuming device 136 may participate in a primary application, which may provide information with respect to a secondary application in which the policy consuming device 136 should participate given a situation, such as whether the policy consuming device 136 is geographically located. For example, an autonomous vehicle, as a policy consuming device 136, may be registered with a primary traffic application that is operated by a state department of motor vehicles. The primary traffic application may direct the vehicle to contact a second traffic application as the vehicle enters a local municipal.

The configuration and policy engine 144 manages the configuration of various policies as well as the generation of the policies during messaging between a named entity device 130 and a policy consuming device 136. The configuration and policy engine 144 stores the policy settings 120 and manages the scope or context of allowable communications by the members. In some embodiments, the policy definition includes a plurality of roles, each of which members is stored in the form of the identity of the named entity devices 130. A role may also be associated with one or more rules. A rule may define the authority of a role or a member. A rule may also define how a policy consuming device 136 may behave. The configuration and policy engine 144 may also store configuration information of each member device so that the configuration and policy engine 144 may generate the interaction control list 122 in an appropriate format. The configuration and policy engine 144 may also store information related to the communication channels to be used to communicate with the policy consuming device 136, such as a certain API or a DNS location.

By way of example, in response to receiving a message 151, the policy consuming device 136 may authenticate the named entity device 130. Upon successful authentication, the policy consuming device 136 may provide the identity of the named entity device 130 to the third-party server 140 as part of the query 138. The query 138 may also include metadata that describes the nature of the message 151 and contextual information related to policy consuming device 136. Contextual information may also include how the message 151 is received. Example contextual information may include the time of the message 151, the location of the policy consuming device 136, the operator identity of the policy consuming device 136, the number of messages sent from the named entity device 130 within a period of time, and other useful contextual information that may help the configuration and policy engine 144 to determine the appropriate policy. The configuration and policy engine 144 may rely on the identity in the named entity device 130 included in query 138 to identify a role to which the named entity device 130 belongs. Based on the rules associated with the role, the configuration and policy engine 144 determines whether the named entity device 130 is authorized to send the message 151 to the policy consuming device 136. The configuration and policy engine 144 may also select the rule that is applicable to the situation based on the metadata of the message 151 and the contextual information. The policy engine may generate an interaction control list 122 that includes the data for the policy consuming device 136 to determine how the device should react to the message 151. The interaction control list 122 may further inform the policy consuming device 136 on how to authorize future messages from the named entity device 130 given approved contexts in order to minimize future queries 138 given similar messages 151.

An interaction control list 122 may take various suitable forms and have different degrees of complexity in various embodiments. In some embodiment, the interaction control list 122 may include instructions for the policy consuming device 136 to execute. In some embodiments, the interaction control list 122 may include a list of identities of members that are authorized to communicate with the policy consuming device 136. In some embodiments, each authorized member listed may be associated types of actions that the member is authorized, such as read data, transmit data, unrestricted communication. In some embodiments, the interaction control list 122 may include a set of parameters and parameter values that are in the format of key-value pairs for the policy consuming device 136 to carry out a function based on the parameter values. In some embodiments, the interaction control list 122 may include a Boolean value that represents whether the named entity device 130 is authorized or not. For example, certain policy consuming device 136 (e.g., some IoT devices) may not be equipped with sufficient processing capacity to determine the action to be taken. The configuration and policy engine 144 may perform the computation on behalf of the policy consuming device 136 and provide a simple response to the device. For example, if the named entity device 130 is authorized and a Boolean value of True is sent, the policy consuming device 136 may carry out the default action upon receiving the message 151.

The interaction control list 122 may take the form of a well-known format or a standardized format. For example, at least part of the interaction control 122 may be formatted in well-known formats such as JSON and XML. In some embodiments, an industry that operates various application environments may negotiate, develop, and promulgate a new standardized format that is used to carry out the interaction control list 122. The standardized format may be used across different application environments 105 and different policy consuming devices 136. The use of a standardized format may reduce the communication needed to determine the payload format for the interaction control 122 when a large number of policy consuming devices 136 operated and made by different organizations jointly participate in an application environment 105.

The configuration and policy engine 144 may generate the interaction control list 122 in different manners in various embodiments. In some embodiments, the configuration and policy engine 144 generates a predetermined response as the interaction control list 122. The predetermined response may have a standard answer given a query 138. For example, the third-party server 140 may provide a list of authorized members of a role for the policy consuming device 136 to determine whether the named entity device 130 is in the list. The predetermined response may be a public response that does not include any private information or contextual information. The predetermined response may be used in various situations, but are particularly suitable for situations where either the named entity 130 or the policy consuming device 136 is not authenticated or is anonymous.

The interaction control list 122 may also be determined in real-time and dynamically based on the identity of the named entity device 130, the identity of the policy consuming device 136, the nature of the message 151, and any contextual information. If both the named entity device 130 and the policy consuming device 136 are authenticated, the configuration and policy engine 144 may determine the applicable rule dynamically based on the metadata that describes the type of messages 151 and the contextual information. For example, the location of one of the devices may be used to determine context-specific interaction control list 122. The type of policy consuming device 136 may also affect the interaction control list 122. For example, the configuration and policy engine 144 may generate a more detailed and customized interaction control list 122 when both the policy consuming device 136 and named entity device 130 are authenticated and a generic response when the policy consuming device 136 or named entity 130 are anonymous. The timing of the receipt of the message 151 may also affect the interaction control list 122 generated. An organization 110 may specify different rules with respect to different times of the day. The interaction control list 122 may also be device-specific. The configuration and policy engine 144 may generate a customized interaction control list 122 based on the identity of the policy consuming device 136. The generated interaction control list 122 may also be limited in scope. The configuration and policy engine 144 may determine the scope of the rules provided to the policy consuming device 136 based on the authentication and the identity of the policy consuming device 136.

Interaction control list 122 may also be compiled with the policy settings 122 of multiple organizations 110. For example, an application environment 105 may be operated by more than one organization 110, and the policy consuming device 136 is also operated by a different organization 110. Each organization 110 may have its own policy with respect to a situation. The configuration and policy engine 144 may receive policy settings 120 from multiple organizations 110. The configuration and policy engine 144 may compile the policies and determine the result of various rules in light of various policies. The configuration and policy engine 144 converts the result into a single interaction control list 122.

The policy distribution may also take the form of secure rule distribution, which may adopt end-to-end encrypted rule sharing. In some embodiments, to initiate communication with the third-party server 140, a policy consuming device 136 may need to be on an authorized list and properly authenticated. The policy consuming device 136 and the third-party server 140 may publish their public keys on the DNS. The policy consuming device 136 and the third-party server 140 may use the public keys to verify the digital signatures of each other and authenticate each other. The policy consuming device 136 may use the public key of the third-party server 140 to encrypt the query 138. The third-party server 140 uses its private key to decrypt the query 138. In response, the third-party server 140 may use the public key of the policy consuming device 136 to encrypt the interaction control list 122. In response, the policy consuming device 136 uses its private key to decrypt the interaction control list 122.

The policy consuming device 136 is capable of performing authentication and authorization in any order, as well as conditionally. In a first example, the original message signature may fail source authentication but be delivered via a trusted system for verifying the information it presents. For example, a sensor could attempt to transmit an observation to an edge node, but the message signature may be broken due to RF interference or some other message malformation in transit. The edge node extracts the observation value from the message and compares the value with other observations made from the same vicinity. If the observation is within a certain threshold of other observations made around the same time and place, or the message contains other authenticatable attributes permitted by the policy, the edge node may apply a cryptographic signature using the edge node's private key and transmit the observation to the hosted application. This way, the edge node attributes an observation to the source device, and the message may be labeled as 'authenticated by attribution'. The information may still be used by the application, though perhaps with human scrutiny applied when used directly for decision-making.

In a second example, an authenticated message arrives at a policy consuming device and the message sender is not on the policy's authorization list. In this example, the third-party server 140 may still elect to make use of the message but limit the impact on the system to certain constraints. For instance, if a message authenticates cryptographically but the sender is not specifically allowed by the policy and the message appears to originate from a relevant entity (for example, that the naming format for source identities is well-known and the policy may indicate that identities represented in a certain well-known naming format may be accepted for certain specific purposes) the third-party server 140 may accept and parse the message, but affix a label to the message or handle it with a different processing flow to ensure that the information may be collected, but only acted upon if other entities (human or machine) corroborate or validate the observation for processing.

In a third example, authentication of messages in a decoupled system provides flexibility in message authentication and authorization flows. In some cases, the third-party server 140 may find that performing authorization before authentication is computationally less expensive because comparing a sender's universal name against a list of authorized senders can be faster than performing cryptographic authentication of a message. By performing name comparison before cryptographic authentication, the third-party server 140 minimizes the impact of rejecting unauthorized messages at ingestion.

For the foregoing reasons, in the present disclosure, where a specific order is presented for authentication and authorization, that order is indicated by example only, and could be reversed, unless the specified order is specifically required for the use case presented.

Below is an example of an implementation of the application environment 105 in a traffic application environment. The implementation discussion is for example only and the disclosure is not limited to any traffic systems. The rest of the disclosure, such as FIG. 3 through FIG. 7, discusses additional use case implementations of application environments 105 and variations.

A policy consuming device 136 may be a vehicle that belongs to multiple application environments 105. One of those applications may be, for example, public.connected_roadway._applications.example.gov. At that name in the DNS, a number of TXT or other well-known records that describe the interfaces available for consuming policy from the configuration and policy engine 144 may be included.

The vehicle may include its own identity. The vehicle may be manufactured by an organization 110 that has the name example.com Motors. When the vehicle leaves the assembly line and the vehicle may receive an identity vin12345._device.example.com. The manufacturer (example.com) informs an example government entity "example.gov" that the vehicle should be assigned to the appropriate role in the public.connected_roadway application and example.gov makes the appropriate change in the application definition. The manufacturer may place a TXT record in its DNS namespace indicating the name of the applications all devices under that point in the DNS hierarchy should participate. Alternatively, or additionally, each vehicle leaving the assembly line may be configured with the names of the applications it will be participating in.

The participants in the application environment 105 may provide context information to the third-party server 140 in a variety of ways, depending on the role of the participants. Continuing with the example of the vehicle, the vehicle may represent the jurisdictions or areas in which it will be traveling in a traffic system application environment 105. Owing to privacy concerns, the vehicle may communicate this directly to the configuration and policy engine 144 in the form of a periodic update, or as a part of the policy query 138 interaction. The traffic system application environment 105 may also include a beacon. For the beacon, making the location of the beacon easily discoverable can be beneficial. The beacon may update its own location as a part of the metadata attached to its public identity. The beacon may have an identity 123.beacons._device.dot.gov, which indicates that its identity is owned by, for example, the Department of Transportation.

The public.connected_roadway application has two roles: vehicle and beacon. The vehicle role contains cars. The beacon role contains beacons. When a vehicle sends a query to the configuration and policy engine 144, it may indicate its own geolocation. The configuration and policy engine 144 responds with the DNS prefix of the beacons that the vehicle is expected to encounter. If the vehicle's geolocation is close to a jurisdictional boundary, the policy engine may respond with a policy containing two relevant jurisdiction prefixes. In another embodiment, the vehicle's operator may desire more privacy and may request the prefixes associated with the jurisdictions the vehicle expects to travel within a state, for instance, and avoid revealing specific geolocation of the vehicle. This preserves privacy as only the jurisdictional prefixes are sent, instead of the entire policy which may include every vehicle participating in the application. Since the vehicle may be communicating over an untrusted medium, the configuration and policy engine 144 may use the vehicle's public identity to discover a public key to use for encrypting the response.

The beacon may also periodically query the policy engine and retrieve a list of expected nearby beacons. Knowing which beacons should be operational nearby enables an individual beacon to positively ascertain and report when an unauthorized beacon is transmitting nearby, thereby making the beacon application resilient to persistent misconfiguration and abuse by impersonation or unauthorized operation of beacons.

While the example discussed above with FIG. 1C is illustrated with an application environment 105, in some embodiments certain elements can also be commonly shared in multiple application environments 105. For example, in some cases, authentication information such as device identities and credentials may be shared in different application environments 105. Likewise, in some cases, authorization information may also be reused in different application environments 105.

The sharing of authentication information among various application environments 105 provide versatility to the devices and allows the devices to better integrate into different new application environments 105. Conventionally, a device's identity and credential are bound to a specific application environment 105. The identity and credential cannot be easily transferred to another application environment 105. For example, the credential of a device of an email application cannot be used in an IoT application. Even though the device may choose to use the credential, the device conventionally often needs to re-register with different organizations 110 operating different application environments 105. In some embodiments, the identity record 146 of a device is stored in a well recognized and widely accessible namespace such as the DNS or a common blockchain so that the identity can be re-used across various unrelated application environments 105. According, the identity record 146 can become a universal identity and is no longer bound by a specific application environment 105 or a certificate authority. By providing the identity record 146 in the namespace, the named entity devices 130 can be authenticated by various organizations 110 using established channels and standardized methods. By way of using IoT as an example, an autonomous vehicle may have a universal identity that can be used in different application environments, such as a local traffic system, a weather application environment, a parking system, etc. By putting the identity record 146 in a well-established namespace such as the DNS, the autonomous vehicle does not need to pre-register itself as it participates in a new application environment 105, such as a new local traffic system as the vehicle travels to a new location. Various application environments 105 may authenticate the identity of the vehicle through the identity record 146 such as using the vehicle's public key stored in the namespace.

The authorization information of various named entity devices 130 may also be shared with various related application environments 130. Since a named entity device 130 may be associated with a more universal identity, the role and policy associated with the named entity device 130 may also be set across different application environments 130. The third-party server 140 may store the role of a named entity device 130 and determine the appropriate policies that are applicable to the role based on the role and the specific application environment 105. Continuing with the IoT example above, the autonomous vehicle may be associated with a role of vehicle. Since the identity of the autonomous vehicle may be fixed and be common in different application environments 105, the third-party server 140 may associate the autonomous vehicle with the role of vehicle in various environments. Each application environment 105 may determine the authorization scope of a particular role based on the policies specified by the operating organization of the application environment 105. For example, as the autonomous vehicle enters a new geographical location, it may attempt to retrieve traffic information from a local traffic system in which the vehicle may not have participated. The local traffic system may first authenticate the vehicle using the identity record 146 stored in the namespace using a standardized query to the third-party server 140. Upon the successful authentication of the vehicle, the local traffic system determines that the role of the autonomous vehicle is a vehicle. The third-party server 140 transmits an interaction control list to the local traffic system to specify the authorization information of the autonomous vehicle in participating the local traffic system. The interaction control list may be generated by the policy settings of the local traffic system as specified by the operating organization of the local traffic system.

In some cases, a policy associated with the authorization of a named entity device may be role specific and application independent while in other cases a policy may be application dependent. For example, a sensor may be associated with the role "sensor" regardless of application environment 105. The identity of the sensor may be stored in the DNS and be authenticable by various application environments 105. The authorization of the sensor may be bound by the role "sensor." The third-party server 140 may determine, based on the policy set by the manufacturer of the sensor, that the sensor can only be used to transmit information. The third-party server 140 may reject a request from the sensor to retrieve personalized information regardless of the application environments 105 in which the sensor participates. However, in other cases, the role may be application specific. For example, a vehicle may serve as a sensor in one traffic application to contribute traffic information to a local traffic information. Yet, the vehicle may participate in another unrelated application environment and performs things that are not in line with the role sensor.

The interaction control list provided to a policy consuming device 136 regarding the authorization information of the device or another device may be context specific. The third-party server 140 may provide a dynamic policy response to a query of a policy consuming device 136 so that only relevant and expected communication patterns and authorization information are provided to the policy consuming device 136. In some cases, a policy associated with a particular role may include a large number of participant devices that are associated with the role. This may be due to the role being inherently common or other reasons. For example, as discussed above, in some embodiments, an identity of a named entity device 130 may take the form of a more universally accepted identity that may be stored in a well-known namespace. Hence, the members of a particular role may grow overtime because the role may be not application specific. In any cases, an unfiltered interaction control list that includes a list of authorized devices can be large and sometimes irrelevant. The third-party server 140 may take into the account of metadata and other context information to determine dynamically a relevant and specific interaction control list for each query of authorization. For example, if a policy specified that only devices associated with the role vehicles may be eligible to receive traffic information from a sensor, the third-party server 140 may examine the metadata of vehicles and determine the vehicles that are in the geographical proximity of the sensor. The third-party server 140 may generated a specific interaction control list that includes only those vehicles and provide the list dynamically to a traffic system. While the example of contextual information discussed here is geographical location, other contextual information may also be used. Further detail related to a dynamically generated interaction control list is discussed in association with FIGS. 15A and 15B regarding device adjacency and relative topography (DARTH).

In some cases, while the identity of a named entity device 130 may be universal if desired, an application environment 105 may not have dealt with or have any policy associated with the device. For example, upon authenticating a named entity device 130, the third-party server 140 may determine the application environment 105 may not have a policy that addresses what the authorization of the named entity device 130 has. The third-party server 140 may perform a search in the specific information associated with the role of the named entity device. The third-party server 140 may generate new policy recommendations for the application environment 105 to adopt. The generation of the policy recommendation is further discussed in FIG. 16 through FIG. 23.

Example IoT Implementation for Policy Determination

Figure 10:
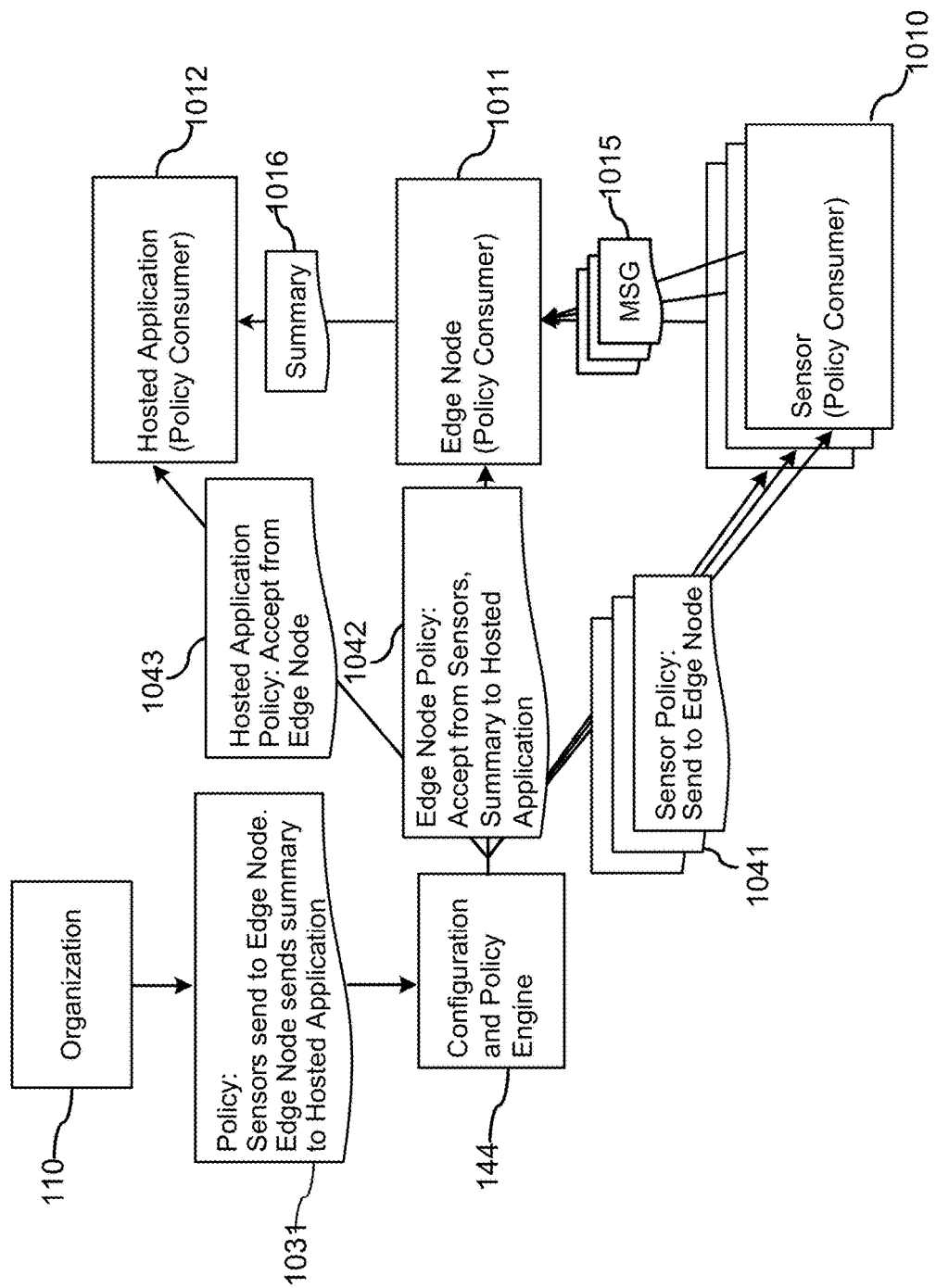
FIG. 10 is a block diagram that shows an IoT embodiment related to automatic policy determination and distribution, in accordance with some embodiments.

FIG. 10 is a block diagram that shows an IoT embodiment related to automatic policy determination and distribution, in accordance with some embodiments. The configuration phase begins with an organization 110 sends a business policy setting 1031 to the configuration and policy engine 144. The business policy 1031 specifies that the IoT sensors 1010 can send messages to the edge node 1011, which, in turn, can send a summary of these messages to the hosted application 1012.

The configuration and policy engine 144 translates the business policy 1031 into rules and sends a portion of those rules to each of the entities. To the sensors 1010, the configuration and policy engine 144 sends a sensor policy 1041 indicating that the sensors are to send their messages to the edge node 1011. To the edge node 1011, the configuration and policy engine 144 sends an edge node policy 1042 indicating that the edge node 1011 can accept messages from the sensors 1010 and send a summary of those messages to the hosted application 1012. To the hosted application 1012, the configuration and policy engine 144 sends a hosted application policy 1043 indicating that it can accept messages from the edge node 1011.

The messaging phase begins with the sensors 1010 sending messages 1015 to the edge node 1011, in accordance with the sensor policy 1041. For example, in an environmental monitoring system, multiple outdoor environmental sensors might send messages to the edge node indicating the sensor location, the level of ambient light, barometric pressure, and/or temperature. In a facility monitoring system, the sensors may be cameras which transmit a series of pictures of points of ingress and egress to a building (the edge node).

Having received these messages, the edge node 1011 generates a summary 1016 of the messages, and sends this summary to the hosted application 1012, in accordance with the edge node policy 1042. Continuing with the prior example of an environmental monitoring system, the edge node may take an average of atmospheric conditions, grouped by geolocation, and transmit these averages to the hosted application (for example, a server managed by the owner of the area being monitored). With a facilities monitoring system, the edge node may apply an algorithm to perform facial recognition on the images transmitted by various cameras, and send messages to the hosted application with the names of identified individuals and timestamps for ingress/egress, for the purpose of tracking time and attendance.

The hosted application 1012 accepts this summary in accordance with the hosted application policy 1043. In an embodiment, the hosted application 1012 authenticates the summary 1016 from the edge node 1011, and then checks for authorization by ensuring this identity and associated context are within policy 1042, querying the configuration and policy engine 144 directly if there is insufficient information locally, and then handling the message per policy.

The sensors 1010 and the edge node 1011 may both be policy consuming devices 136 that receive business policies in the form of interaction control list indicating which entities to trust for receiving messages, and named entity devices that send messages (the messages 1015 and the summary 1016, respectively) to another policy consuming device 136 (the edge node 1011 and the hosted application 1012, respectively).

More Examples System Method Implementation

Figure 11:
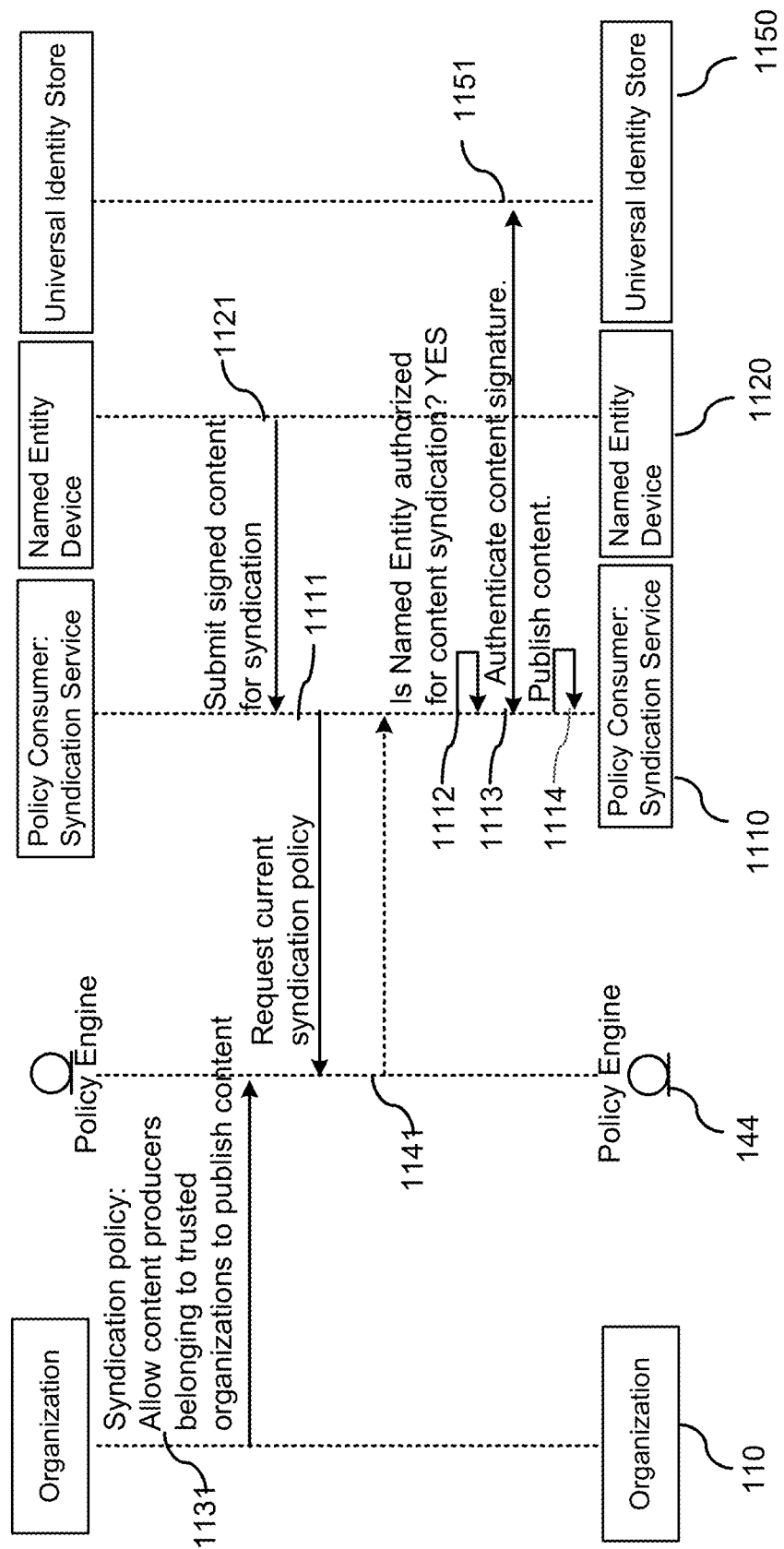
FIG. 11 shows an embodiment of both configuration and messaging methods, in accordance with some embodiments.

FIG. 11 shows an embodiment of both the configuration and messaging methods of the example system discussed above. In the configuration stage, the organization 110 transmits a business policy setting 1131 to the configuration and policy engine 144. The configuration and policy engine 144 can build rules based on this information provided by the organization 110. Using these rules, the configuration and policy engine 144 may present an interaction control list to the policy consuming device which enables the policy consuming device to make a decision on whether or not to syndicate content from the named entity.

In the example of FIG. 11, the business policy 1131 sent by the organization 110 reads: "allow content producers belonging to trusted organizations to publish content."

In the messaging phase, a named entity device 1120 transmits signed content 1121 to the syndication service 1110. The signed content 1121 contains a signature for the content as well as the name which can be used to locate a credential in the universal identity service 1150. On receipt of the request 1121 from the named entity device 1120, the policy consumer device 1110 may refresh its internal policy (steps 1111 and 1141) with a new copy of the policy from the configuration and policy engine 144. In the example, the configuration and policy engine 144 replies 1141 with a list of named entities which are authorized to publish content.

The policy consumer device 1110 may now make a determination 1112 as to whether the named entity device 1120 is authorized to publish content by matching the named entity's name against the list of permitted entities in the syndication policy.

If the named entity is allowed to publish content via the syndication service, the syndication service uses the universal identity store to perform content authentication 1113 using, for example, delegated authentication service engine 210 and if the content authenticates, the syndication service then publishes the content 1114.

Another embodiment of FIG. 11 may involve a news syndication service, where members of related organizations are permitted to use the syndication service 1110. The named entity device 1120 may be identified by a name in DNS where a public key can be located, and the policy 1131 may include the specific DNS names of permitted named entities, and/or a list of DNS prefixes identifying permitted parts of the namespace, whereby a match of the parent organization permits the named entity 1120 to publish via the syndication service 1110.

In an embodiment, the news organization gives each of its journalists and editors a unique key in DNS, and their articles are signed with this key. When a journalist or editor publishes an article, so long as one of the appropriate keys is used to sign the message, the article will be syndicated. This prevents a sports journalist from accidentally posting to, for example, the local news page, unless the local news editor has also signed the message.

In another example, a first news outlet might syndicate stories from a list of trusted sources, such as other news outlets. Any content not signed by one of these organizations, even if it were to authenticate properly, would not be authorized for automatic syndication, and could be rejected per policy or per policy sent to an editor for review.

Figure 12:
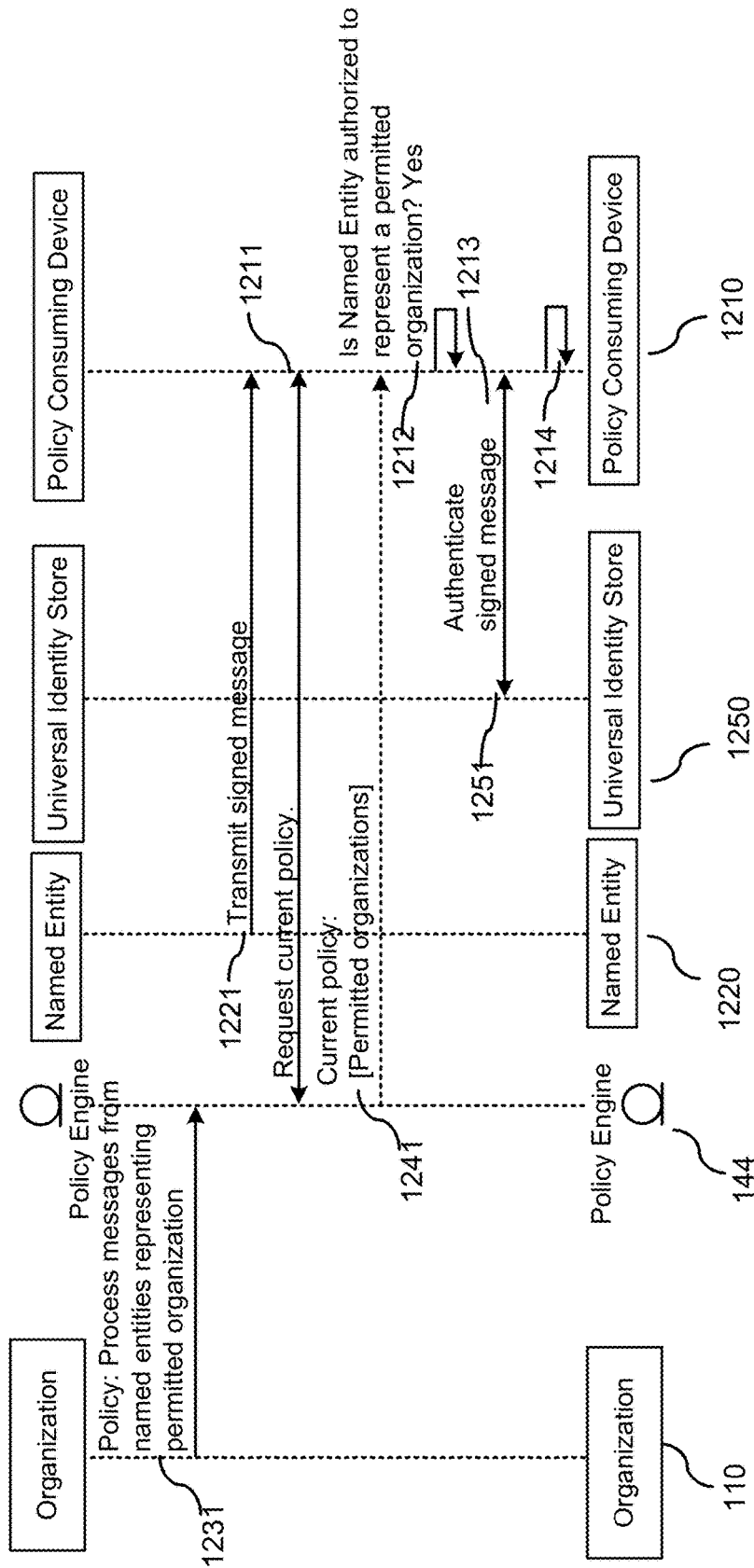
FIG. 12 shows an embodiment of a policy consumer device receiving, authenticating, and authorizing messages from a named entity device, in accordance with some embodiments.

FIG. 12 shows an embodiment of a policy consumer device 1210 receiving, authenticating, and authorizing messages 1221 from a named entity device 1220. In the configuration phase, the organization 110 submits business policy settings 1231 to the configuration and policy engine 144. The business policy permits the policy consumer device to process messages from named entities device representing permitted organizations.

In the messaging phase, the named entity 1220 broadcasts an authenticated message 1221 which is received by the policy consumer device 1210. The policy consumer device 1210 may or may not also be a named entity. If the policy consumer device 1210 is a named entity, it also has a corresponding member 235 within a role 234 within the configuration and policy engine 144 in order to retrieve perspective-based policy from the configuration and policy engine 144. The perspective-based policy may be a subset of the entire policy that is tailored for the policy consumer 1210.

If the policy consumer device 1210 is not a named entity with a member entry within a role within the configuration and policy engine 144, the only perspective offered is that of what the organization 110 has defined as acceptable for public consumption. This can be an "anonymous access" mode. In that dynamic, there is a default published policy which describes access for a specific purpose, in a manner that is generally useful to any client that might receive a message from a named entity. Note that this anonymous access mode can assist with new unconfigured devices that are attempting to bootstrap their way into participating in the application environment 105.

This is the case in the example in which an automobile 1210 (an example policy consuming device) may encounter authenticated messages 1221 from connected roadway equipment 1220. The automobile 1210 may retrieve 1211 a policy 1241 from the government agency (by querying 1211 the policy engine) responsible for publishing a list of organizations which are allowed to operate connected roadway beacons. Those organizations may further subdivide and organize their part of the universal namespace to indicate the geographic area or type of equipment presenting itself as a named entity.

The automobile may periodically refresh its policy based on the regions within which it is expected to travel and use that list of allowed entities or organizations to determine from which entities the automobile should process messages. In some cases, it may make sense to determine the authorization 1212 of a message sender before authenticating a message 1251, especially if the list of allowed named entities is short and the process by which the message contents are authenticated is computationally expensive (like using asymmetric cryptography to process message signatures). Authorization may or may not happen before authentication, depending on which is the least expensive from the perspective of computation and network bandwidth consumption.

Figure 13:
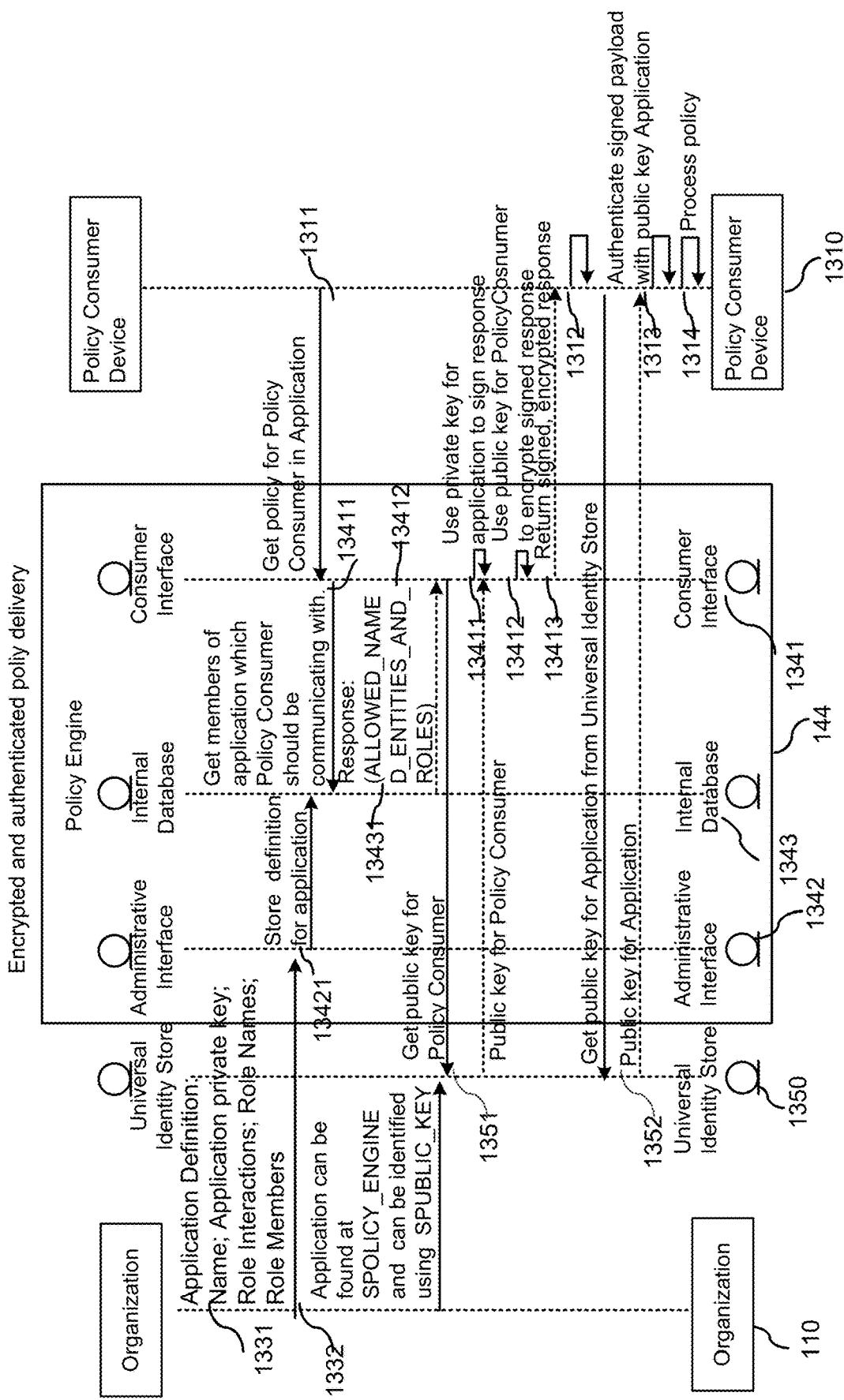
FIG. 13 illustrates an embodiment of authorization determination where the policy consumer is a named entity, in accordance with some embodiments.

FIG. 13 illustrates an embodiment where the policy consumer is a named entity. Dynamic policy may be delivered encrypted and authenticated. In this case, the organization 110 configures application parameters like name, role names, role interactions, and role members, as well as the name of the application (in the universal identity store) and the application's configuration signing public key.

The policy consumer device 1310 requests the current policy from the configuration and policy engine 144, via the consumer interface 1341. The consumer interface 1341 communicates with the internal database 1343 of the configuration and policy engine 144 to construct a targeted policy, which represents only the entities and corresponding roles that the policy consumer device 1310 is authorized to communicate with. The consumer interface 1351 uses the application's private key to generate a signature of the generated policy. The consumer interface 1341 then uses the public key associated with the policy consumer device 1310 (retrieved from the universal identity store 1350) to encrypt the signed policy, which is then transmitted to the policy consumer device 1310.

The policy consumer device 1310 uses its private key to decrypt the response. The policy consumer device 1310 then retrieves the public key associated with the configuration and policy engine 144 to authenticate the signed policy, thereby confirming the authenticity of the policy. Having confirmed the authenticity of the policy, the policy consumer device 1310 may now process and apply the policy to future communication within the application.

In this embodiment, the response from the configuration and policy engine 144 is an encrypted message, regardless of transport. This is useful for environments where an encrypted session directly between the policy consumer device 1310 and the configuration and policy engine 144 may not be possible. The policy consumer device 1310 may rely on the message to be delivered by a variety of transports, queueing and message brokering technologies, or even physical media.

The configuration and policy engine 144 may provide a RESTful interface, or it may operate as a client for a message brokering service, or queueing system. The embodiments described herein are transport-independent, and may employ a system for encryption and authentication as described in FIG. 13 to overcome the security challenges of communicating authorization policy over de-coupled infrastructure, where message delivery infrastructure may not be under the direct control of the organization, like with email and queueing and message brokering middleware.

The DNS may also be replaced by, or used in conjunction with, other public databases. While DNS is used as the primary namespace through which public key discovery occurs, the same functionality can be implemented via another technology, such as IPFS and ENS. IPFS/ENS may also be used for the secure distribution of policy, applying message-oriented security (e.g. source-signing and encrypting for the recipient) to a file containing the policy. The policy may then be stored in IPFS and the ENS record may point to the most recent copy of the policy. The same principle may be applied to the discovery of the named entity's public key.

Example Implementation: Traffic System

In an example, an autonomous vehicle begins a journey which it takes from the state of Nevada to the state of California. Upon establishment of the route, the automobile may query the national department of transportation and request the namespace prefixes (more specifically, DNS zones or namespaces within) used for representing the identities of roadside beacons in the states of Nevada and California. From this prefix list, the automobile knows to only attempt to authenticate and process messages coming from beacons matching the namespace prefix of the departments of transportation which govern the roadway along the automobile's route.

Example Implementation: Hospital

In an example, a wheeled patient vitals monitor in a large hospital environment may be operational in one of many locations, whereby each location has a system for receiving and processing patient vitals. In order to accommodate limited storage capacity on the vitals monitor as well as the receiving system, and due to the highly dynamic nature of equipment migration in a hospital environment, policies are delivered to devices on a need-to-know basis. In this case, "need-to-know" means "need to communicate with".

Devices which participate in an application may publish certain aspects of their geographic or network-logical information either in the DNS, or directly in the policy system. Whether the device publishes this information in the DNS or in the policy system itself is a trade-off between security and simplicity. If the device publishes this information in the DNS, it is visible everywhere, just by knowing the device's name. This allows for a single source-of-truth. If information about device location is considered sensitive information, then the device may periodically update its location with the policy server, which does not reveal information without authorization. In an embodiment, the hospital uses a private DNS system which resolves names only within the hospital network itself, and the 3PSP can also function in this delegated private namespace.

In this example, patient vitals are collected on a per-wing basis. There is only one policy server for the entire hospital. The patient vitals monitor is powered down and moved from the oncology wing to the emergency room. When the patient vitals monitor is powered on, it announces its location to the central policy server. The central policy server, now knowing that the monitor is in the emergency room, informs the monitor that it should be communicating directly with the emergency room vitals monitoring system. The vitals monitor attempts to establish trusted communication with the emergency room vitals monitoring system, and is unable to, because the emergency room vitals monitoring system has not refreshed its policy since the time that the monitor was moved to the emergency room. Alternatively, or additionally, the central policy server may process messages from the hospital's network infrastructure which indicate the physical location of the patient vitals monitor.

In response to communication from an untrusted entity, the emergency room vitals monitoring system may trigger a policy update, instead of waiting for the regular polling period. Rate-limiting should be applied on a per-unknown-entity basis, so that anomalous behavior on the part of one unrecognized device does not consume too many resources and impact the ability of the policy server to serve requests.

In environments with appropriate levels of connectivity, power, and compute resources, a technique like long-polling or web sockets may be used to allow the policy server to immediately update policy consumers in the event of a business policy change. This can be especially beneficial as it permits the policy server to manage the load of disseminating policy across a massive fleet of devices. In the absence of a policy server-driven update method like this, controls (like rate-limiting and back-off logic) must be employed to prevent excessive load on the third-party server's infrastructure.

Example Implementation: Satellite System in Outer Space

Satellite constellations grow in the number of participants over time, as more coverage becomes necessary for various applications. This presents an interesting challenge for trust lifecycle events, especially for satellites with constrained connectivity and computing resources. A satellite may remain in orbit for years and need to authenticate direct communication from a new constellation member.

Instead of retaining a copy of all public keys from all satellites in the constellation, a satellite may periodically query the terrestrial service to update the cache of public keys for the other constellation members it is expected to encounter in its orbit. This enables savings on storage hardware on the satellite itself, as well as a savings on the expense of transferring information to and from orbit. The satellite only gets exactly the information it needs, and the dynamic nature of this communication policy is governed by the managing application on the ground.

In cases where the contents of satellite-to-satellite communications must be highly secured and the broader constellation needs to be isolated from abuse in the event a single satellite is compromised, this invention is especially useful. The satellite knows only its direct communication partners, and no other identities are known by the satellite to be trusted. This allows a tight compartmentalization of failure zones, where a compromised satellite may not know of all other satellites in the constellation, because credential discovery and the identities of constellation members are distributed only granularly, on a need-to-know basis.

Example Implementation: Privacy Protection Implementation

A privacy protection implementation is similar to the IOT use case, in which the third-party server 140 stores keys for users in the DNS. However, in this use case, for reasons of privacy, the user's DNS label is a hash of the username, not the username itself. With this additional protection, policy can be set across both the domain and user, and the hashed portion of the DNS name allows the reduction of characters which are otherwise unsupported by the DNS namespace into a form which is DNS-compatible. This way, the third-party server 140 can manage permitted users across the organization, or users themselves can choose which other users (either from their own organization or external ones) to trust. The policy engine may present a more readable representation of the user identity to the technical administrator and perform the hashing against the name in order to align with the true DNS names, before constructing and distributing interaction control lists.

Example Implementation: Non-IoT Implementation

In the case of an online news publishing system, where a newly-acquired business may need to publish news on the parent company's web site. In FIG. 11, the organization 110 may configure a policy to allow all subsidiaries to publish by business unit. The policy engine may use a legal entity registry to determine the relationship between organizations and domains, and between an organization and other organizations. An authenticated user representing the business division of example.net (yogi.bear@business.example.net, a named entity) attempts to publish an article in the business section of example.com news (another named entity). The organization 110 has configured the policy engine to permit the members of subdomains of any business owned by the parent company, example.com news, to self-publish on the example.com news website. When yogi.bear@business.example.net attempts to publish an article in the business section, the policy engine makes the determination on whether they are authorized to do so by comparing the domain of the named entity (business.example.net) against a list of companies owned by example-.com news. In this example, the list of allowed domains is derived from a database external to the organization. Since the right-side domain matches with a name on the list of owned domains, and the next label in the name, "business", is the proposed section for the article's publication, publication is permitted because "business" is recognized as a news column in the parent company.

Example Implementation: Role-Based Access to Software and Configuration Updates

In some cases, authorization policy may be used to allow access to specific resources or software assets. In an embodiment, an authenticated device requests a current copy of its configuration from a configuration management system, which may be part of the third-party server 140 or a server provided by an organization 110. The configuration management system treats system configuration as a versioned digital asset which is periodically revised or updated, and each new revision has a unique identifier. Devices of a similar purpose and behavior may have identical configuration. Due to the complexity of handling identical configuration settings for a great number of devices, configuration distribution may more easily be accomplished using a channelized distribution model, where multiple identical devices subscribe to a channel for configuration updates, where all subscribers of a channel are expected to use the exact same configuration information. The configuration management system queries the policy engine to ascertain the versioned asset channel that the device's identity is associated with. In this example, the versioned asset channel presents the latest version of the configuration file. The configuration management system is then able to return the specific configuration that the device is entitled to, or return an 'unauthorized' error message in the event the authenticated device is not authorized to access the update service.

Example Implementation: Publication Policy

The news business provides an example of the need for continual refinement of context. In this example, an online news publisher publishes a public key and contextual authentication record in DNS for every author and editor. In the publication process, the news publisher adds topical tags (sports, international, business) to the story, as well as signatures for the author(s) and editor(s). The contextual references may contain topics for which the news publisher endorses the authors and editors as experts. This allows any consuming system to not only authenticate the organization and the individuals producing the content, but also the expertise of the individuals producing the content, this being an embodiment of inherited trust (trust in an individual based on the organization they're authorized to represent).

This can be used for detecting when sports writers decide to contribute to the weather column, and it can even be used in the news publisher's internal publication workflow system to apply more scrutiny (or automatically invite an expert to contribute) to an article related to a topic for which the author(s) and editor(s) are not experts.

For instance, a system may trust our local weather people on TV to report the weather, because they're certified by the American meteorological society. The system may not trust them to report on local sports, though. The system may trust the weather channel to aggregate weather reports, and the system trusts the weather channel to analyze external weather reports for quality. The system may not expect the weather channel to syndicate news about the local poker tournament.

If the weather channel syndicates a local TV station's weather report, it will be received with high confidence. If the weather channel syndicates a local TV station's high school football rankings, the audience might be confused (low confidence) and ignore the information, or change the channel. (MRI machines start replaying messages from connected roadway equipment. The consuming application should discard it, and notify the responsible party)

If a dubious reporter of world news produces a special report about the weather, a system should not trust it (untrusted edge and unauthenticated information should be ignored). If a dubious reporter of world news reproduces an authentic weather report word-for-word, a system may trust the details of the weather report, but not any information offered as context or commentary. The system should still change the channel.

Example Implementation: DARTH (Device Adjacency and Relative Topography)

The third-party server 140 may provide dynamic and specific response to a policy query by generating an interaction control list whose information is selected based on relevant metadata given the context. While the discussion in this embodiment related to DARTH (device adjacency and relative topography) is described using the contextual information of geographical locations, the dynamic generation of the interaction control lists may be based on various types of contextual information such as geographical location, time stamp, computation capacity, load balancing metadata, duty cycle, telemetry data, status of the devices, network capability of the devices (e.g., whether the device is equipped to communicate in a certain network protocol), and other suitable metadata of a device. In application environments where devices are subject to storage, network, or computation constraints, the third-party server 140 may transmit only relevant information in interaction control lists that each device needs in order to operate. This is in contrast to methods which may inform a device of all possible interaction partners or all members of an application via a static policy.

The third-party server 140 may use metadata associated with various devices to determine a relevant interaction control list and provide the list to a policy consuming device 136. By way of an example embodiment, devices may be organized by role and the communication methods used by devices may be constrained by locality. An example is a system where a large-scale fleet of lightweight autonomous vehicles travel over long distances and need to communicate directly with one another for collision avoidance and other cooperative behavior. Each autonomous vehicle (a policy consuming device 136) may have two communication methods: point-to-point (vehicle to vehicle) and a satellite Internet connection which provides limited connectivity and is more expensive to use. The third-party server 140 may store last known metadata, such as geolocation, in association with each role member. The autonomous vehicle periodically updates its own metadata with the third-party server 140, using the satellite link. Since the autonomous vehicle has a public key in DNS, the updates can be authenticated by singing the update message. As the autonomous vehicles periodically retrieve their latest policies from the third-party server 140, via the satellite link, the third-party server 140 may take into account the last known metadata of other application participants that each autonomous vehicle may be within range of and need to communicate with. The third-party server 140 uses the geolocations of the autonomous vehicles to construct an interaction control list that contains a list of expected adjacent application members, instead of a list of all application members. This allows the application owner to minimize the use of bandwidth for policy updates, minimize the use of storage in the autonomous vehicle's onboard memory, and minimize the compute resources required to compare authenticating entities against a list of allowed communication partners. The policy engine may also use the autonomous vehicle's public key to encrypt the response from the third-party server 140, thus preventing disclosure of any information of other devices that are included in the response to the public.

The autonomous vehicles periodically update policy from the third-party server 140. The autonomous vehicles may use a system as described in the delegated authentication service engine 210 to authenticate messages from other autonomous vehicles over point-to-point links. Furthermore, a third-party server 140 may be used for further automated control over policy contents, building the interaction control lists for each device based on a variety of entity metadata, like geolocation, the taxonomic classification of the policy role members, or even the time period that certain entities are expected to be active.

Figure 15A:
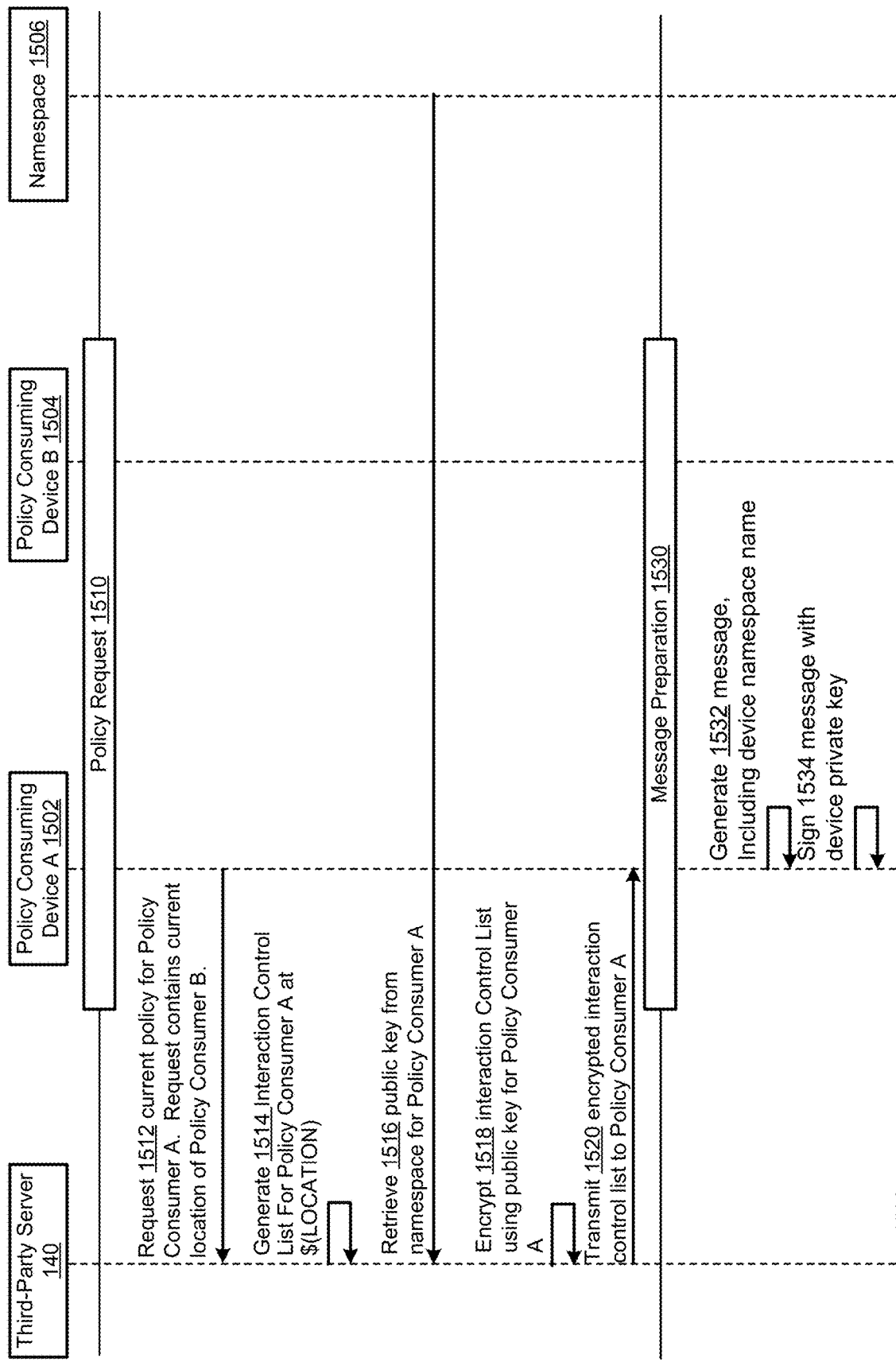
FIGS. 15A and 15B, combined, depict a flowchart illustrating a dynamic interaction control list generation process, in accordance with some embodiments.
Figure 15B:
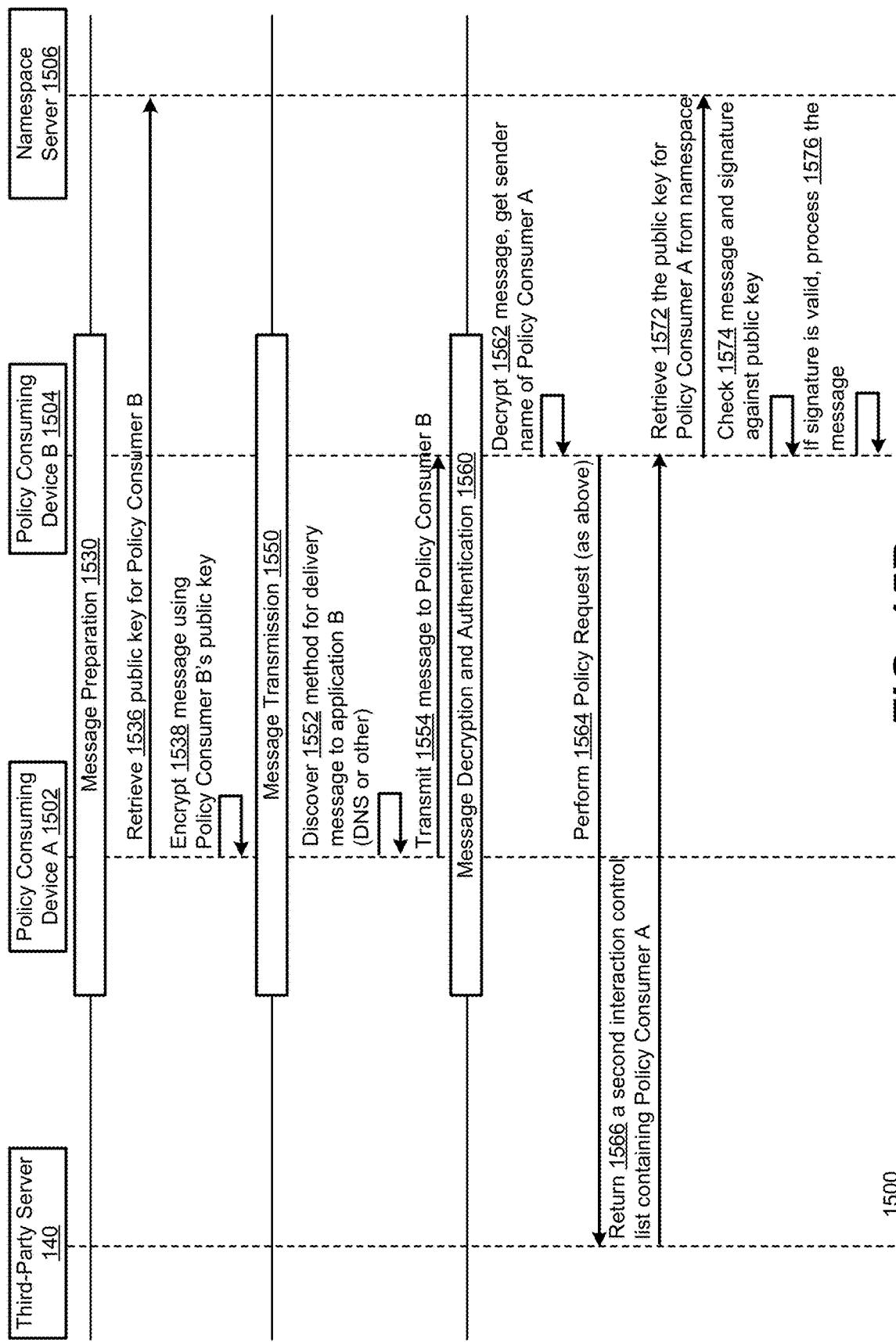

FIGS. 15A and 15B, combined, depict a flowchart illustrating a dynamic interaction control list generation process 1500 under an implementation of DARTH, in accordance with some embodiments. While the process 1500 is described with two devices interacting with each other, the same principles may be extended to communications among three or more devices. At a high level, the third-party server 140 examines metadata of the devices and other related contextual information. The third-party server 140 in turn provides a dynamic interaction control list that includes specific and relevant information relevant to the device seeking the authorization information. In the process 1500, the policy consuming device A 1502 and the policy consuming device B are examples of policy consuming devices 136. The namespace 1506 may be part of the namespace 112 or the delegated namespace zone 142.

The process 1500 may be a process performed by the third-party server 140 for managing an application environment. An administrator of the application environment may set a context-based policy for the application environment. For example, the context-based policy may be a proximity-based policy. The third-party server 140, based on the context-based policy, stores various configurations to achieve the policy in the configuration and policy engine 144.

In a policy request phase 1510, the policy consuming device A 1502 may request 1512 current policy for policy consuming device A 1502. The request may contain the current location of the policy consuming device B 1504 and other contextual information related to the device B and the current transaction. The third-party server 140 may generate 1514 a specific interaction control list for policy consuming device A at a particular location. The interaction control list may be selected based on the particular location. For example, the interaction control list may be a list of devices that have the tag of a role that is authorized to communicate with the policy consuming device A. The devices that have such a tag may constitute a long list. The third-party server 140 further filters the list by the contextual information such as the geolocation of the policy consuming device A. In this example, the geolocation of the policy consuming device B indicates that the device B is within a threshold distance from the device A and the device B is one of the devices with the tag. As such, the interaction control list includes the device B.

The third-party server 140 retrieves 1516 the public key of the policy consuming device A from the namespace 1506. For example, the public key may be part of the identity record 146 that is stored in the DNS as discussed above in association with FIG. 2. The third-party server 140 uses the public key to encrypt the generated interaction control list. The third-party server 140 in turn transmits 1520 the encrypted interaction control list to the policy consuming device A.

In a message preparation phase 1530, the policy consuming device A 1502 receives the encrypted interaction control list. The policy consuming device A 802 uses its private key to decrypt the interaction control list and determines that it has the authorization to perform certain actions. The authorization to perform actions for the policy consuming device A 802 may be the authorization to communicate with the device B, take an action in response to receiving a message from device B, or any appropriate authorization. The policy consuming device A 1502 generates 1532 a message that is intended to be transmitted to the device B to initiate the transaction between device A and device B. The message may include the namespace name of the policy consuming device A 1502, such as the DNS name. The namespace name allows the policy consuming device B 1504 to retrieve identity record 146 to authenticates the policy consuming device A 1502.

The policy consuming device A 1502 signs 1534 the message with the private key of the policy consuming device A 1502. The signature allows the policy consuming device B 1504 to authenticate the message and device A. Continuing to FIG. 15B, the policy consuming device A 1502 retrieves 1536 the public key of the policy consuming device B 1504 from the namespace 1506. The policy consuming device A 1502 in turn encrypts 1538 the message using the public key of the policy consuming device B 1504.

In the message transmission phase 1550, the policy consuming device A 1502 discovers the method for delivery of the message to policy consuming device B 1504. The policy consuming device A 1502 may determine 1552 the method for delivery based on the type of device of device B. The method of delivery may be saved in the interaction control list, stored locally with device A, or with another source such as the third-party server 140 or an organization 110 operating the device B. The policy consuming device A 1502 transmits 1554 the message to policy consuming device B 1504.

In the message decryption and authentication phase 1560, the policy consuming device B 1504 receives the message from device A and will need to determine whether the policy consuming device B 1504 has the authorization to interact with the device A. The policy consuming device B 1504 may first decrypt 1562 the message using its private key and obtain the sender name of the policy consuming device A 1502 included in the message. The policy consuming device B 1504 may perform 1564 a policy request to the third-party server 140. The policy request will be similar to the process discussed in the policy request phase 1510 as discussed above except the request is transmitted from the policy consuming device B 1504. The third-party server 140 returns 1566 a second interaction control list containing the policy consuming device A 1502. Again, the generation of the second interaction control list may be based on contextual information to select specific devices that are relevant to the device B.

Upon determining that the policy consuming device B 1504 has the authorization to interact with the policy consuming device A 1502, the policy consuming device B 1504 retrieves 1572 the public key of the policy consuming device A 1502 from the namespace 1506. The policy consuming device B 1504 then checks 1574 the message and the signature using the public key of the policy consuming device A 1502. If the signature is valid, the authentication is successful. The policy consuming device B 1504 in turn processes 1576 the message and continues whatever the interaction it is with the device A.

The DARTH process may have broad applications in different areas. For example, in an IoT application, some devices may communicate primarily through a message broker or a network node that may be responsible for managing communications within a certain geographical area of the network node. To limit the number the number of device identities that need to be included in an interaction control list to be provided to the network node, the third-party server 140 may filter the device based on the metadata of geographical locations of devices. If a device has been moved by a malicious party, the device will not have the authorization to communicate with the network node anymore even if the authentication based on the identity of the device on the DNS is successful. Again, while geolocation is used as an example for the metadata that the third-party server 140 may use to filter devices in the interaction control list based on other types of contextual conditions such as time, capacity, metadata tags, etc.

The DARTH process may also be used for load balancing, such as in the area of cloud computing or edge computing. The metadata used may be a metric that measures the capacity of a computing server such as a counter that counts the number of the tasks that the computing server is performing and the memory or CPU usage of the computing server. If a server is almost full in the capacity, the third-party server 140 may filter out the server in the interaction control list so that devices that newly request computing services will not have the authorization to communicate with the server. The third-party server 140 may put the server back to the interaction control list when the server is no longer as busy.

Example Implementation: Secured Update

In an embodiment, a named entity and policy consumer needs to securely discover its permitted communication policy. The named entity device and policy consumer device in FIG. 14 may be called client1.example.com.

The organization 110 uses the administrative interface to define the application, as well as the roles and role members in the policy engine. The technical administrator also configures the universal identity store with information necessary to discover and authenticate the policy engine. Finally, the technical administrator configures client1.example.com to know that the name of the application that it's participating in is app1.example.io.

The named entity device and policy consumer device client1.example.com queries the consumer interface, and requests the permitted communication policy.

The consumer interface queries the internal database to build a document describing the roles and named entities that client1.example.com should communicate with. The consumer interface then retrieves the public key for client1.example.com from the universal identity store. The consumer interface signs the policy document with its own private key (which is associated with its name, in the universal identity store), and encrypts the signed document using the public key associated with client1.example.com. The signed and encrypted response is returned to client1.example.com.

The response is decrypted by client1.example.com, and client1.example.com authenticates the signed policy document using app1.example.io's public key, retrieved from the universal identity store.

The part of the process involving client1.example.com is repeated by every member of the application, and each only receives from the policy engine the exact part of the policy that's relevant to the policy consumer.

Example Implementation: Using Policy to Authorize a Composite Entity

In an embodiment, a collection of devices must be authorized as a single entity. A person with a car (named entity) and a cell phone (named entity) enters into a contractual agreement with a parking garage management company (policy consumer). The contract stipulates that the person is only allowed to park one designated car in the garage, and the person must be present when the car enters and leaves the garage.

The parking garage management company has placed intelligent sensors at points of ingress and egress in the garage. The intelligent sensors are capable of communicating with the policy engine and nearby radio-enabled devices.

The car has a radio-enabled device onboard, which is capable of authenticating with devices like the parking garage's intelligent sensors. The person's cell phone is also capable of authenticating with the parking garage's intelligent sensors.

When the person establishes a relationship with the parking garage company, the person gives the parking garage company the universal names of the cell phone and the automobile, which are discoverable via the universal identity store. The parking garage company's technical administrator associates the universal names of the car and cell phone with the contract, in the policy engine.

When the car attempts to enter or exit the facility, the intelligent sensor detects the car's attempt to authenticate and makes a request to the policy engine, for all required named entities associated with the car. The policy engine replies with the universal name of the cell phone, and the intelligent sensor only allows the car to pass if the intelligent sensor can also authenticate the cell phone. Since the intelligent sensor can only authenticate devices within a close proximity, authentication of the cell phone confirms its physical presence at the same site where the car is detected.

In some embodiments, it may be desirable to create a feedback loop for authorization or authentication failures, to detect attempts at system abuse. In these cases, the policy engine may be used to indicate a responsible party and a method for reaching that responsible party. In the prior embodiment where an intelligent sensor detects and authenticates nearby devices, a bad actor may desire to impersonate a legitimate cell phone for the purpose of gaining access to the parking garage while only being in possession of an authenticated car. The Tech Admin may configure a reporting email address which allows the intelligent sensor to notify the application owner of partial authentication failures, where at least one, but not all, required devices were successfully authenticated. This can allow the application owner to identify and react to users and locations which are more prone to attempted fraud.

Example Implementation: Using Dynamic Policy in Content Curation

Figure 14:
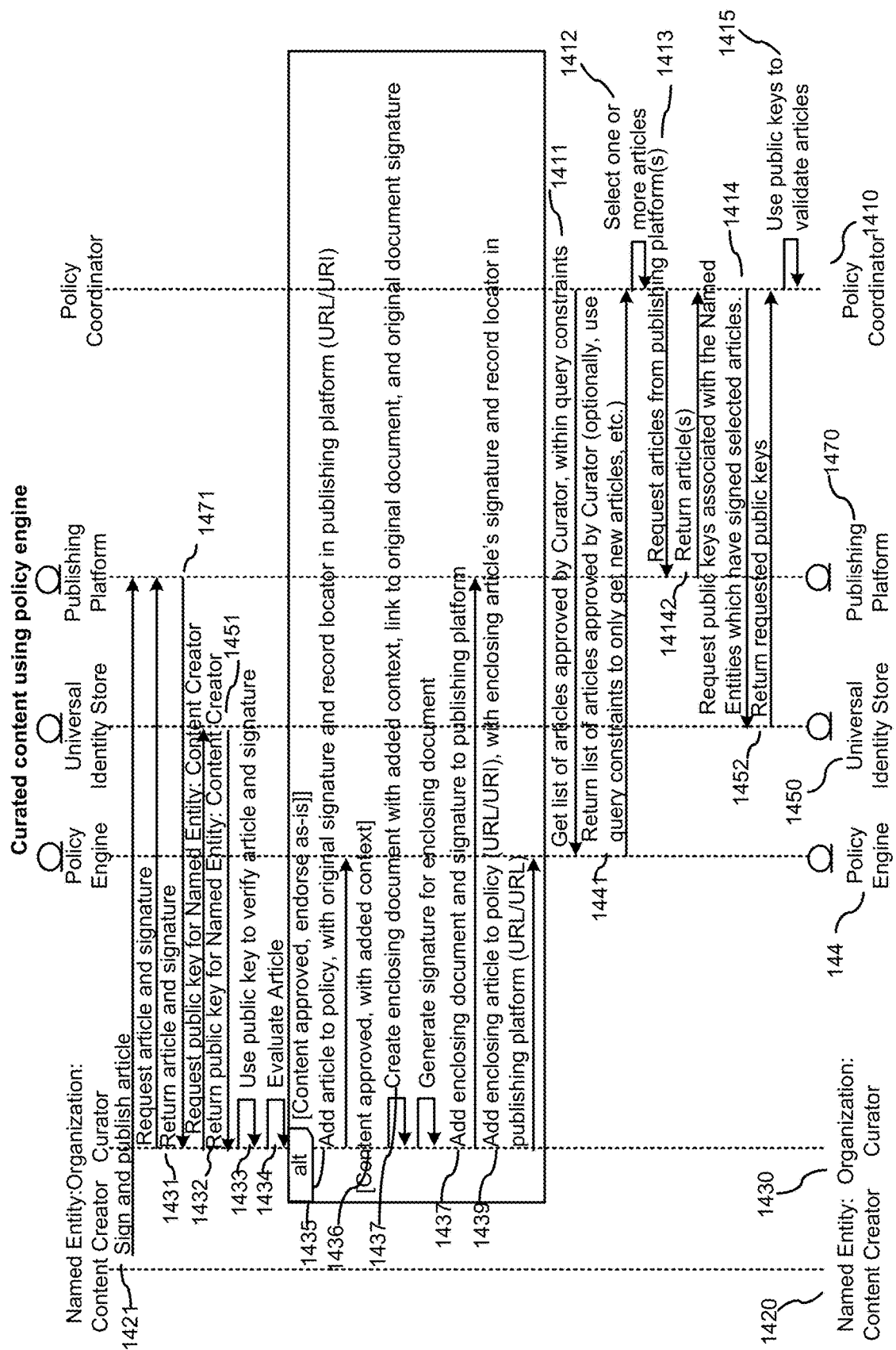
FIG. 14 illustrates an embodiment of authorization determination where content producers and content curators are named entities, and the policy consumer is not a named entity, in accordance with some embodiments.

FIG. 14 illustrates an embodiment where content producers and content curators are named entities, and the policy consumer is not a named entity, we may use the policy engine to represent the content which has originated with a content producer, if it has been approved by a content curator. In this case, the policy consumer trusts the content curator to evaluate the content from various content producers.

The content curator manages the policy, which contains references to approved content. The policy consumer subscribes to the content curator's dynamic policy, and then may discover approved content via the content curator's dynamic policy.

The policy may be cryptographically signed, and validated by using the content curator's public key. The content curator may also add notes or contextual information to the curated content, and the resulting document, which contains the original content and the content producer's signature, may contain the content curator's notes and a cryptographic signature covering the original document and the content curator's notes. The content curator is a customer of the third-party server 140, which offers a management interface for the content curator as well as an interface for the policy consumer. In some cases, the policy consumer may be a named entity, and the policy may be securely delivered by encrypting the policy for the policy consumer's public key.

Example Implementation: Using Policy to Securely Deliver Abuse Reports

Third-party server 140 may be the policy consumer, and sometimes the named entity described in the policy. Using the concept of the 'anonymous user' the third-party server 140 may publish a URI which describes where an abuse report may be sent. This may take the form of an email address or the URL of a HTML form in a well-known format in a TXT record. This allows the application owner to direct abuse reports to the parties responsible for specific devices, and may be derived from the policy configuration for the application. More specifically, the tech admin configures an abuse reporting URI, in connection with the application, or a specific role. The DNS server representing the device identities is a policy consumer. The DNS server requests the policy from the policy engine, and receives a list of identities and associated abuse reporting URI(s), which are then represented in DNS. In the case of multiple roles attached to a device, there may be multiple TXT records, representing multiple responsible parties.

Using a third-party server 140 as a delegation service for authorizing messages has various benefits over the organization 110 performing the authorization because: (1) third-party server 140 sees a lot more parties than does the client, since the third-party server 140 is providing this service for many other clients (2) researching the reputation of a new party is too onerous for the client, and the third-party server 140 is better situated for this because it sees the widest span of parties, good and bad (3) when business policies change or evolve, propagating the effects of these changes can be too much for the client, so using the third-party server 140 to propagate the changes is much easier.

Example Automated Policy and Configuration Building Workflow

FIG. 16 through 23 discusses various policy generation and recommendation examples that may be performed by the third-party server 140. Various policy services may be provided by the third-party server 140 to various organizations as SaaS. Each organization 110 may delegate a portion of a public database, such as the namespace 112 to the third-party server 140 as delegated namespace zone 142 and also delegation part of the management of an application environment to the third-party server 140. The third-party server 140, in turn, may determine, refine, and generate new policies for managing various participant devices in the application environment. The third-party server 140 may perform sender identification and provide guided workflows to utilize identified senders to improve application configuration to address the need of policy refinement that may conventionally be time-consuming and difficult to do. By way of example, the third-party server 140 may review authentication reports such as DMARC or cause message authentication reports to be generated based on message headers. The third-party server 140 may use private databases and OSINT sources to determine the real-world entity behind the electronic identity associated with a device. The third-party server 140 may, in turn, determine the role of the sender. The third-party server 140 may automatically make adjustments to policy based on known relationships of the organization 110. The third-party server 140 may also provide rich information to allow an organization 110 to make well-informed decisions on policy refinement based on information collected in the sender identification process as well as observed relationships between the organization 110 and other organizations served as third-party service provider of the organization 110. For example, the third-party server 140 may identify a permitted sender which should not have been allowed. The third-party server 140 may also identify a blocked sender which should have been allowed.

Figure 16:
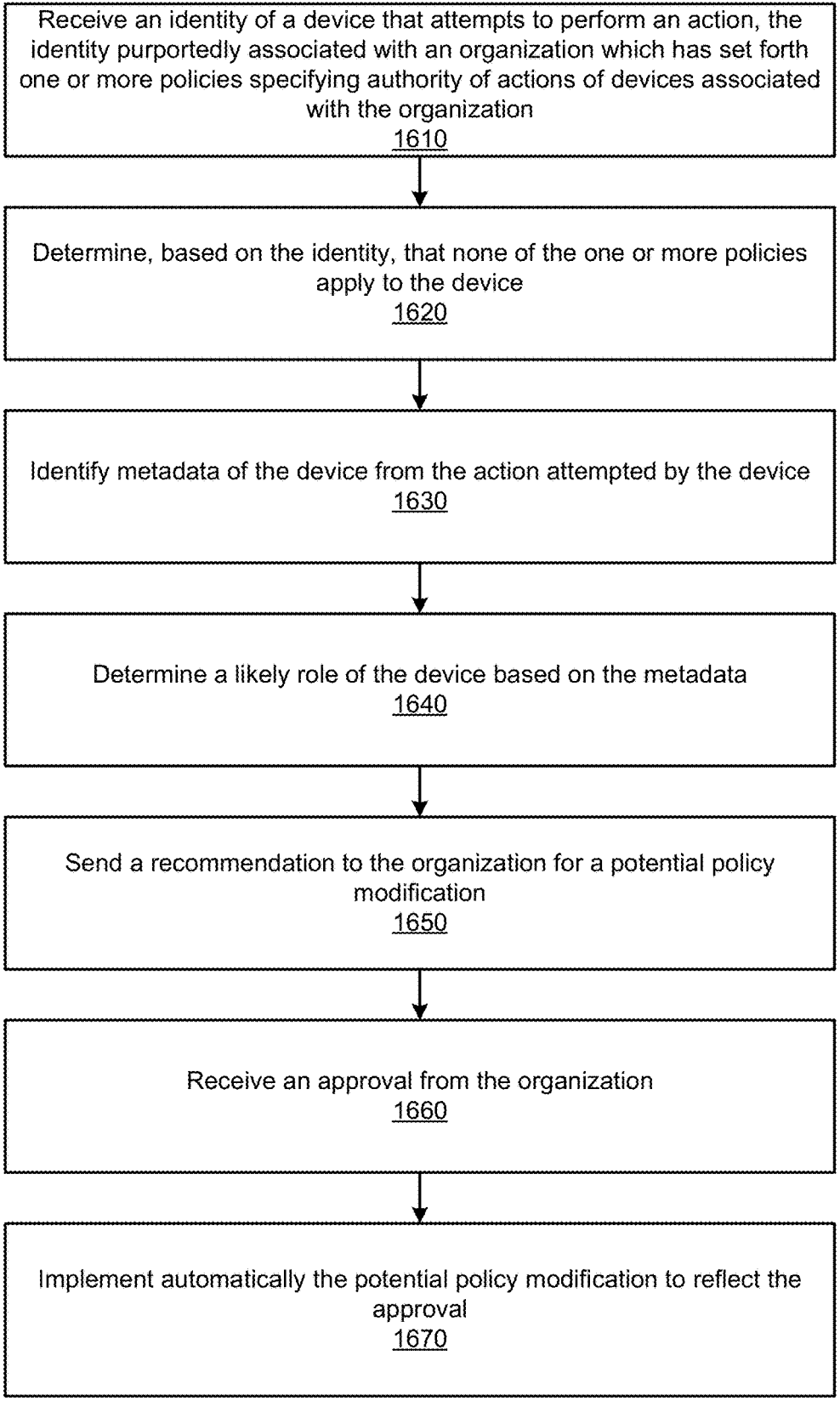
FIG. 16 is a flowchart depicting an example process for using a server to perform an automated policy and configuration generation workflow, in accordance with some embodiments.

FIG. 16 is a flowchart depicting an example process 1600 that illustrates a software algorithm for using a server to perform an automated policy and configuration generation workflow, in accordance with some embodiments. The software algorithm may be stored as computer instructions that are executable by one or more general processors (e.g., CPUs, GPUs). The instructions, when executed by the processors, cause the processors to perform various steps described in the process 1600. In various embodiments, one or more steps in the process 1600 may be skipped or be changed. The process 1600 may be performed by the third-party server 140 or a server of an organization 240. While the process 1600 and other processes discussed in this disclosure may be described as being performed by the third-party server 140, these processes may also be performed by other suitable computers. For example, an organization 240 may not delegate the policy management to the third-party server 140. Instead, the organization 240 may have a computing server that directly performs the process 1600.

The third-party server 140 may receive 1610 an identity of a device that attempts to perform an action. The identity may be purportedly associated with an organization 240 which has set forth one or more policies specifying the authority of actions of authenticated devices associated with the organization 240. The device may be any device in the system environment 230, such as a named entity device 130, a policy consuming device 136, a user device 160, a transmitter device 170, and a recipient device 180. The organization 240 may have delegated the third-party server 140 to manage its policies, such as interaction control policies.

An identity may be a namespace identity, a public key, a credential, or any suitable data that identifies the device. In some embodiments, the identity may be stored in a namespace such as the DNS. The identity may include multiple components, such as a unique identifier and a credential that can be used to authenticate the device. For example, in one case, the identity may be a namespace address (e.g., DNS address) at which the public key of the device is stored. The third-party server 140, when received information related to an action performed by the device, may use the DNS address to retrieve the public key of the device and authenticate the device by verifying one or more digital signatures that are transmitted along with the action performed by the device. For example, the device may send a message that includes its digital signature. An identity may be universal or local. The device may have a single universal identity that can be used in any system or may participate in different applications, each of which is associated with a specific identity that is limited to the particular application.

An identity name may be sent dynamically (e.g., on the fly as the device performs an action) or included in a report (e.g., an external report 155 and an interaction report) that summarizes actions performed by various devices in a system. In some embodiments, the third-party server 140 may serve as a system's policy administrator, which dynamically determines the authorization of various devices in the system. For example, a first device may gain access to information stored in a second device. As the second device receives the identity of the first device, the second device may provide the third-party server 140 with the identity and have the third-party server 140 to determine the authorization of the first device. In some embodiments, the third-party server 140 may receive a collection of identities in a summary report. For example, in an email system, an organization 240 may delegate the third-party server 140 to manage authorization and policy management of emails that are purportedly sent from the organization 240. The third-party server 140 may receive Domain-based Message Authentication, Reporting, and Conformance (DMARC) reports from various email recipient servers. The DMARC reports include a collection of identities of email servers that sent emails purportedly on behalf of the organization 240 using the domain of the organization 240.

An external report 155 may be transmitted to the third-party server 140 in various ways. For example, in one case, the first device (e.g., the message originator) may specify where to send the external report 155 or how the external report 155 is hosted. In another case, the second device (e.g., the message recipient) may determine on its own where to transmit the external report 155. In yet another case, certain recipient devices may have agreements with other parties to send the external report 155 to the third-party server 140.

An action may be any suitable action that may be performed under the environment 230. An action may be sending a message, attempting to gain access, requesting information, querying for specific information, broadcasting data, transmitting data, interacting with other devices, or any suitable act that may be performed by a device. By way of example, a first device may transmit a message to a second device. The message may include the identity of the first device, information for authenticating the device such as its digital signature, and/or other useful context and metadata. The first device may claim to be associated with an organization 240. Upon the receipt of the message, the second device may seek policy information from the third-party server 140 to determine how to properly respond or react to the incoming message given the identity it purports and the relevant context. In another example, an IoT sensor may transmit a set of data to a server. The server may try to determine whether the IoT sensor is legitimate in order to decide whether to trust the data transmitted from the sensor. When two devices attempt to interact with each other, one or more devices may rely on the third-party server 140 to determine how the devices should act based on one or more established policies for the organization that receives the message.

The third-party server 140 may be a delegated server that manages the policy and automatically generates new policies on behalf of an organization 240. The organization 240 may be an operator of an application environment that includes a variety of devices interacting with each other. The organization 240 may set forth certain initial interaction control policies that define how devices should interact with each other. The configurations to achieve the interaction control policies may include authentication protocol, authorization list, specific actions to be taken in a given situation for a particular role of devices, contexts for communications as discussed in US Provisional Application No. 193/057, 814, etc. As more devices participate in the application environment, the existing policies may not foresee all possibilities or cover the identities of some devices. The third-party server 140 may automatically generate policy recommendations and provide policy building workflow for administrators of the organization to make decisions on new policy generation using the process 1600.

The process 1600 may be applied in different settings. For example, an application environment may be an email environment in which an organization 240 retains various entities to send emails on behalf of the organization 240. The organization 240, in this example, may be referred to as the message originators and relevant emails may bear the domain name of the organization. For example, a retailer (retailer.com) may hire a marketer (marketer.com) to send promotional emails on behalf of the retailer. The promotional emails may bear the domain of the retailer but are in fact created by the marketer. The retailer may hire other companies to send different topics of emails on behalf of the retailer. In some cases, a malicious party may pretend to be associated with the organization 240 and send an email under the domain of the organization 240. To prevent this from happening, the organization may set forth one or more sender policy framework (SPF) policies and domain keys identified mail (DKIM) policies to specify how emails associated with the domain should be authenticated. An email recipient server may receive various emails that bear the domain of the organization 240 but are in fact sent from different email servers. The email recipient server may generate a DMARC report that records the identities of devices that purportedly sent emails on behalf of the organization 240. The third-party server 140, delegated to manage the email policies, may receive the DMARC report and determine whether a device is authorized to send emails on behalf of the organization 240.

In an application environment of an IoT device setting, such as an autonomous traffic system, the third-party server 140 may automatically generate policies that govern the actions of the devices using the process 1600. For example, in some embodiments, an IoT device may rely on a message broker to send or receive messages on behalf of the IoT device. This can be similar to an email situation where an organization 240 relies on an email server to send emails. Also, the reliability of various data detected by IoT devices may also depend on the policy determination set forth by the third-party server 140.

Continuing to refer to the process 1600 in FIG. 16, the third-party server 140 may determine 1620, based on the identity, that none of the one or more policies apply to the device. In an application environment, even though the organization 240 has set forth certain policies, the policies may not cover all activities, whether the activities are eventually determined to be legitimate or not. By way of example of an email system, a message originator may indirectly delegate the distribution of its messages that bear its domain to various email sending servers, some of which may not have a direct relationship with the message originator. Continuing with the example of a retailer retaining a marketer to send promotional emails on its behalf, the emails created by the marketer may not always fall under the authorization policies set forth by the retailer. In one case, unbeknownst to the retailer, the marketer may ask a legitimate email server (e.g., Mailchimp) to send the emails that are created by the marketer. As a result, the emails bearing the domain of the organization 240 may appear to be sent from the email server. The organization 240 may not initially have a policy that establishes the email server (i.e. Mailchimp) as valid. The enrichment engine 140 would inform the customer admin 245 that the sending service should be enabled.

In an application environment of an IoT device setting, in some cases, new devices that are not previously registered in the application environment may participate in the environment. For example, in an autonomous vehicle system, new vehicles may enter a local traffic system. In a sensor grid system, a new set of sensors may also begin to provide data to a server. Also, in various situations, owing to a large degree of flexibility and potential of an IoT device system, pre-existing policies may not address every scenario and new situations may come up in the system. In a communication between two devices, the recipient device may receive an incoming message but is uncertain how to react or respond to the message.

In some cases, for existing devices whose identities are recognized by the third-party server 140, new actions or new sets of combinations may arise. The actions will need to be addressed by new policies that are not yet established by the organization 240 or the third-party server 140. For example, one device (e.g., a sensor) may be authorized to perform a certain action (e.g., providing sensor data) while may not have been authorized to perform other actions (e.g., accessing data). In an example of an email setting, an email server may be authorized to send emails on behalf of a first organization but not a second organization, even though the same identity is used for the email server.

An application environment could include different types of configurations that may address the authentication or authorization of the actions of a device. In some embodiments, a configuration may address the authentication requirement of a certain action associated with a device. In one case, the configuration may require an authentication of the device before any communication is further evaluated for authority. In another case, the configuration may allow the devices in the application environment to bypass authentication. The configuration may also set forth the protocol to obtain authentication. For example, the configuration may use the delegated namespace zone 142 and the delegated authentication server engine 210 to perform the authentication.

In cases where the configuration set forth an authentication requirement, the third-party server 140 may need to perform authentication first to confirm the identity of the device before proceeding with determining the potential role of the device. The action of the device may still be rejected after the authentication if the third-party server 140 determines that the role of the device may not have sufficient authorization to perform such an action. In some embodiments, authentication may be bypassed. For example, in an email setting, a sending server may fail the SPF policy but the third-party server 140 may still proceed to determine whether to recommend accepting emails sent from the sending server.

A policy may be a set of rules that are related to the authorization of a device to perform certain actions after the device is authenticated. This type of policy may be managed by the configuration and policy engine 144 and determines the authorization of an action of a device based on the device's role. A device may be authorized under a first policy to perform a first action but the third-party server 140 may not find a second policy that addresses a second action attempted by the device. Prior to determining whether a policy is applicable, the third-party server 140 may authenticate the device so that the role of the device may be determined. In some cases, if third-party server 140 may also determine that none of the policies apply to the device because the third-party server 140 is not able to determine a role for the identity given by the device.

The determination step 1620 may be based on in-band data. In-band data are data that are directly obtainable from the action performed by the device or data that are transmitted within the application environment. For example, in-band data may include the identity of the device, the digital signature and certificate of the device, the contextual information of the action (e.g., time, location, nature of message), and headers of messages associated with the action. These data may be included in the message associated with the action performed by the device. For example, in one case, the action is the transmission of the message itself. The message may include the device's digital signature, certificate, and identity. The contextual information may be determined based on information gleaned during the receipt of the message and any data included in the message itself, such as data in the header of the message. In another case, the action is a request for access. The in-band data may be included in the request.

The third-party server 140 may identify 1630 metadata of the device from the action attempted by the device. The metadata may be part of the in-band information or out-of-band information known to the enrichment engine 150 such as data from external reports 155, external data sources 153, or human analysts 154. The metadata may be of different natures and obtained from different sources that are associated with the action performed by the device. In some embodiments, example metadata may include the device credential, certificate of the device, operator of the device, message headers, policy and authorization request data, device capability and contextual information associated with the action. The metadata may be included in a DMARC report, obtained directly from the message, retrieved from a DNS TXT record associated with the device, or measured based on the context of the action such as time, location, and device specification or customer configuration. Out-of-band data may also be information included in the location specified by the device. For example, in some cases, the device does not directly transmit its credential information to a recipient. Instead, the device points to its DNS address that includes a TXT record including additional information such as the identity record and public key of the device. In the setting of an email system, information included in the DMARC report is considered as out-of-band information.

The identification 1630 of metadata of the device may also include a selection of metadata that is deemed more important than other metadata for the determination of nature and the role of the device and recommendation of a new or modified policy that can be applied to the device. In some cases, the selection may be determined based on one or more objective criteria, filtering criteria, metrics, statistical models or other suitable ways. For example, the third-party server 140 may collect metadata of similar devices or devices of the same source or operator (e.g., same email server in a DMARC report) and conduct statistics to identify a few most common metadata that are present in those devices. The third-party server 140 may prioritize the selected metadata for use in subsequent steps in determining recommendations of policies.

By way of example, metadata such as device credentials, certificates, and operators may be useful for determining the role and the nature of a device. The third-party server 140 may prioritize metadata of devices that share the same operator because the determination of the nature of the operator may provide useful information on the role of the devices. The device credential and certificate may be helpful to determine whether the device is likely to be legitimate and be operated by a reputable source. Those data may be included in a DMARC report in the case of emails. The third-party server 140 may select the most common fields in the DMARC report as the metadata that may be prioritized for determination.

The metadata may also be related to the contextual information and the device capability. The third-party server 140 may use the contextual information and the device capability to determine whether the action taken by the device matches the device capability. By way of example, a device may be a temperature sensor that is configured to transmit temperature data. If the device attempts to transmit pressure data, the third-party server 140 may determine that the action is unauthorized. The contextual information is also helpful for the third-party server 140 to determine the role of the device and the nature of the action. In a sensor grid system, the location of the sensors may be fixed. A significant change in location of a sensor as reflected in the contextual metadata may make an originally authorized sensor falling outside a predefined policy and may indicate suspicious activities associated with the sensor.

The third-party server 140 may determine 1640 a likely role of the device based on the metadata. The third-party server 140 may use in-band metadata to determine out-of-band information that may be helpful for pinpointing the precise role of the device. Out-of-band information may include information that is not included in the performance of the action and may include information that is obtained from a different system. For example, based on the in-band metadata, the third-party server 140 may conduct a search of databases, such as open-source databases and Internet searches, to determine out-of-band information associated with the device. The out-of-band information may include the likely role of the device or may lead to a prediction of a likely role of the device.

The out-of-band information may include known business relationships and known nature of certain operators. For example, the third-party server 140 may determine, based on the in-band metadata, the business relationship between the operator of the device and another company. The relationship may be known to be legitimate and the likely role of the device may involve facilitating the relationship. In the case of an email system, a marketer and an email server may be known to operate together for the distribution of promotional emails for their customers. This relationship may not be directly included in the DMARC report but may be determined by searching one or more open source databases. The nature of the operator may also be used to determine the potential role of the device. If the operator is a well-known company or a company registered with a certified source, the third-party server 140 may determine that the action performed by the device is legitimate.

The search for out-of-band information may be conducted using one or more outside databases such as open-source databases. Some of those databases provide information with respect to the nature of certain domains, such as email domains and the operator of the domains. Entities that participate in an application environment or an industry may also agree to register their information to a public data source so that the third-party server 140 may rely on the data source to determine the nature of an entity that first appears in the application environment managed by the third-party server 140. By way of example, autonomous vehicle manufacturers and sensor manufacturers may agree to upload information to one or more common public data sources. An area may include multiple independently operated traffic systems that are divided geographically. The third-party server 140 of a particular traffic system may rely on the public data sources to determine the out-of-band information of a vehicle entering the traffic system.

The identification 1630 of metadata and the determination 1640 of the likely role of the device based on the metadata may be a repeated refinement process. More details of some of the example determination processes are discussed in later figures including FIG. 17. In one embodiment, the third-party server 140 may conduct statistical analysis to identify one or more metadata that are deemed more important. The third-party server 140 uses the metadata to determine out-of-band information that is relevant to the device. The out-of-band information may be used to enrich the metadata associated with the device. For example, one or more fields of the metadata of the device may be missing first when only in-band information is available. The third-party server 140 may use out-of-band information to determine some of the missing metadata. The third-party server 140 may repeat the refinement process and start a new round of selection of metadata. The selected metadata is then used to search for more out-of-band information until the third-party server 140 is able to determine the likely role of the device.

The role of the device is an authorization category that determines the authorization of the device in an application environment to perform an action. In some embodiments, the identity of the organization represented by the device may also be determined. For example, in an email setting, the third-party server 140 may determine the organization that sends the email. The identity of the organization may be used as a representation of the role of the device. A device may be associated with different roles based on the context and the nature of the actions. Each role may have a different degree of privilege in interacting with other devices in an environment. One or more policies may describe the authorization of the role. If the third-party server 140 determines that a new device belongs to a role that is associated with an existing policy, the third-party server 140 may recommend adding the identity of the device to an authorized device identity list. If the third-party server 140 determines that a device belongs to a new role that is not previously undefined, the third-party server 140 may recommend generating a new policy to address the new role.

The third-party server 140 may send 1650 a recommendation to the organization 240 for a potential policy or configuration modification. The recommendation may be an automated recommendation. The third-party server 140 may provide the recommendations as a form of a guided workflow that may be displayed at a graphical user interface (GUI) for an administrator of organization 240 to make selections. The guided workflow may include questions, selections, and suggestions to guide the administrator to generate a new policy. The detailed process of the guided workflow may depend on the implementation. For example, in some embodiments, the guided workflow may start with a recommendation to accept the device as an authorized entity. The third-party server 140 may present evidence, such as out-of-band information, that shows the nature of the device. The guided workflow may also include selections for the administrator. For example, in some situations, the third-party server 140 may determine that the device could have more than one potential role. The guided workflow may provide the administrator option to manually select the role. In some embodiments, the guided workflow may also serve as part of the real-time feedback to enrich the metadata of the device in order to determine the likely role of the device. For example, the guided workflow may serve as a platform for an administrator to manually enter out-of-band information that assists the third-party server 140 to reach a conclusion of the likely role of the device. An example process for generating a guided workflow is further illustrated in FIG. 18.

Upon completion of the guided workflow, the third-party server 140 may provide a recommendation of policy adoption for the administrator of the organization 240 to decide whether to accept the policy modification. The recommendation may be specific to a particular combination or particular situation. For example, in an email setting, a policy recommendation with respect to authorizing a message delivering server 176 to send emails on behalf of an organization 240 may be specific to the combination of the email server and the organization 240, such as configuring SPF and DKIM for organization 176 in the organization's namespace server 242. In some cases, the authorization does not extend to the email server sending emails on behalf of another organization. The first organization 240 may be associated with a first domain and the email server 240 may be associated with a second domain. The recommendation may be specific to the pairing of the first domain and the second domain. The email server may remain unauthorized for sending emails on behalf of other domains. In an example specific to an IoT device environment, the third-party server 140 may recommend the authorization of a first type of actions to be performed by the device but not a second type of actions.

In some cases, the third-party server 140 may determine that the device is likely illegitimate. The third-party server 140 may recommend the organization 240 to reject the device or set a policy to subject all messages from the device to strict scrutiny.

The third-party server 140 may receive 1660 approval from the organization 240. An administrator of the organization 240 may provide approval through the GUI that provides the guided workflow. The administrator may also reject the recommended policy. For example, the administrator may determine that the device should not be performing the action. Upon rejecting the recommended policy, the third-party server 140 may list the device as unauthorized or unauthenticated and reject the action attempted by the device. In some cases, the third-party server 140 may also adopt a policy that rejects the device and other devices of similar nature. The third-party server 140 may automatically update the configurations that are used to achieve the modified or new policies.

The third-party server 140 may implement 1670 automatically the potential policy modification to reflect the approval. For example, the configuration and policy engine 144 may store a new policy based on the format used by third-party server 140. The newly implemented policy may be automatically implemented by the configuration and policy engine 144. In some embodiments, the policy may also be published at a specific location. In the use of DNS to store policies, the third-party server 140 may publish the policy in the DNS record of the organization to reflect the change in the policy of the organization 240. For example, for DMARC policies, the associated SPF and DKIM policies may be published by the third-party server 140 to the delegated namespace zone 142 of the organization's namespace server 242.

Example Automated Role Determination Refinement

Figure 17:
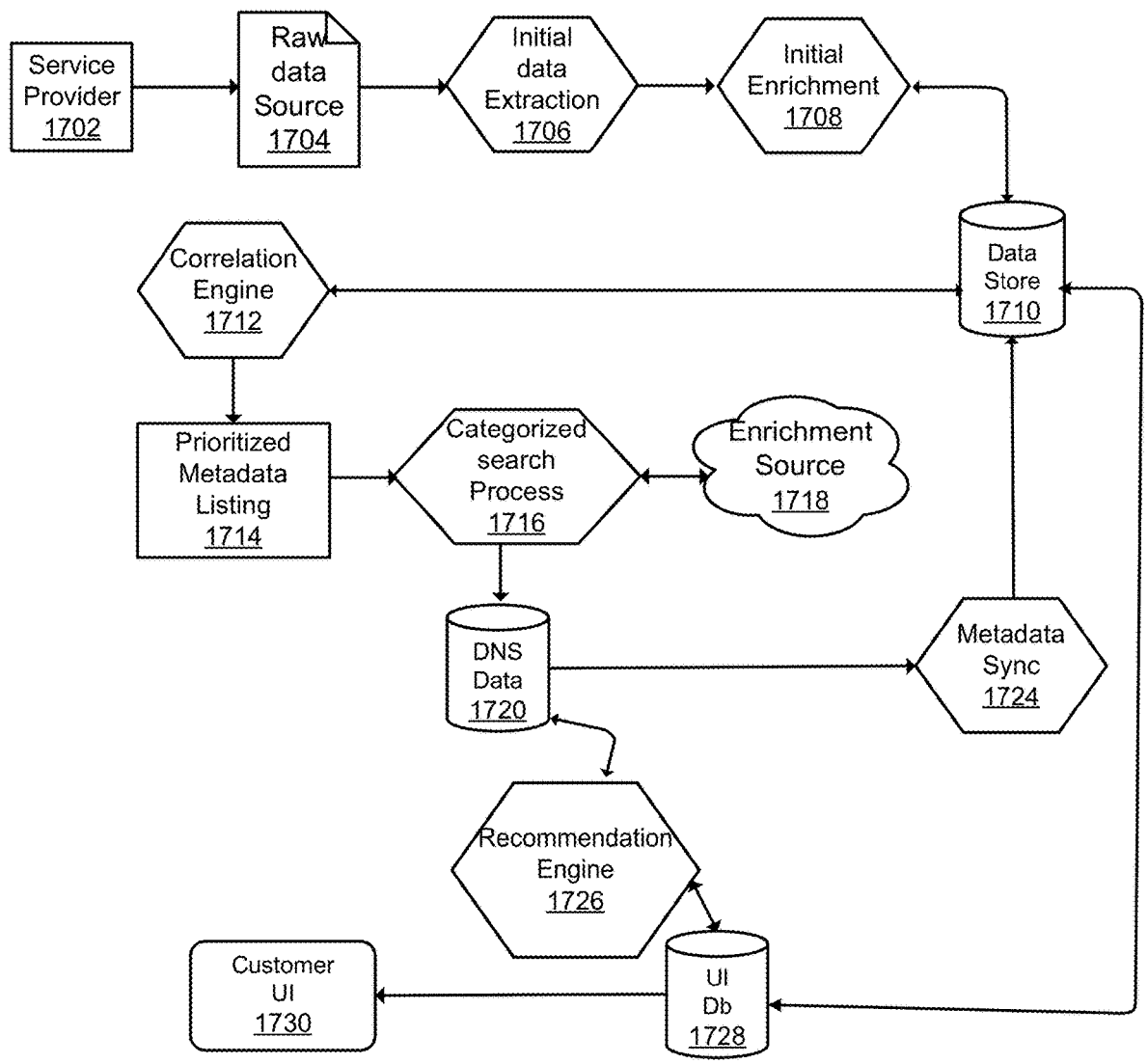
FIG. 17 is a block diagram illustrating various stages of a system for automatically determining the role of a device based on a repeated refinement process, in accordance with some embodiments.

FIG. 17 is a block diagram illustrating various stages of a system for automatically determining the role of a device based on a repeated refinement process, in accordance with some embodiments. The repeated refinement process may be a recursive or iterative process. The system in FIG. 17 is discussed with the use case of an email policy and recommendation process that starts with a DMARC report. However, the system in FIG. 17 is not limited to the use in emails and may be expanded to other uses.

A service provider 1702 may provide a raw data source 1704 to a third-party server 140. In the example of an email setting, the service provider may be an email receiving organization 152 that sends a DMARC report associated with a domain to the third-party server 140. The third-party server 140 may be delegated by the organization 240 that owns the domain to receive a raw DMARC report on behalf of the organization 240. The raw DMARC report may be an example of the raw data source 1704. The third-party server 140 may perform an initial data extraction 1706 that extracts data from the DMARC report. For example, the DMARC report may include various different columns and rows. Each row may represent one or more instances of email transmission. The columns may include various metadata of the email transmission, such as the transmission server name, the transmission server IP address, domain name, selected header information of the email, any SPF or DKIM authentication information, etc.

The third-party server 140 may also perform initial enrichment 1708. The initial enrichment 1708 may center around the sending domain. The third-party server 140 may match the report to the organization 240 using the DMARC policy domain field. The third-party server 140 may also obtain other out-of-band metadata to enrich the records by searching for additional out-of-band information from the external data sources 153. For example, the third-party server 140 may enrich the IP address of the sender server with geolocation and other contextual information. The third-party server 140 may also investigate the authentication results of different groups of messages. If one or more authentication fails, the third-party server 140 may attempt to determine the failure reasons for the group. The third-party server 140 may further determine if the device is suspicious based on the authentication and policy verification results. A device may be unconfigured, misconfigured or new to the third-party server 140 for the server to be marked as potentially suspicious. The third-party server 140 may also determine if the recipient server's treatment of the email is congruent with the sender's policy with regards to SPF, DKIM, DMARC or other policy. For example, in some embodiments, there can be an override policy that overrides certain apparently suspicious activities to allow those activities. The third-party server 140 may also identify one or more instances of email transmissions that do not fall under the current policy of the organization 240.

The third-party server 140 may provide the enrichment results to the data store 1710 for storage. The data store 1710 may be a relational database for a pre-pattern search process. The data store 1710, as discussed below, may also store improved data over time for sender identification and other types of device identification. The data may be used for the initial enrichment process 1708 and may also be used in subsequent processes. The data store 1710 may store different types of data such as the initial enrichment rules, sender identity correlation, and running lists of open items for correlation.

The data in the data store 1710, especially those associated with devices that do not fall under existing policies, may be fed into a correlation engine 1712. The correlation engine 1712 is used to identify metadata that are important for the determination of the likely roles of those unknown devices. In some embodiments, the correlation engine 1712 may sort and prioritize open items based on the commonality of selected metadata. For example, the correlation engine 1712 may conduct statistical analysis on the metadata to select metadata that can be used to address most of the open items. The prioritization of certain metadata aims to address a large number of flows that need to be determined by the third-party server 140. In some embodiments, the correlation engine 1712 may analyze metadata across the entire customer base. For example, various organizations 240 may retain the third-party server 140 to manage policies. The third-party server 140 may combine metadata of reports (e.g., DMARC reports) of various organizations 240 in determining prioritization of metadata.

A prioritized metadata listing 1714 may be outputted by the correlation engine 1712. The prioritized metadata listing 1714 may be a workflow task that identifies the entity which appears to be sending emails on behalf of various organizations. Using the prioritized metadata listing 1714, the third-party server 140 may perform a categorized search process 1716 to identify relevant out-of-band information. The search process 1716 may be conducted at one or more enrichment sources 1718, which may be an internal database of the third-party server 140 or external data sources such as certain open source databases.

The categorized search process 1716 may include one or more repeated enrichment between the third-party server 140 and the enrichment sources. For example, the third-party server 140 may get the metadata around a device or an entity associated with the device. The third-party server 140 may perform a search in one or more enrichment sources such as external data sources to determine relevant out-of-band information of the device or the entity. The out-of-band information may include the ownership chain of the email sending server business, the taxonomy of the email sending server, markets to which the email sending entity belongs, etc. The third-party server 140 may store the results in a DNS data store 1720, which is an internal database for enrichment that may be shared with the DNS services of the third-party server 140. The third-party server 140 may also perform metadata sync 1724, which synchronizes the newly identified service and information to the data store 1710 to improve the metadata of the DMARC reports associated with the unknown devices. In turn, the third-party server 140 may perform the next round of refinement by prioritizing metadata at the correlation engine 1712 and perform another categorized search process 1716 until the likely role of a device is determined.

The third-party server 140 may include a recommendation engine 1726, which may operate a guided workflow for an administrator of an organization 240 to make decisions around a recommendation provided by the third-party server 140. The recommendation engine 1726 may perform comparisons between a recommendation and an actual policy. The recommendation engine 1726 may also detect the disposition of customer workflows. The recommendation engine 1726 may further trigger a change in the policy such as by causing the third-party server 140 to publish the modified policy in the DNS data based on the disposition of the customer workflows. For example, delegated authentication service engine 210 and/or configuration and policy engine 144 may publish one or more rule or data changes to delegated namespace zone 142.

The guided workflow may be displayed at the customer user interface (UI) 1730. The customer, such as an administrator of the organization 240, may interact with the UI to accept or reject policy change recommendations. Customers may also manage configurations and policies at the UI and run reports from the UI. The customer UI database 1728 may store policy recommendations. For representation to customers, the third-party server 140 may access data storage for sender identifier correlation and domain metadata (frequency of flows).

Guided Workflow and Policy Recommendations

Figure 18:
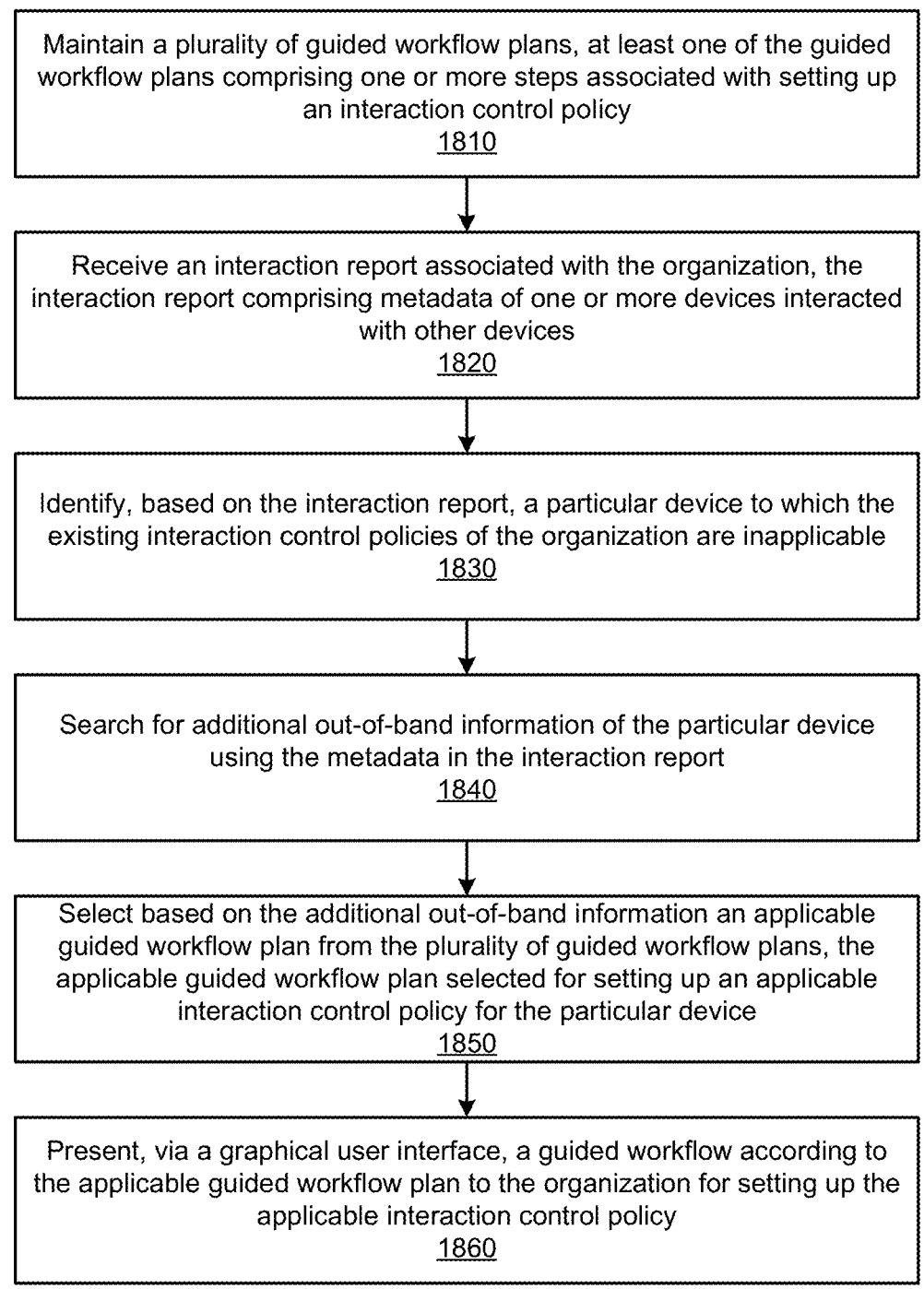
FIG. 18 is a flowchart depicting an example process for a third-party server to provide a guided workflow, in accordance with some embodiments.

FIG. 18 is a flowchart depicting an example process 1800 that illustrates a software algorithm for a third-party server 140 to provide a guided workflow to an organization 240 to set up one or more policies such as interaction control policies, in accordance with some embodiments. The software algorithm may be stored as computer instructions that are executable by one or more general processors (e.g., CPUs, GPUs). The instructions, when executed by the processors, cause the processors to perform various steps described in the process 1800. In various embodiments, one or more steps in the process 1800 may be skipped or be changed. The third-party server 140 may be delegated by the organization 240 to manage one or more existing interaction control policies associated with the organization. Interaction control policies may refer to one or more policies that determine how devices in an application environment may interact with each other. For example, interaction control policies may control the authentication and authorization protocols, determine the roles of devices participating in an application environment, and define other suitable interactions in an application environment. An application environment may be an email environment, an IOT application, or another suitable environment where multiple devices interact with each other. By way of example of an email environment, interaction control policies may define policy framework (SPF) policies and domain keys identified mail (DKIM) policies to specify how emails associated with the organization 240 should be authenticated. In an IoT application, interaction control policies may define how IoT devices may authenticate each other using PKI identities and contextually such as based on geographical locations, timestamp, etc. Other interaction control policies may also include authorization policies and role defining policies that may limit certain actions of devices in an application environment. One or more interaction control policies may be maintained at the DNS of the organization 240 or another suitable namespace, which may or may not be delegated to the third-party server 140 for the management.

The process 1800 automatically identifies a device to which existing interaction control policies of the organization 240 are inapplicable and selects and provides a guided workflow to the organization 240 to set up a new interaction control policy to address the situations related to that device. Upon identifying that the device has failed one or more existing interaction control policies, the third-party server 140 automatically conducts research to search for additional out-of-band information of the device to determine a likely role and characteristics of the device. In response, the third-party server 140 determines that one or more predetermined guided workflow plans may be applicable for the organization 240 to set up an additional interaction control policy for the device. The third-party server 140 presents the guided workflow via a graphical user interface to an administrator of the organization 240 for the organization 240. After the third-party server 140 receives information and selection provided by the organization 240 through the guided workflow, the third-party server 140 implements the new interaction control policy by changing one or more configurations of the application environment.

By way of example, the third-party server 140 may maintain 1810 multiple guided workflow plans that are used for setting up various types of interaction control policies. A guided workflow plan may include one or more predetermined steps associated with setting up an interaction control policy. The steps may take the forms of questions, selections, open fields, matching and other suitable ways to seek information from the organization in order to complete the setup of a new interaction control policy. Each plan may be a predetermined flowchart that is straight or branched, sequential or nonsequential, cyclic or acyclic, and involves steps that are logically related to previous steps or not. Each plan aims to collect sufficient information for the third-party server 140 to set up an interaction control policy for a device such as a newly identified device. Several non-limiting examples of guided workflow plans are illustrated in FIGS. 19A, 19B, 19C, and 19D. Each plan may be specific to setting up one type of interaction control policy. For example, a first guided workflow plan may be used for setting up an authentication protocol and a second guided workflow plan may be used for setting up an authorization protocol. As discussed in further detail below, the third-party server 140 automatically conducts research on a newly identified device to determine what type of interaction control policy should be set up for the device. In turn, the third-party server 140 presents an applicable guided workflow plan to the organization 240 to set up a suitable interaction control policy. In various embodiments, the third-party server 140 may maintain those guided workflow plans by storing the instruction code related to those plans, metadata, parameters, pre-set questions and forms in a data store of the third-party server 140.

Various guided workflow plans may include metadata fields that define the characteristics of the plans and the triggering conditions of the plans. In one embodiment, the guided workflow plans may include metadata fields such as data source, events, required data elements, event producer, event consumer, filter, and other suitable fields. These are merely non-limiting and non-exhaustive examples of fields that may be associated with guided workflow plans in some embodiments. The data source field may define the type of report that is received by the third-party server 140 that will trigger a particular plan. For example, some plans are triggered by data identified in a first type of report while other plans are triggered by data identified in a second type of report. The reports may be authentication reports (e.g., DMARC reports), web application reports (e.g., reports generated by software applications provided by the third-party server 140), DNS scans, etc.

The events field may define the type of events that will trigger one or more guided workflow plans. Events can be any events, usually abnormal but not necessarily, that may trigger a warning in a reporting. Events may result from new devices not registered in the database of the third-party server 140, new accounts, improperly set-up devices, incomplete set up, unauthorized devices, domain issues, changes in device configurations, changes in DNS configurations, and other situations. Non-limiting and non-exhaustive examples of events may include detection of a new service (e.g., new email sending services, new IoT devices), detection of DKIM missing for a service that supports DKIM, failing of DKIM, detection of new signature in DKIM, detection of a new DKIM selector, possible DKIM found, unalignment of SPF, failing of SPF, detection of a new potential SPF domain, new account created, organization domain created, domain DNS configuration change and update, detection of certain specific domains, detection of new or existing services in MX records, detection of new or existing service in SPF records, detection of new or existing service in DKIM selector, DNS delegation issues. Some of the example events described herein may be specific to email systems, but other events or similar counterparts may be included in the event field for an IoT system.

The required data element field may specify the information needed by the third-party server 140 in order to trigger a particular guided workflow plan. For example, the third-party server 140 may need to verify certain status or identification of a device before an interaction control policy may be set up. The required data element field sets forth the data needed for the third-party server 140 to verify that a certain event has occurred in association with a particular device. The required data element may be evidence of a certain event that has occurred. For example, in order for the third-party server 140 to provide a guided workflow plan to set up an authentication protocol for a particular device, the third-party server 140 may need to first detect that a certain issue has occurred in association with the authentication of the particular device. In some cases, the required data element may also be used to provide information for the third-party server 140 to determine the selection between two similar plans. For example, an authentication failure reason for SPF may determine whether the device has an SPF unalignment issue or SPF failing issue. The third-party server 140 may determine the precise issue as to the SPF authentication to select a corresponding guided workflow plan. Non-limiting and non-exhaustive examples of required data elements may include service identification (e.g., email sender service identification), historical services of the organization 240, false or unverifiable DKIM signatures, new or unverifiable DKIM selector, false or unverifiable DKIM aligned signatures, DKIM failure reasons in DMARC report, SPF failure reasons in DMARC report, namespace record for a domain that is hosted by a particular server, newly created organization domain, MX record source, a change in service in the MX record, detection of unconfigured service, etc.

The event producer field and event consumer field may respectively specify the software algorithm that is used to determine the event and the software algorithm to invoke a particular guided workflow plan. For example, an event producer may be a software algorithm that conducts additional research on the device to automatically determine the information of the device based on out-of-band sources such as external data sources 153. Details of the determination of the out-of-band information are discussed in FIG. 17. The event consumer invokes a particular guided workflow plan for the organization 240 to generate a new interaction control policy. The filter field may set forth certain conditions that may filter or include certain plans.

The third-party server 140 may receive 1820 an interaction report associated with the organization 240. Interaction reports may be external reports 155. The interaction report includes metadata of one or more devices or entities that interacted with other devices. The devices may be associated with different entities. For this disclosure, the parties that interact are referred to as devices but they may also be entities. Interaction reports may refer to documentation that record the interactions among devices in an application environment. The interactions can include new registration of devices, messaging among devices, authentication records (including failures, successes, and metadata) of devices, authorization records, action items, and other suitable interactions among an application environment. the interaction report may be specific to a single interaction or may be a compilation of multiple unrelated interactions. In various embodiments, there can be various kinds of interaction reports that are generated by different sources. For example, the third-party server 140 may be delegated by the organization 240 to manage part of or the entirety of an application environment. The third-party server 140 may generate an interaction report documenting the interactions managed by the third-party server 140. In some cases, the third-party server 140 may provide software in operating the application environment (e.g., emails). The report may be generated by the software. In some cases, other parties unrelated to third-party server 140 may also forward interactions reports to the organization 240, which may delegate the third-party server 140 to receive those reports. For example, in the setting of an email environment, a domain-based message authentication, reporting and conformance (DMARC) report is an example of an interaction report. Other parties, which may be email recipient servers, may regularly transmit DMARC reports that include metadata and authentication results of emails that are purportedly sent from the domain of the organization. Other examples of interaction reports include SMTP TLS Reporting (TLS-RPT) (Simple Mail Transfer Protocol Transport Layer Security Reporting).

An interaction report may include metadata of recorded interactions. The metadata may include the identities of devices, results of authentication (e.g., DKIM results and SPF results), results of authorization, metadata related to the devices, such as servers operating the devices, organizations operating the devices, device identities, and domains of the devices, contextual metadata such as timestamp, geographical locations associated with the devices, device types, etc. In some embodiments, an interaction report may be related to messaging among the devices. The metadata may include message headers, authentication information of devices, and message metadata.

In various embodiments and depending on the application environment, devices may interact with other devices in different ways. For example, interactions may include email communications, messaging between IoT devices, broadcasting of messages to multiple devices, actions performed in the application environment. In some cases, some of the devices may represent that the devices are acting on behalf of the organization 240. For example, an email delivering server may send emails on behalf of the organization 240. The email delivering servers may have different domain addresses and IP addresses than the organization 240. The interaction report may include records of the results of authentication of those email delivering servers to provide information as to whether a particular email delivering server is truly a legitimate server that sends emails on behalf of the organization 240.

The third-party server 140 may identify 1830, based on the interaction report, a particular device to which the existing interaction control policies of the organization 240 are inapplicable. For example, the particular device may have failed an authentication protocol such as DKIM or SPF in the email setting. The authentication protocol may be one of the existing interaction control policies. There can be multiple situations where the existing interaction control policies are inapplicable to a device. For example, a policy may be inapplicable to a device because the policy is an incomplete policy, a wrong policy, or an irrelevant policy. An inapplicable policy may also arise when the policy raises a warning to the device or the policy is unable to be carried out given the presence of a device. In some cases, the third-party server 140 may also determine that there are no existing policies that can be applied to a device. For example, the device may be a newly registered device whose role and identity have not been properly determined in an application environment. In the setting of emails, a policy may be determined to be inapplicable to a new when authentication (e.g., DKIM and SPF) fails. The third-party server 140 may identify devices to which no policies are applicable based on the authentication results, warning, or other irregularities in the interaction report.

The third-party server 140 may search 1840 for additional out-of-band information of the particular device using the metadata in the interaction report. The interaction report may include some out-of-band information. The third-party server 140 may conduct additional searching for additional out-of-band information from external data sources 153. The search may be done by an iterative process discussed in FIG. 17. The third-party server 140 may search for information related to event fields and required data element fields associated with various guided workflow plans. The out-of-band information may be related to the particular device or the services or organizations operating the devices. The out-of-band information may be searched through servers and data sources that may not be directly related to the application environment to determine additional information about the particular device that is not readily available in the messages sent by the particular device (e.g., in-band information) or in the interaction reports.

The third-party server 140 may select 1850, based on the additional out-of-band information, an applicable guided workflow plan from the multiple guided workflow plan maintained by the third-party server 140. The applicable guided workflow plan is selected for setting up an applicable interaction control policy for the particular device. Examples will be discussed in FIGS. 19A-6D. The out-of-band information may match an event field or a required data element field in one of the guided workflow plans. Accordingly, the third-party server 140 may select that guided workflow plan.

By way of example, the additional out-of-band information may indicate that a service provided by the particular device supports an authentication protocol that has not been set up. The selected applicable guided workflow plan is used for setting up the authentication protocol. In an email setting, the third-party server 140 may identify from a DMARC report that an email delivering server has failed SPF authentication or DKIM authentication. The third-party server 140 may search for out-of-band information to determine whether that email delivering server supports SPF and DKIM. The out-of-band information indicates that the email delivering server supports DKIM while currently the interaction report indicates that the DKIM setup has resulted in a failure of the DKIM authentication. In turn, the third-party server 140, based on the out-of-band information, selects a guided workflow plan that helps the organization 240 to set up DKIM authentication for the email delivering server. If the out-of-band information indicates that the email delivering server does not support DKIM, the third-party server 140 may select another guided workflow plan to helps the organization 240 to remove any DKIM authentication currently set up with the email delivering server.

The additional out-of-band information may also indicate a likely role of the particular device. In an IoT application environment, the role of a device may determine the actions and authorization of the device. For example, a sensor may only be permitted to transmit a certain type of information but not other types of data that are not supposedly measured by the sensor. The third-party server 140 may identify the role of the device and automatically selects a guided workflow plan for the organization 240 to set up the authorization limit with respect to the device.

The selection of one or more applicable guided workflow plans may be partially based on the out-of-band information, but may also be based on other data. For example, in some messages, the headers and metadata of the messages may also provide information that matches an event field or a required data element field in one of the guided workflow plans. The headers and metadata, which are transmitted with the messages, may be considered in-band information that may also be used to select guided workflow plans. In an interaction report, the third-party server 140 may identify multiple devices that need to have policies set up. The third-party server 140 may provide a list of applicable plans for the organization 240 to go through the setup. An example of a list of applicable plans is shown in FIG. 20B.

Figure 20A:
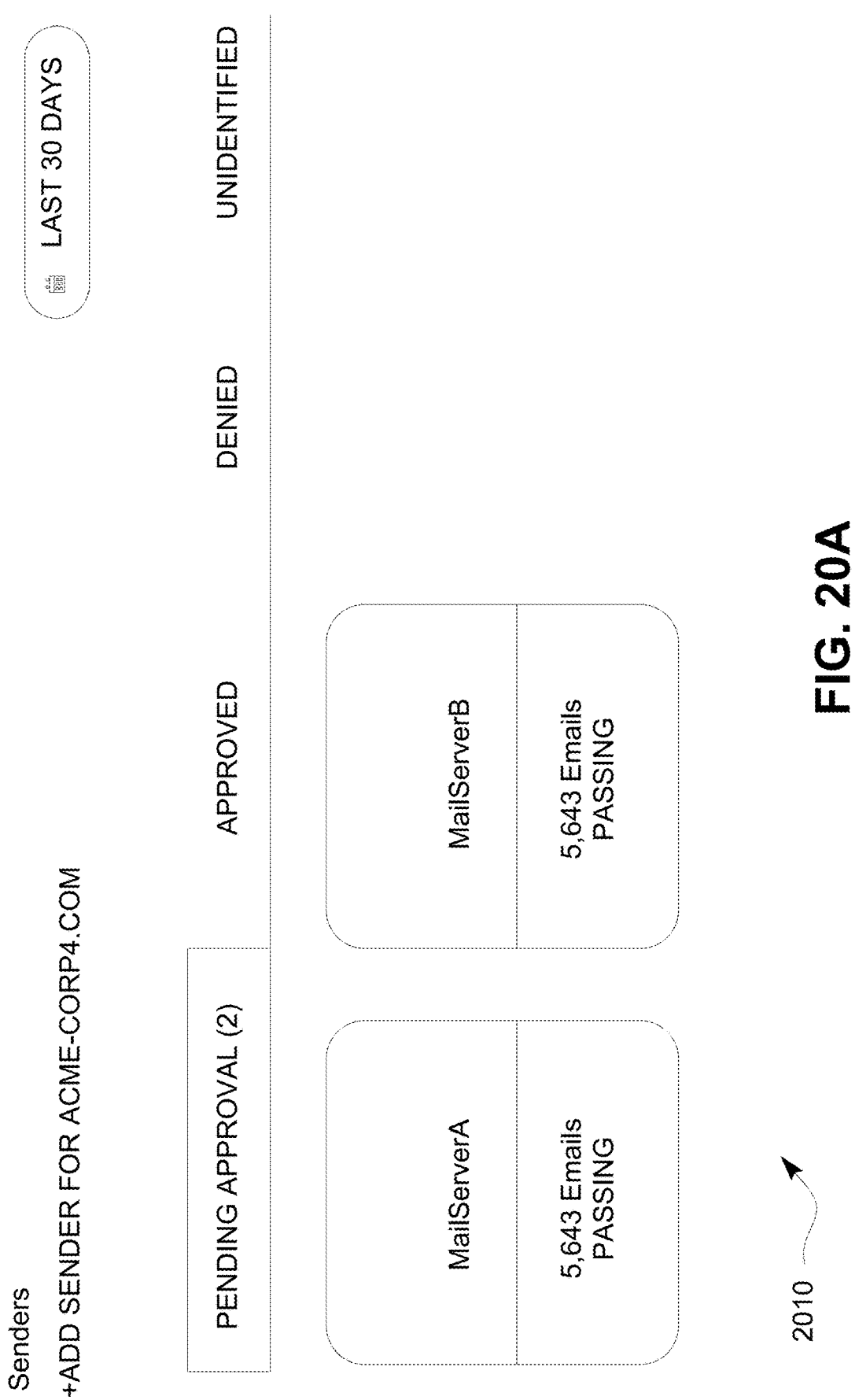

The third-party server 140 may present 1860, via a graphical user interface, a guided workflow according to the applicable guided workflow plan to the organization 240 for setting up the applicable interaction control policy. An administrator of the organization 240 may go through and complete the workflow to set up a new interaction control policy. A new interaction control policy may be a completely new policy or a modified version of an existing interaction control policy. In presenting the guided workflow, the third-party server 140 may send a recommendation to the organization 240 for a potential modification to an existing interaction control policy. In some cases, the guided workflow may include one or more questions or suggested actions for the organization 240 to characterize the device. The third-party server 140 may receive a selection, such as an approval, from the organization. The third-party server 140, based on the selection of the new interaction control policy, implements automatically the modification to reflect the selection. The third-party server 140 may automatically adjust the configurations, such as rules and records reflected in the DNS of the organization 240 on behalf of the organization. Examples of the visualizations of the guided workflow displayed in a graphical user interface are shown in FIGS. 20A-7E.

Figure 19A:
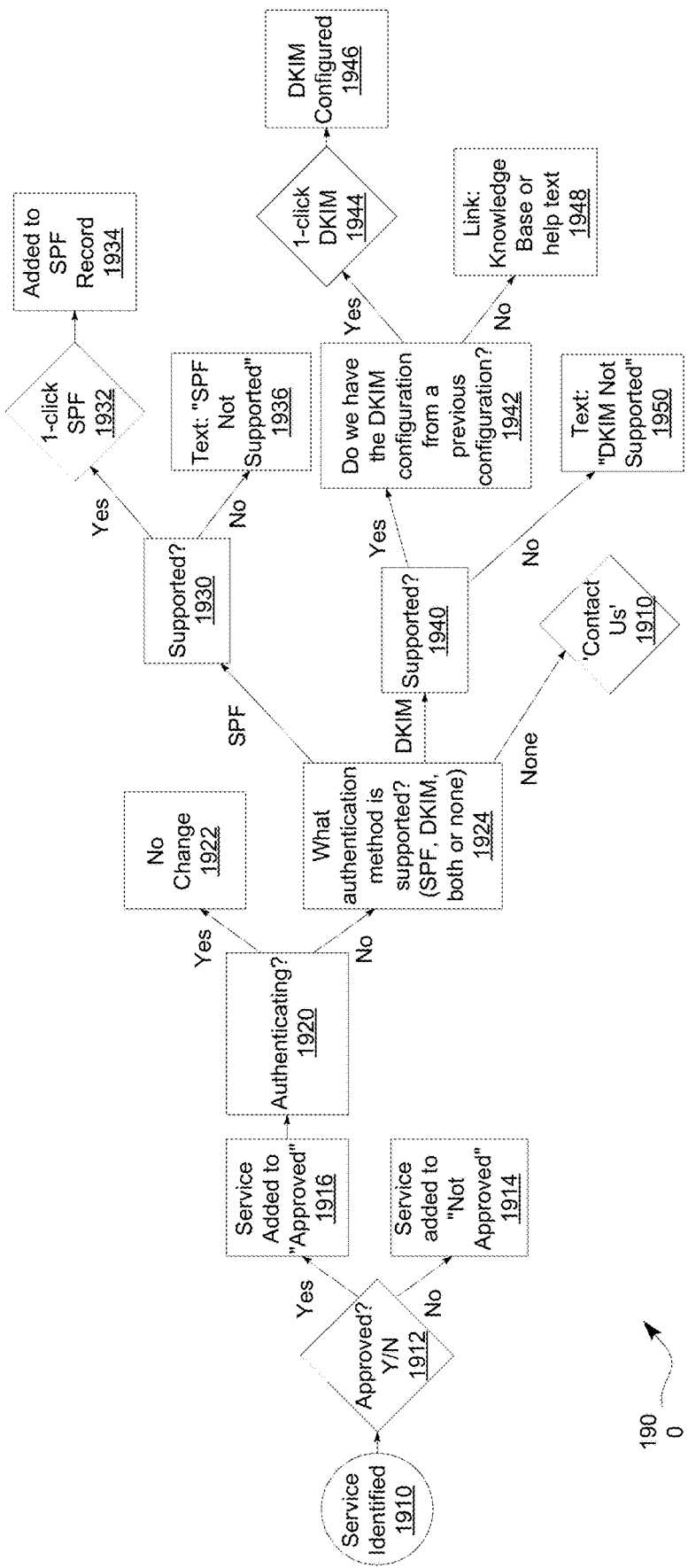

FIG. 19A is a flowchart illustrating an example of a guided workflow plan 1900, in accordance with some embodiments. The guided workflow plan 1900 is merely one example of guided workflow plans that are maintained by the third-party server 140. In some embodiments, the third-party server 140 stores a plurality of different plans to set up different types of interaction control policies.

The guided workflow plan 1900 is a directional and branched plan that is used to set up a new email service in an email application environment. The guided workflow plan 1900 may begin with a page 1910 that displays that a new service is identified. For example, the third-party server 140 may have detected that the organization 240 has retained a new email delivering server to send emails on behalf of the organization 240. The new email delivering server is the new service in this example. On the page 1910, the third-party server 140 may show evidence as to why the server believes the newly identified service is a new service. The evidence may include out-of-band information that is searched from various sources. At decision stage 1912, the third-party server 140 receives a selection from the organization 240 to decide whether to approve the new service. If the organization 240 does not approve the service, the service is added to a "not approved" list in step 1914. If the organization approves the service in step 1916, the service is added to an approved list.

The guided workflow 1900 proceeds to an authentication setup at step 1920 to determine whether emails sent using the new service are authenticated properly. If so, there is no further set up and the guided workflow 1900 ends at step 1922. If the emails are not authenticated properly, the guided workflow 1900 displays a series of steps for the organization 240 to set up various authentication protocols. The guided workflow 1900 determines what authentication method is supported by the new service at step 1924. This may be obtained from out-of-band information that is generated from researching the protocols supported by the entity operating the new service.

At step 1930, if the third-party server 140 determines that the new service supports SPF, the guided workflow provides a setup wizard 1932 of a one-click SPF and, at step 1934, add the configuration to the SPF record in the DNS of the organization 240. If the third-party server 140 determines that the new service does not support SPF, the guided workflow provides the text of "SPF Not Supported" at step 1936. At step 1940, if the third-party server 140 determines that the new service supports DKIM, the third-party server 140 further reviews its record to determine, at 1942, whether the third-party server 140 has stored a previous DKIM configuration. If so, the guided workflow provides a setup wizard 1944 of a one-click DKIM and, at step 1946, sets up the DKIM configuration. If the third-party server 140 determines that it does not have a previous DKIM configuration, the guided workflow provides a link on knowledge-based or help text to the organization 240 at step 1948. If the third-party server 140 determines that the new service does not support DKIM, the guided workflow provides the text of "DKIM not supported." If the third-party server 140 determines that the new service supports neither SPF nor DKIM, the third-party server 140 may provide a page 1950 to ask the organization administrator to contact the third-party server 140.

Figure 19B:
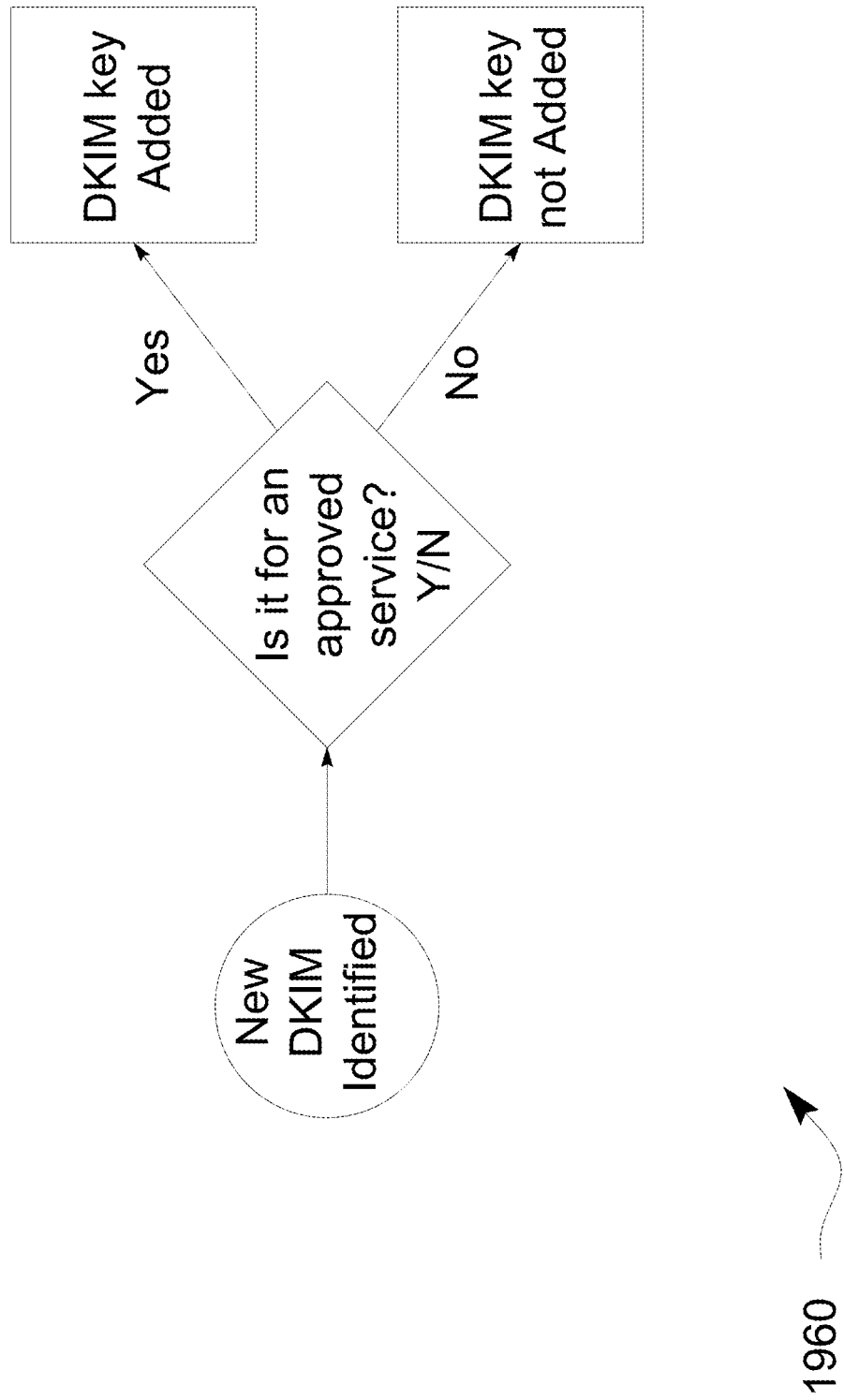
Figure 19C:
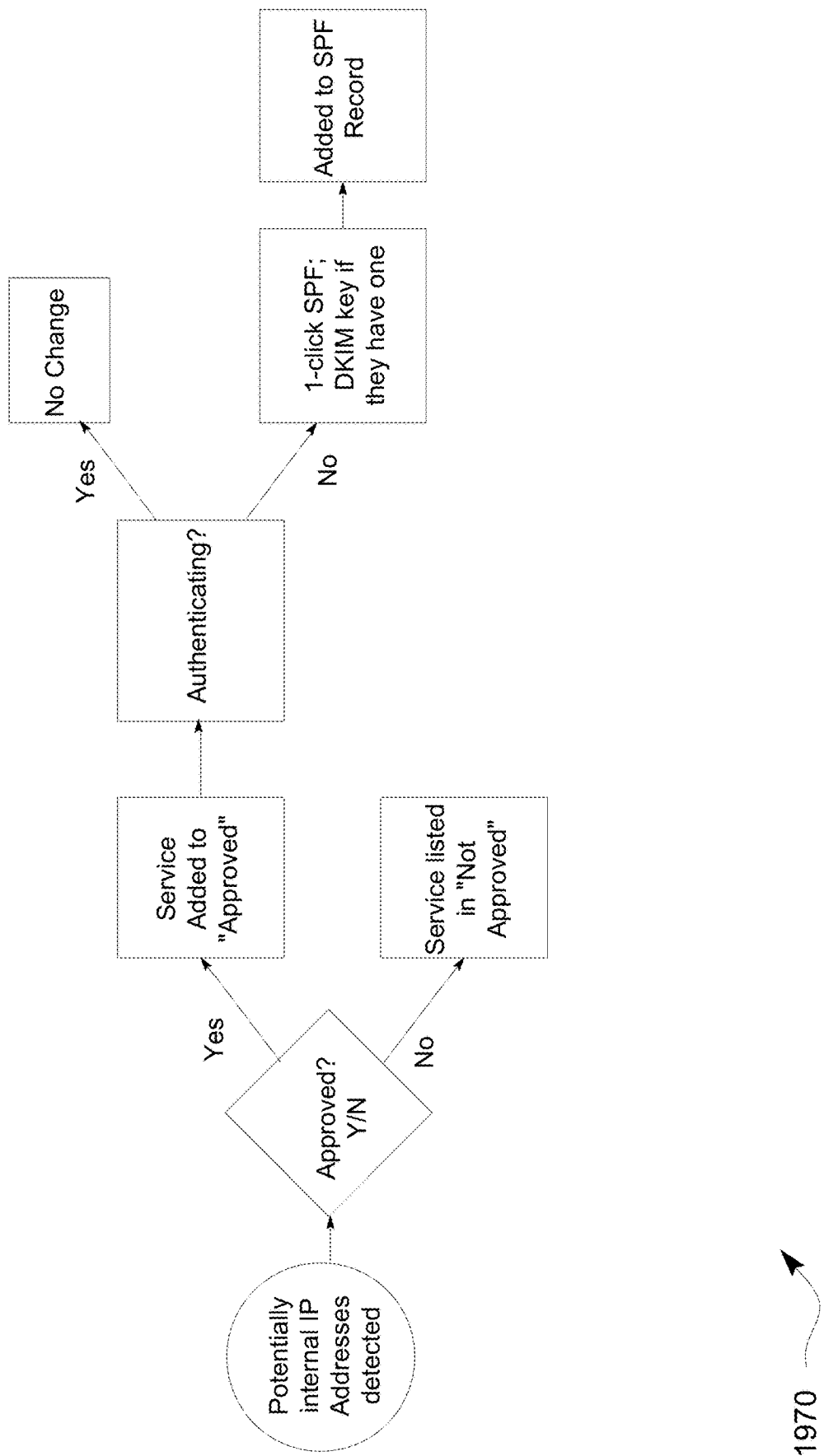

The guided workflow plan 1900 is merely one example of the guided workflow plan that may be maintained by the third-party server 140. FIG. 19B through 19D shows additional guided workflow plans that are used for other interaction control policies. The guided workflow plan 1960 shows a workflow for DKIM key discovery. The guided workflow plan 1970 shows a workflow for a likely netblock detection. The guided workflow plan 1980 shows a workflow for delegating DNS records for a domain.

FIG. 20A through 20E depicts conceptual diagrams illustrating example graphical user interfaces that display various pages of an example guided workflow plan, in accordance with some embodiments. The pages shown in the graphical user interface may correspond to the guided workflow plan 1900. In FIG. 20A, the graphical user interface page 2010 displays new services that have been identified by the third-party server 140. The new services may be email delivering servers that are delegated by the organization 240 to send emails on behalf of the organization 240. The third-party server 140 may identify the new services from an interaction report, such as a DMARC report. The page 2010 shows a list of new services that need to be approved or rejected by the organization 240.

Figure 20C:
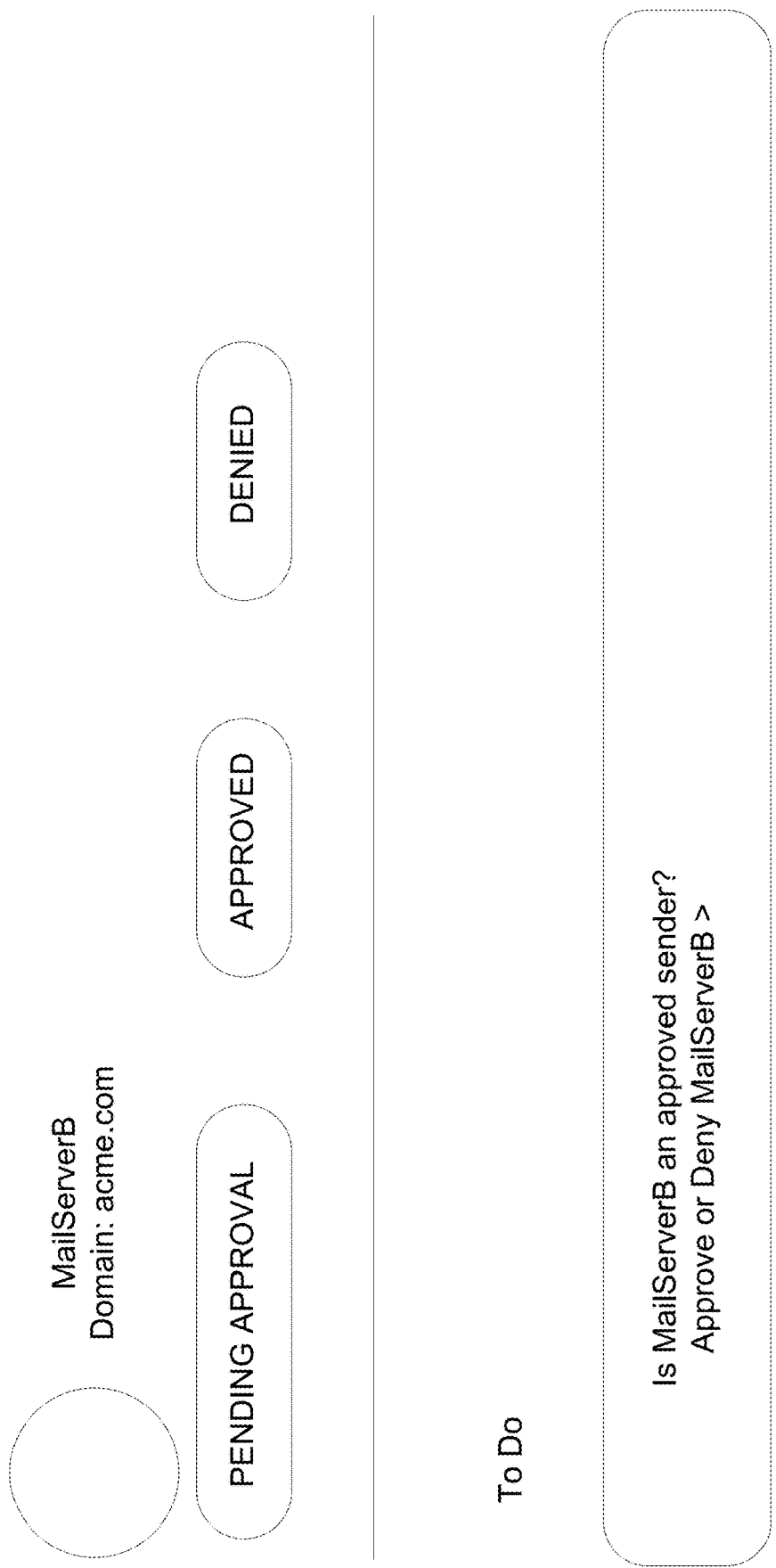
Figure 20E:
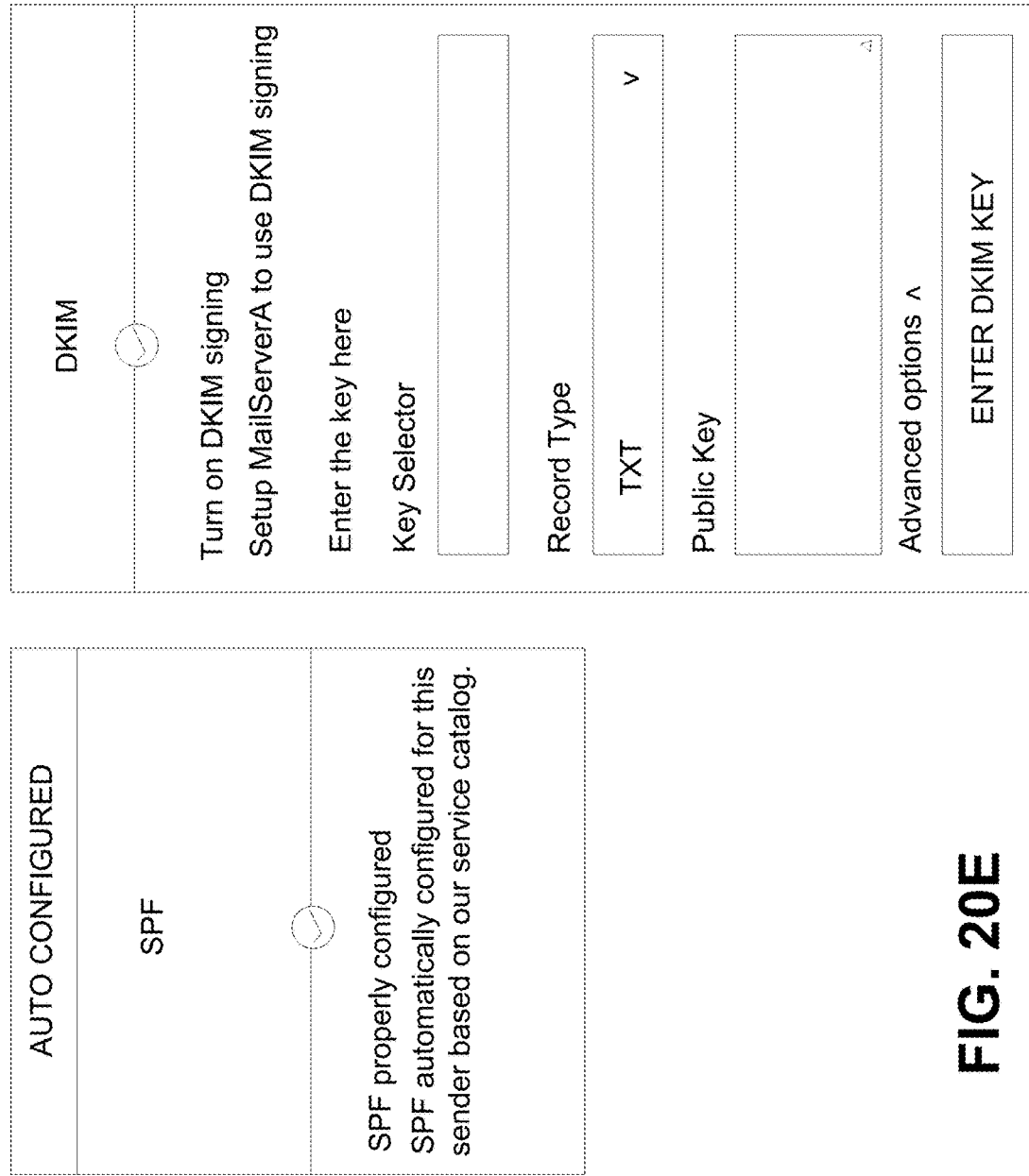

In FIG. 20B, the graphical user interface page 2020 is displayed after an organization administrator selects one of the new services. The page 2020 shows a list of tasks that may be completed by the organization 240. The list of tasks may correspond to various branches in the guided workflow plan 1900. For example, the tasks may include having the organization to set up SPF and DKIM and to approve the new service. In FIG. 20C, the graphical user interface page 2030 shows a step for the organization 240 to approve or deny a new service. The page 2030 also displays the authentication protocol setup status associated with the new service. In FIG. 20D, the graphical user interface page 2040 shows a step for the third-party server 140 to provide information and guides on how to enable SPF by providing a TXT record for the organization 240 to update its DNS. The page 2040 may also allow the organization 240 to refresh the DNS to check if the SPF has been properly implemented. In FIG. 20E, the graphical user interface page 2050 shows a step for the organization 240 to set up DKIM. The organization 240 may enter the key selector and the public key on the page 2050. After the information is entered, the third-party server 140 may automatically implement the DKIM setup. A new interaction control policy is thus created and completed.

DETAILED POLICY RECOMMENDATION EXAMPLES

Figure 21A:
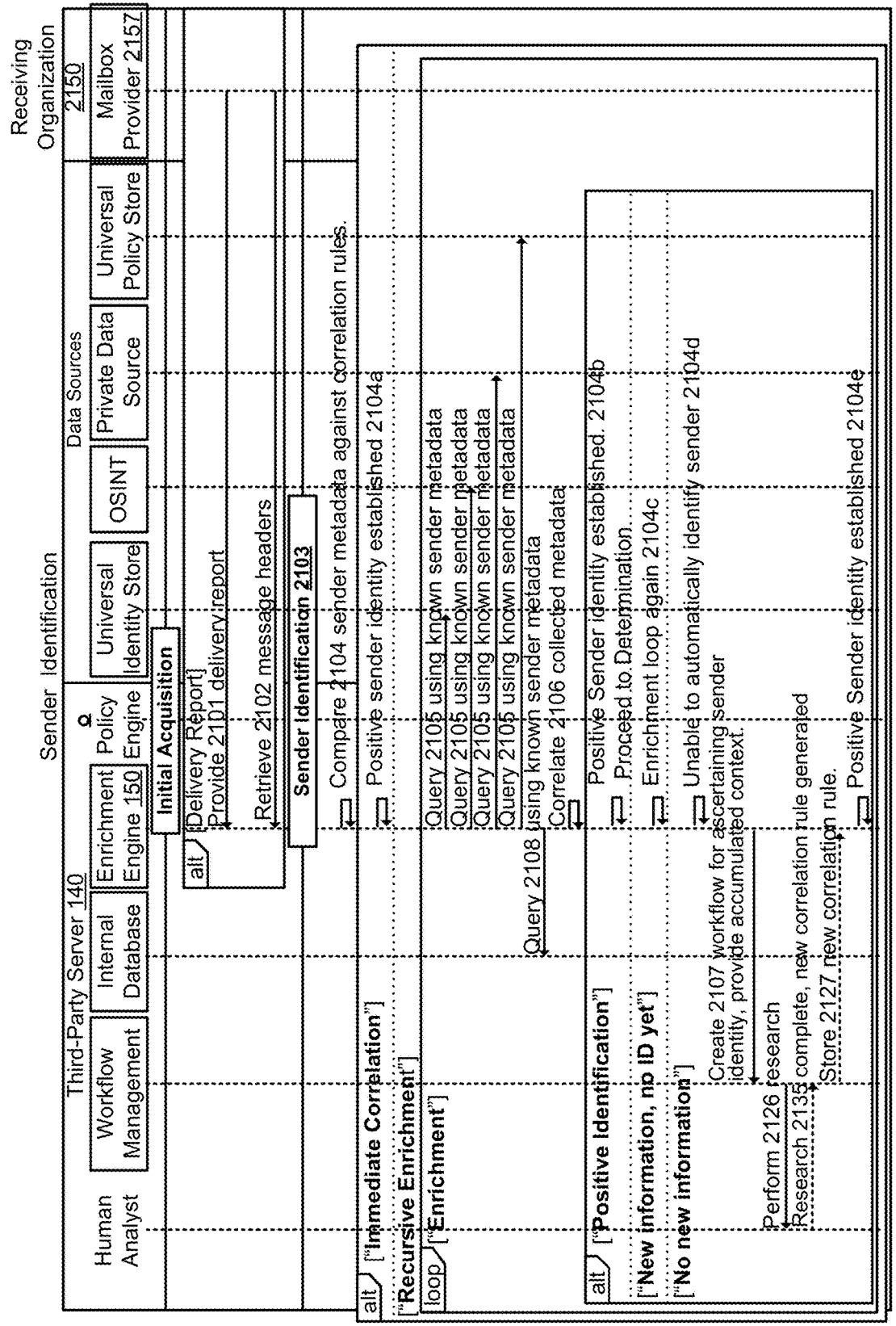
FIGS. 21A and 21B, combined, depict a flowchart illustrating a policy recommendation process, in accordance with some embodiments.
Figure 21B:
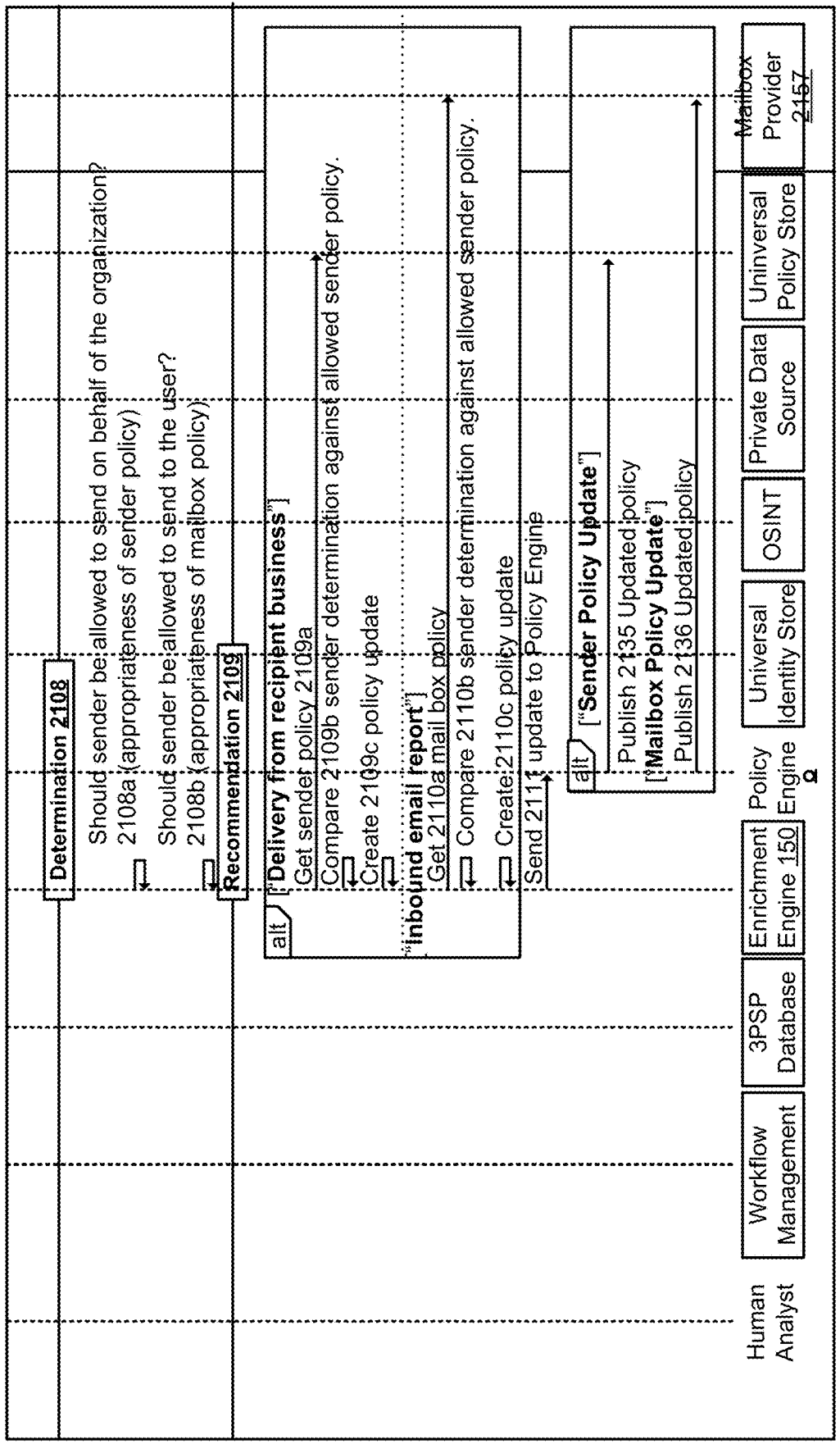

FIGS. 21A and 21B, combined, depict a flowchart illustrating a more detailed example of a policy recommendation process illustrated in FIG. 16. In FIG. 21A, a transmitter device 170 has already sent the message 151 to the receiving organization 2150. FIG. 21A begins with the mailbox provider 2157 of the receiving organization 2150 sending in step 2101 an authentication report 155 to the enrichment engine 150. Now begins the process of repeated enrichment within the enrichment engine 150. This process starts in step 2103 which represents the beginning of the Sender Identification phase. In step 2103, the enrichment engine 150 compares the received sender metadata to its own set of Correlation Rules 221.

In step 2104, the enrichment engine 150 assesses whether it has positively established the identity of the message sender. The enrichment engine 150 performs this assessment at multiple points of the workflow management 225 process. The first such point is step 2104a at which the enrichment engine 150 assesses whether its Correlation Rules 221 match the sender metadata. If they do match, the processing jumps to step 2108 in the Determination phase. If they don't match, the method continues with step 2105.

At step 2105, the enrichment engine 150 issues a query using the known sender metadata. The engine issues this same query to one or more sources, including internal third-party server data sources such as the universal identity store, Universal Policy Store, and third-party server database, and external data sources such as OSINT, and Private Data Sources.

AT step 2106, the enrichment engine 150 generates new correlation rules 221, if possible, based on the responses it receives from the one or more queries of step 2105. At this point, the enrichment engine 150 tests whether the new correlation rules match the sender metadata. If they do match (at step 2104b), the processing jumps to step 2108 and the determination phase.

At step 2104c, the match fails, and the refinement ensues when the processing jumps back to the querying of step 2105. This step is repetitive since the correlation rules newly generated in step 2106 modify and refine the next query at step 2105. For example, a correlation step may start with an IP address of a sending server. The correlation process may perform a reverse lookup (PTR record) for the DNS name corresponding with the IP address, and a WHOIS lookup to determine the NIC (network information center) handle of the organization responsible for the network subnet containing the sending server. From the contact information associated with the NIC handle and the domain name of the reverse DNS lookup the enrichment engine 150 may obtain confirmation of the entity that owns the physical infrastructure. This only identifies the responsible party for the physical and network infrastructure. This cycle produced more information, but did not arrive at a conclusion of the actual owning entity. Further correlation cycles may refine the analysis, by using the domain name from the PTR record, or the name of the company from the NIC handle, to discover the entity behind the network operator, using a business registry.

At step 2104d, the enrichment engine 150 determines that no further significant refinement is feasible. At this point, the enrichment engine 150 performs step 2107 at which it collaborates with workflow management to create a workflow for ascertaining the sender's identity.

This workflow begins with step 2126 where workflow management provides the accumulated research of the enrichment engine 150 to a human analyst, requesting the analyst to continue this research into the sender's identity. The human analyst performs this research, and delivers it to workflow management via step 2135. Based on their received human research, workflow management stores one or more new correlation rules 221 in the enrichment engine.

Having received these new one or more correlation rules, the enrichment engine 150 now compares these new rules to the sender metadata. At Step 2104e, the enrichment engine 150 determines that a match has been made and moves on to the determination phase.

The determination phase begins with step 2108 in which the enrichment engine 150 assesses the scope of the sender's sending permissions. At step 2108a, the enrichment engine 150 determines whether the sender is allowed to send on behalf of the organization (impacting the sender policy); in step 2108b, whether the sender is allowed to send to the user (impacting the mailbox policy).

At steps 2109 and 2110, the enrichment engine 150 records the results of the determinations of step 21. Step 2109 concerns the sender policy and step 2110 concerns the mailbox policy. At step 2109a, the enrichment engine 150 gets the sender policy from the universal policy store 2132. At step 2109b, the enrichment engine 150 compares the sender determination (from the foregoing determination phase 2108) with the sender policy. Finally, at step 2109c, the enrichment engine 150 creates a sender policy update, if necessary.

Steps 2110 are the same as step 2109, except that in the latter, it is the mailbox policy of the mailbox provider 2157 that is updated, rather than the sender policy of the universal policy store.

The processing of the enrichment engine 150 ends with step 2111 in which the engine sends an update to Policy Engine 2130 concerning the former's determination.

FIG. 21 concludes with steps 2135 and 2136 in which the policy engine updates the sender policy and mailbox policy, respectively, according to the determinations received from the enrichment engine 150.

Example 1: Internet of Things (Iot)

In an embodiment in which IoT application owners need to manage a fleet of devices with a high rate of change, keeping an up-to-date policy is essential to providing safe and reliable service.

In an example of this dynamic, an environmental air quality service owns a domain called "example.com". Example.com has an API server located at api.example.com. Example.com contracts with third party implementers to manage and maintain the physical devices which run example.com's collection of software.

A third party implementer, example.io, manages devices for example.com as well as a number of other environmental air quality monitoring services. Since the industrial focus is narrow, example.com is able to use the same hardware for all customers serviced by example.io.

Pursuant to its contract with example.com, example.io provides environmental monitoring services by geolocation. As a matter of good security hygiene and providing a highly-available service, example.io periodically physically swaps devices in the field, and rotates the asymmetric key pair used for authenticating the device. Each device has a name in the DNS which is associated with a public key, and each device has its own private key which corresponds to the public key in DNS.

Since the devices all have public keys in DNS used for authentication, rotating credentials smoothly is a matter of replacing the public key in DNS when the device's private key changes. A policy which names each device by DNS name (e.g. "device123.example.com") allows devices to rotate credentials and maintain service quality without adjusting policy.

A device maintains its own present geolocation in DNS, associated with its name. The example.io organization maintains a public data set of device-to-service assignments.

When example.io removes a device from service and installs one it its stead, example.io first assigns the device to the application in the public data set. When the new device is placed in-service and powered on, it first updates its geolocation in the DNS and then looks to the public data set to see where it should send its observations to.

Having done so, the device sends authenticated observations to the intended target service—in this case, api.example.com. The failed authentication attempts from the newly—provisioned device against api.example.com then trigger a policy assessment via the enrichment engine.

The enrichment engine uses the public data set to confirm that example.io has assigned the device to the api.example.com service, and the enrichment engine may use the DNS to discover the device's geolocation. If the device is in a permitted geolocation, and if example.io is a trusted vendor, and if example.io has appropriately assigned the device to the api.example.com service, and if the messages are signed by the public key corresponding to the device's public key in DNS, then there exists a complete feedback loop whereby the enrichment engine may automatically change the policy to allow the new device to contribute information to the application.

Example 2: Business to Business (B2B) Microservices

Figure 22:
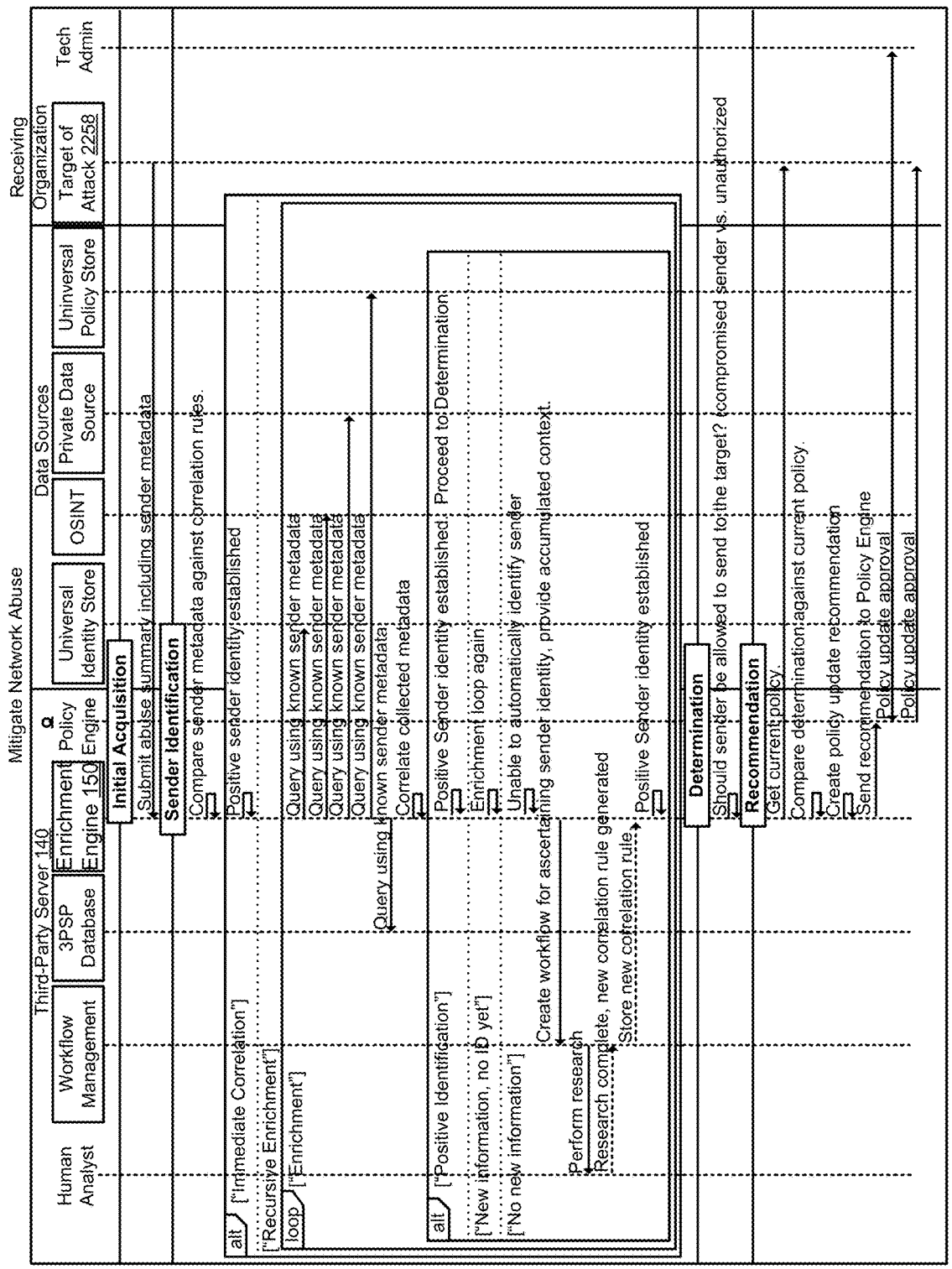
FIG. 22 is a flowchart illustrating a policy recommendation process, in accordance with some embodiments.

FIG. 22 shows an embodiment in which microservices on the Internet need to authenticate across organizations, there is a need to keep the policy as narrow as possible to mitigate network abuse. FIG. 22 is the same as the general case method shown in FIGS. 21A and 21B, with two exceptions. The first is that the sender of the authentication report 155 is a target of attack 2258 looking to prevent abuse instead of mailbox provider 2157.

The second exception is that the determination and recommendation phases of FIG. 22 are simpler than those of FIGS. 21A and 21B. Whereas the determination phase of FIGS. 21A and 21B asks two questions, the same phase of FIG. 22 asks only one of the two (specifically, "should sender be allowed to send to target"). Also, whereas FIGS. 21A and 21B concern both a sender policy and a mailbox policy, FIG. 22 concerns only a single policy.

In an example of this network abuse mitigation dynamic, an organization's marketing department with URL marketing.example.com needs to accept information from an analytics company via API. The API is located at api.marketing.example.com. The analytics organization is called analytics.example.net. The Policy Engine describes the trust relationship between these organizations as: "api.marketing.example.com may accept information from analytics.example.net".

If example.net sells its analytics business to another business, for example "example.parent", the policy needs to change to accommodate a new sending domain, and after the transition is done, the old sending domain needs to be removed from the policy.

Api.marketing.example.com sends an authentication accounting report to the third-party server 140 which describes the authentication events for api.marketing.example.com. The enrichment engine may then see successful authentication from analytics.example.net. Example.net transfers control of the analytics service to example.parent, and api.marketing.example.com begins to observe failed authentication attempts from analytics.example.parent.

The enrichment engine is able to discover the transfer of ownership of example.net's analytics business to example.parent, via OSINT or other means. The enrichment engine alerts the Tech Admin that this transfer has occurred and asks the user if authentication attempts from the new parent company's domain (analytics.example.io) should be allowed by the service located at api.marketing.example.com. In the request, the enrichment engine may provide the Tech Admin with information about the acquisition, in addition to the date that the old service will be retired. The Tech Admin may decide to accept a future change to the policy which allows the enrichment engine to automatically remove the original service's identity at the expected retirement date.

Automatically removing the original identity at the date of termination may prevent a future domain owner from impersonating the original owner.

With this workflow complete and accepted by the Tech Admin, other organizations which are customers of the third-party server 140 that also use the analytics service may automatically receive a policy recommendation based on the first customer's accepted recommendations.

Example 16: News Syndication

Figure 23:
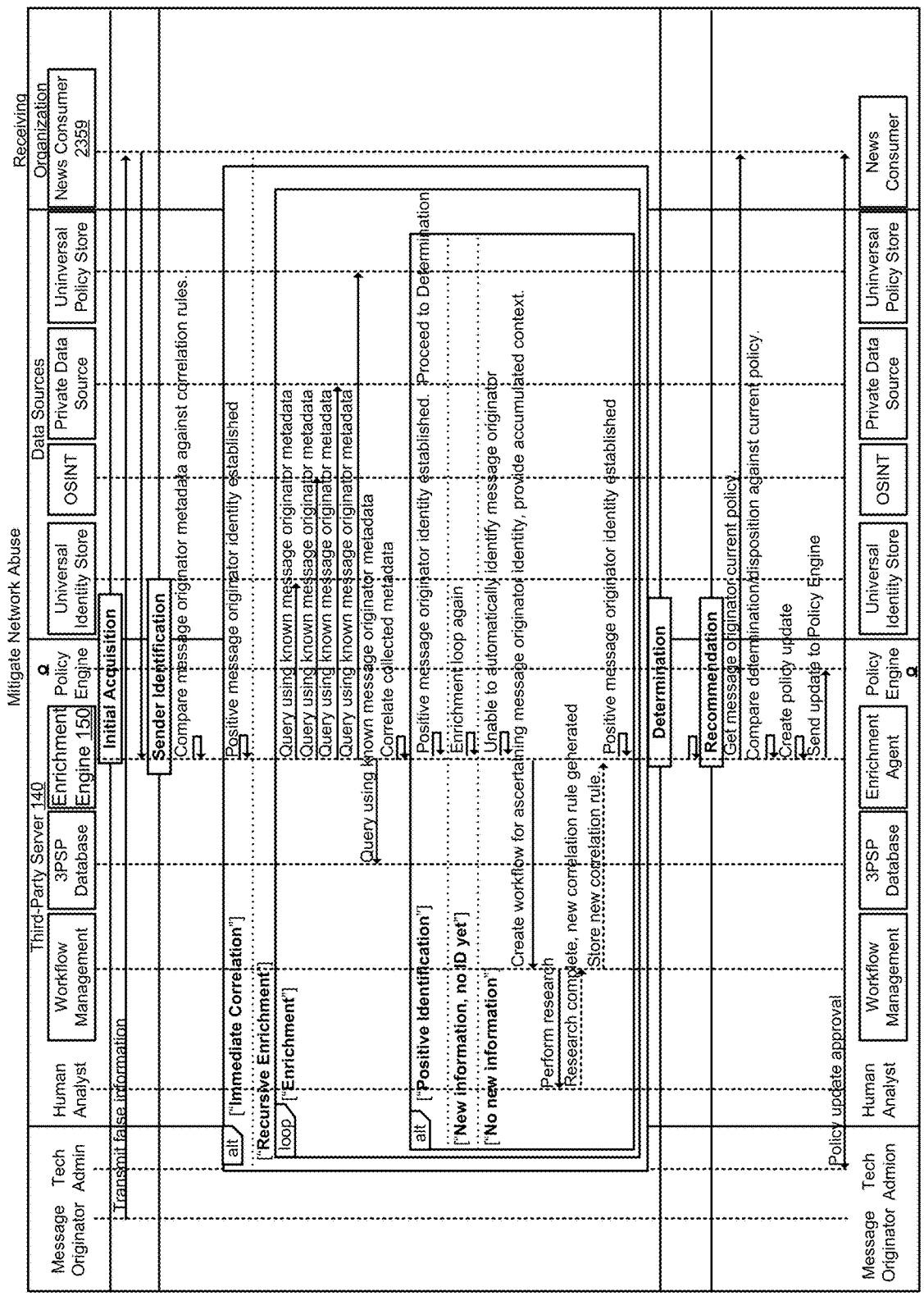
FIG. 23 is a flowchart illustrating a policy recommendation process, in accordance with some embodiments.

FIG. 23 shows an embodiment in which news production companies produce content which is syndicated by other parties, and delivered to consumers, a news production company is interested in ensuring that the original content is represented honestly when it is delivered to the consumer. FIG. 23 is the same as FIG. 22, with three exceptions. The first is that the sender of the authentication report 155 is a news consumer 2359 reporting a content error rather than a target of attack 2258 looking to prevent abuse.

The second exception is that at the end of the work performed by the enrichment engine, a human, tech admin representing the sending service, takes an active role in approving updates to the policy. In FIGS. 21A, 21B and 22, these updates occur automatically.

The third exception is the inclusion in FIG. 23 of the message originator who sends the initial message that kicks off the activities similar to those shown in FIGS. 21A and 21B. The reason that FIG. 23 shows the message originator is that the message in this figure comprises false information.

In this embodiment, the news production company is the message originator, the syndicator is the sending service, and the consumer represents the receiving organization.

The news production company may attach a digital signature to a story, and make it available to syndicators. The syndicators may then transmit the signed content, as well as commentary on the original content. This may also involve the use of formatting in the digital representation to highlight a statement or excerpt from the original content. The whole document, as-delivered to the consumer, is signed by the syndicator, and this contains the original document as well as any mark-up from the syndicator.

The news production company publishes a policy which represents all allowed syndicators of the news production company's content.

The consumer may use a combination of policies, including the news production company's syndication policy, to discover news articles.

The consumer reads the story as presented by the syndicator, and authenticates the digital signatures on the original content as well as the syndicator's additions using a method described in US Provisional Application No. 193/057,814.

The consumer may report to the news production company when a syndicator changes the content and breaks the original content's digital signature. In this case, an investigation may take place through automated means or with human assistance which can determine whether the original content was changed. If the original content's signature was broken, and the syndiactor's signature was not, a breach of trust via misrepresentation of the original content may have occurred, and the news production company may remove the dishonest syndicator from the policy of allowed syndicators. This is a determination which can be arrived at through automated means, with little or no human intervention.

If the consumer compares the commentary and markup offered by the syndicator and discovers that quotes are taken out of context and misrepresent the original intent of the news production company's content, the consumer may report this to the news production company. A workflow like this may not be able to rely solely on digital signatures, and may rely instead on tools like automated sentiment analysis, together with human reasoning, to arrive at a conclusion as to whether content has been dishonestly represented. In other cases a guided workflow may be used to reduce the time required for the news company's technical administrator to determine if a syndicator should be removed from the list of approved syndicators.

Computing Machine Architecture

FIG. 24 is a block diagram illustrating components of an example computing machine that is capable of reading instructions from a computer-readable medium and executes them in a processor (or controller). A computer described herein may include a single computing machine shown in FIG. 24, a virtual machine, a distributed computing system that includes multiple nodes of computing machines shown in FIG. 24, or any other suitable arrangement of computing devices.

By way of example, FIG. 24 shows a diagrammatic representation of a computing machine in the example form of a computer system 2400 within which instructions 2424 (e.g., software, program code, or machine code), which may be stored in a computer-readable medium for causing the machine to perform any one or more of the processes discussed herein may be executed. The processes when embodied as instructions and executable by the one or more processors enables the processor to operate in a specific manner to instantiate the process. Moreover, the instructions may be further configured to operate with other processing enabled components such as field programmable gate arrays (FPGSs), application specific integrated circuits (ASICs), and/or state machines in addition to or in lieu of the processor so that those components operate is the specified manner to instantiate the process. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 24 may correspond to any software, hardware, or combined components shown in various figures, such as various servers and devices shown in FIG. 1A, various engines and modules shown in FIG. 2. While FIG. 24 shows various hardware and software elements, each of the components described in FIG. 1A may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 2424 that specify actions to be taken by that machine. Further, while only a single machine is illustrated, the term "machine" and "computer" may also be taken to include any collection of machines that individually or jointly execute instructions 2424 to perform any one or more of the methodologies discussed herein.

The example computer system 2400 includes one or more processors 2402 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 2400 may also include a memory 2404 that stores computer code including instructions 2424 that may cause the processors 2402 to perform certain actions when the instructions are executed, directly or indirectly by the processors 2402. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 2402 and reduces the space required for the memory 2404. For example, the machine learning methods described herein reduces the complexity of the computation of the processors 2402 by applying one or more novel techniques that simplify the steps in training, reaching convergence, and generating results of the processors 2402. The algorithms described herein also reduces the size of the models and datasets to reduce the storage space requirement for memory 2404.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though the specification or the claims may refer to some processes to be performed by a processor, this should be construed to include a joint operation of multiple distributed processors.

The computer system 2400 may include a main memory 2404, and a static memory 2406, which are configured to communicate with each other via a bus 2408. The computer system 2400 may further include a graphics display unit 2410 (e.g., a plasma display panel (PDP), a liquid crystal display (LCD), a projector, or a cathode ray tube (CRT)). The graphics display unit 2410, controlled by the processors 2402, displays a graphical user interface (GUI) to display one or more results and data generated by the processes described herein. The computer system 2400 may also include an alphanumeric input device 2412 (e.g., a keyboard), a cursor control device 2414 (e.g., a mouse, a trackball, a joystick, a motion sensor, or another pointing instrument), a storage unit 2416 (a hard drive, a solid state drive, a hybrid drive, a memory disk, etc.), a signal generation device 2418 (e.g., a speaker), and a network interface device 2420, which also are configured to communicate via the bus 2408.

The storage unit 2416 includes a computer-readable medium 2422 on which is stored instructions 2424 embodying any one or more of the methodologies or functions described herein. The instructions 2424 may also reside, completely or at least partially, within the main memory 2404 or within the processor 2402 (e.g., within a processor's cache memory) during execution thereof by the computer system 2400, the main memory 2404 and the processor 2402 also constituting computer-readable media. The instructions 2424 may be transmitted or received over a network 2426 via the network interface device 2420.

While computer-readable medium 2422 is shown in an example embodiment to be a single medium, the term "computer-readable medium" should be taken to include a single medium or multiple media (e.g., a centralized or distributed database, or associated caches and servers) able to store instructions (e.g., instructions 2424). The computer-readable medium may include any medium that is capable of storing instructions (e.g., instructions 2424) for execution by the processors (e.g., processors 2402) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

Using a third-party server 140 as a delegation service for distributing secure messages has various benefits over the organization 110 performing the distribution because: (1) the third-party server 140 sees a lot more parties than does the organization, since the third-party server 140 may provide various services for many other organizations, (2) researching the reputation of a new party is too onerous for an organization, and the third-party server 140 is better situated for this because it sees the widest span of parties, good and bad (3) when business policies change or evolve, propagating the effects of these changes can be too much for the client, so using the third-party server 140 to propagate the changes is much easier. Policies may be automatically and continually improved, as organizational relationships change, which increases the level of difficulty for a bad actor to abuse the system. Human interaction is minimized for the process of policy curation, and human learnings are translated into correlation rules which are used by the enrichment engine to avoid repetitive human action.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A computer-implemented method, comprising:
   receiving, by a third-party server, a forwarded message or message metadata from a recipient device that receives an original message from a sender device which attempts to perform an action, the third-party server delegated by a first organization for managing one or more policies set forth by the first organization;
   determining, based on information associated with the sender device, that a sender associated with the sender device is unknown to the third-party server;
   identifying metadata of the sender device from the forwarded message or message metadata;
   determining a sender identity of the sender associated with the sender device based on the metadata;
   determining that one of the policies applies to the sender based on the sender identity;
   transmitting a response to the recipient device comprising information related to the sender identity of the sender device, wherein the information guides the recipient device to respond to the sender device; and
   storing, by the third-party server, the sender identity associated with sender in a list of authorized senders, wherein information in the list of authorized senders is provided by the third-party server to a plurality of unrelated organizations including the first organization.

2. The computer-implemented method of claim 1, further comprising:
   transmitting a recommendation to the first organization for a potential policy modification based on the sender identity of the sender;
   receiving an approval from the first organization or automatically approving in accordance with the first organization's configurations; and
   implementing automatically the potential policy modification to reflect the approval.

3. The computer-implemented method of claim 2, the third-party server transmits the recommendation and receives the approval through a guided workflow, the guided workflow comprising one or more questions or suggested actions for the first organization to characterize the sender.

4. The computer-implemented method of claim 1, wherein the third-party server maintaining a plurality of guided workflow plans, the guided workflow is selected from one of the guided workflow plans based on a likely role of the sender.

5. The computer-implemented method of claim 1, wherein the sender identity of the sender is authenticated by the recipient device through a DNS record associated with the sender.

6. The computer-implemented method of claim 4, wherein determining the likely role of the sender device is based on a recursive process.

7. The computer-implemented method of claim 4, wherein determining the likely role of the sender device is based on one or more searches of open-source intelligence sources.

8. The computer-implemented method of claim 1, wherein the message metadata is included in an authentication report.

9. A system, comprising:
   one or more processors;
   memory for storing computer code comprising instructions, the instructions, when executed by the one or more processors, cause the one or more processors to at least:
      receive, by a third-party server, a forwarded message or message metadata from a recipient device that receives an original message from a sender device which attempts to perform an action, the third-party server delegated by a first organization for managing one or more policies set forth by the first organization;
      determine, based on information associated with the sender device, that a sender associated with the sender device is unknown to the third-party server;
      identify metadata of the sender device from the forwarded message or message metadata;
      determine a sender identity of the sender associated with the sender device based on the metadata;
      determine that one of the policies applies to the sender based on the sender identity;
      transmit a response to the recipient device comprising information related to the sender identity of the sender device, wherein the information guides the recipient device to respond to the sender device; and
      store, by the third-party server, the sender identity associated with sender in a list of authorized senders, wherein information in the list of authorized senders is provided by the third-party server to a plurality of unrelated organizations including the first organization.

10. The system of claim 9, wherein the instructions, when executed, further cause the one or more processors to at least:
    transmit a recommendation to the first organization for a potential policy modification based on the sender identity of the sender;
    receive an approval from the first organization or automatically approving in accordance with the first organization's configurations; and
    implement automatically the potential policy modification to reflect the approval.

11. The system of claim 10, wherein the system transmits the recommendation and receives the approval through a guided workflow, the guided workflow comprising one or more questions or suggested actions for the first organization to characterize the sender device.

12. The system of claim 9, wherein the system maintains a plurality of guided workflow plans, the guided workflow is selected from one of the guided workflow plans based on a likely role of the sender.

13. The system of claim 9, wherein the sender identity of the sender is authenticated by the recipient device through a DNS record associated with the sender.

14. The system of claim 12, wherein determining the likely role of the sender device is based on a recursive process.

15. The system of claim 12, wherein determining the likely role of the sender device is based on one or more searches of open-source intelligence sources.

16. The system of claim 9, wherein the message metadata is included in an authentication report.

17. A non-transitory computer readable medium for storing computer code comprising instructions, the instructions, when executed by one or more processors, cause the one or more processors to at least:
- receive, by a third-party server, a forwarded message or message metadata from a recipient device that receives an original message from a sender device which attempts to perform an action, the third-party server delegated by a first organization for managing one or more policies set forth by the first organization;
- determine, based on information associated with the sender device, that a sender associated with the sender device is unknown to the third-party server;
- identify metadata of the sender device from the forwarded message or message metadata;
- determine a sender identity of the sender associated with the sender device based on the metadata;
- determine that one of the policies applies to the sender based on the sender identity;
- transmit a response to the recipient device comprising information related to the sender identity of the sender device, wherein the information guides the recipient device to respond to the sender device; and
- store, by the third-party server, the sender identity associated with sender in a list of authorized senders, wherein information in the list of authorized senders is provided by the third-party server to a plurality of unrelated organizations including the first organization.

18. The non-transitory computer readable medium of claim 17, wherein the instructions, when executed, further cause the one or more processors to at least:
- transmit a recommendation to the first organization for a potential policy modification based on the sender identity of the sender;
- receive an approval from the first organization or automatically approving in accordance with the first organization's configurations; and
- implement automatically the potential policy modification to reflect the approval.

19. The non-transitory computer readable medium of claim 18, wherein the third-party server transmits the recommendation and receives the approval through a guided workflow, the guided workflow comprising one or more questions or suggested actions for the first organization to characterize the sender device.

20. The non-transitory computer readable medium of claim 17, wherein the third-party server maintaining a plurality of guided workflow plans, the guided workflow is selected from one of the guided workflow plans based on a likely role of the sender.

* * * * *